(12) United States Patent
Shinkai et al.

(10) Patent No.: US 9,052,427 B2
(45) Date of Patent: Jun. 9, 2015

(54) DISPLAY AND ILLUMINATION UNIT

(75) Inventors: Shogo Shinkai, Miyagi (JP); Kentaro Okuyama, Miyagi (JP); Akira Ebisui, Miyagi (JP); Harumi Sato, Miyagi (JP)

(73) Assignee: Sony Corporation, Tokyo (JP)

( * ) Notice: Subject to any disclaimer, the term of this patent is extended or adjusted under 35 U.S.C. 154(b) by 94 days.

(21) Appl. No.: 13/450,099

(22) Filed: Apr. 18, 2012

(65) Prior Publication Data

US 2012/0281273 A1    Nov. 8, 2012

(30) Foreign Application Priority Data

May 2, 2011   (JP) .................... 2011-102897

(51) Int. Cl.
| | |
|---|---|
| G02F 1/29 | (2006.01) |
| G02F 1/03 | (2006.01) |
| G02F 1/07 | (2006.01) |
| G02B 26/00 | (2006.01) |
| G02F 1/00 | (2006.01) |
| F21V 8/00 | (2006.01) |
| G02F 1/1334 | (2006.01) |

(52) U.S. Cl.
CPC ............ *G02B 6/0053* (2013.01); *G02F 1/1334* (2013.01)

(58) Field of Classification Search
USPC .......................... 359/237, 242, 245, 315–324
See application file for complete search history.

(56) References Cited

U.S. PATENT DOCUMENTS 6,005,333 A * 12/1999 Kaneko et al. ................. 313/306
6,014,187 A *  1/2000 Taketomi et al. ............... 349/15

FOREIGN PATENT DOCUMENTS

| JP | 03-119889 | 5/1991 | |
| JP | 2009-282063 | * 12/2009 | .......... G02F 1/13363 |

* cited by examiner

*Primary Examiner* — Scott J Sugarman
*Assistant Examiner* — Brandi Thomas
(74) *Attorney, Agent, or Firm* — Sony Corporation

(57) ABSTRACT

A light modulation layer disposed between a first transparent substrate and a second transparent substrate generates a plurality of first strip-like illumination light beams extending in a direction intersecting with a first end surface of the first or second transparent substrate at a first angle with use of light from a light source, when an electric field for a first mode is applied from an electrode to the light modulation layer. The light modulation layer generates a plurality of second strip-like illumination light beams extending in a direction intersecting with the first end surface at an angle different from the first angle or a direction parallel to the first end surface with use of light from the light source, when an electric field for a second mode is applied from the electrode to the light modulation layer.

18 Claims, 54 Drawing Sheets

20 μm

DISPLAY AND ILLUMINATION UNIT

CROSS REFERENCES TO RELATED APPLICATIONS

The present application claims priority to Japanese Priority Patent Application JP 2011-102897 filed in the Japan Patent Office on May 2, 2011, the entire content of which is hereby incorporated by reference.

BACKGROUND

The present application relates to a display capable of performing two-dimensional display (planar display) and three-dimensional display (stereoscopic display), and an illumination unit suitably applicable to such a display as a backlight.

Displays capable of performing three-dimensional display include displays in need of wearing special glasses for three-dimensional display and displays without need of the special glasses. In the latter displays, for example, a lenticular lens or a parallax barrier is used to perceive a stereoscopic image with naked eyes. When image information is distributed into right and left eyes by the lenticular lens or the parallax barrier, the right and left eyes see different images, respectively, and as a result, three-dimensional display is achievable.

However, in the case where the above-described parallax barrier is used, resolution in two-dimensional display is reduced. Therefore, Japanese Unexamined Patent Application Publication No. H3-119889 discloses a technique of performing three-dimensional display without impairing resolution in two-dimensional display. In Japanese Unexamined Patent Application Publication No. H3-119889, a parallax barrier is configured of a liquid crystal device, and in three-dimensional display, the liquid crystal device serves as a parallax barrier by forming an opaque section therein. Then, in two-dimensional display, the liquid crystal device does not serve as the parallax barrier by turning an entire surface thereof into a transmission state, and an entire image on a display screen uniformly enters into the right and left eyes.

SUMMARY

However, in a method described in Japanese Unexamined Patent Application Publication No. H3-119889, there is an issue that when a user rotates a display panel by 90° from a main perspective, it is difficult to perceive a three-dimensional image. It is to be noted that, when two parallax barriers described in Japanese Unexamined Patent Application Publication No. H3-119889 are laminated to allow their main perspectives to be different by 90° from each other, the above-described issue is allowed to be solved. However, in such a case, in addition to an increase in the thickness of the display, a reduction in display luminance in three-dimensional display is caused, because light is absorbed by the parallax barriers.

It is desirable to provide a thin high-luminance display which has a plurality of main perspectives and is capable of performing three-dimensional display, and an illumination unit suitably applicable to such a display.

According to an embodiment of the application, there is provided an illumination unit including: a first transparent substrate and a second transparent substrate being separated from and facing each other; and a light source emitting light to a first end surface of the first transparent substrate or the second transparent substrate. The illumination unit further includes: a light modulation layer disposed in a gap between the first transparent substrate and the second transparent substrate, and exhibiting a scattering property or transparency with respect to light from the light source, depending on magnitude of an electric field; and an electrode generating an electric field for a first mode or an electric field for a second mode in the light modulation layer, when a voltage is applied thereto. In this case, the light modulation layer generates a plurality of first strip-like illumination light beams extending in a direction intersecting with the first end surface at a first angle with use of light from the light source, when the electric field for the first mode is applied from the electrode to the light modulation layer. The light modulation layer generates a plurality of second strip-like illumination light beams extending in a direction intersecting with the first end surface at an angle different from the first angle or a direction parallel to the first end surface with use of light from the light source, when the electric field for the second mode is applied from the electrode to the light modulation layer.

According to an embodiment of the application, there is provided a display including: a display panel being driven based on an image signal; and an illumination unit illuminating the display panel, the illumination unit including a first transparent substrate and a second transparent substrate being separated from and facing each other, a light source emitting light to a first end surface of the first transparent substrate or the second transparent substrate, a light modulation layer disposed in a gap between the first transparent substrate and the second transparent substrate, and exhibiting a scattering property or transparency with respect to light from the light source, depending on magnitude of an electric field, and an electrode generating an electric field for a first mode or an electric field for a second mode in the light modulation layer, when a voltage is applied thereto, in which the light modulation layer generates a plurality of first strip-like illumination light beams extending in a direction intersecting with the first end surface at a first angle with use of light from the light source, when the electric field for the first mode is applied from the electrode to the light modulation layer, and the light modulation layer generates a plurality of second strip-like illumination light beams extending in a direction intersecting with the first end surface at an angle different from the first angle or a direction parallel to the first end surface with use of light from the light source, when the electric field for the second mode is applied from the electrode to the light modulation layer.

In the illumination unit and the display according to the embodiment of the application, the illumination unit includes the light modulation layer exhibiting the scattering property or transparency with respect to light from the light source, depending on magnitude of an electric field. Therefore, light emitted from the light source and propagating through the first transparent substrate and the like passes through a region exhibiting transparency by electric field control of the light modulation layer to be totally reflected by a top surface of the illumination unit or to be reflected by the top surface of the illumination unit with high reflectivity. As a result, luminance in a region corresponding to a region exhibiting transparency in a light emission region (hereinafter simply referred to as "transparent region in the light emission region") of the illumination unit is reduced, compared to the case where light is uniformly emitted from an entire surface of the illumination unit. On the other hand, light propagating through the transparent substrate and the like is scattered by a region exhibiting the scattering property by the electric field control of the light modulation layer to pass through the top surface of the illumination unit. As a result, luminance in a region corresponding to a region exhibiting the scattering property in the light emission region (hereinafter simply referred to "scattering region in the light emission region") of the illumination unit is increased, compared to the case where light is uniformly emitted from the entire surface of the illumination unit. Moreover, luminance in white display is partially increased (partial luminance enhancement) by a reduced amount of the luminance of the transparent region in the light emission region.

Moreover, in the embodiment of the application, the light modulation layer generates strip-like illumination light beams according to a mode of an applied electric field. Therefore, a three-dimensional image for a certain main perspective is allowed to be displayed on the display panel by strip-like illumination light beams according to the electric field for the first mode, and a three-dimensional image for another main perspective is allowed to be displayed on the display panel by strip-like illumination light beams according to the electric field for the second mode. In other words, three-dimensional images for different main perspectives are allowed to be selectively displayed on the display panel.

Moreover, in the embodiment of the application, one light modulation layer is included in an edge-light type illumination unit, and an electrode is provided to the light modulation layer; therefore, three-dimensional images for different main perspectives are allowed to be selectively displayed on the display panel. Accordingly, it is not necessary to laminate a plurality of light modulation layers or a large number of electrodes.

In the embodiment of the application, the electrode has, for example, a shape corresponding to a light emission shape of the first strip-like illumination light beam or the second strip-like illumination light beam. For example, the electrode includes a plurality of first strip-like electrodes extending in an extending direction of the first strip-like illumination light beams. Moreover, for example, the electrode includes a plurality of second strip-like electrodes extending in an extending direction of the second strip-like illumination light beams.

In this case, when a high potential difference is applied to the light modulation layer, the light modulation layer may exhibit the scattering property, and when a low potential difference is applied to the light modulation layer (or no potential difference is applied to the light modulation layer), the light modulation layer may exhibit transparency. In this case, a width of each of the first strip-like illumination light beams may be smaller at a shorter distance from the light source and larger at a longer distance from the light source. Moreover, in the case where the light modulation layer has the above-described property, and an edge of each of the first strip-like electrodes has a concavo-convex shape, concavo-convex amplitude of the concavo-convex shape may be larger at a shorter distance from the light source and smaller at a longer distance from the light source.

It is to be noted that, in contrast, when a high potential difference is applied to the light modulation layer, the light modulation layer may have transparency, and when a low potential difference is applied to the light modulation layer (or no potential difference is applied to the light modulation layer), the light modulation layer may exhibit the scattering property. In this case, the electrode may have a slit (an opening) with a width larger at a shorter distance from the light source and smaller at a longer distance from the light source. Moreover, in the case where the light modulation layer has the above-described property, an edge of the above-described slit has a concavo-convex shape, concavo-convex amplitude of the concavo-convex shape may be larger at a shorter distance from the light source and smaller at a longer distance from the light source.

In the illumination unit and the display according to the embodiment of the application, the light modulation layer exhibiting the scattering property or transparency with respect to light from the light source, depending on magnitude of an electric field generates strip-like illumination light beams according to the mode of an applied electric field; therefore, a thin high-luminance display which has a plurality of main perspectives and is capable of performing three-dimensional display is allowed to be achieved. Moreover, an illumination unit suitably applicable to such a display is allowed to be achieved.

It is to be understood that both the foregoing general description and the following detailed description are exemplary, and are intended to provide further explanation of the application as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the application.

DETAILED DESCRIPTION

Figure 70:
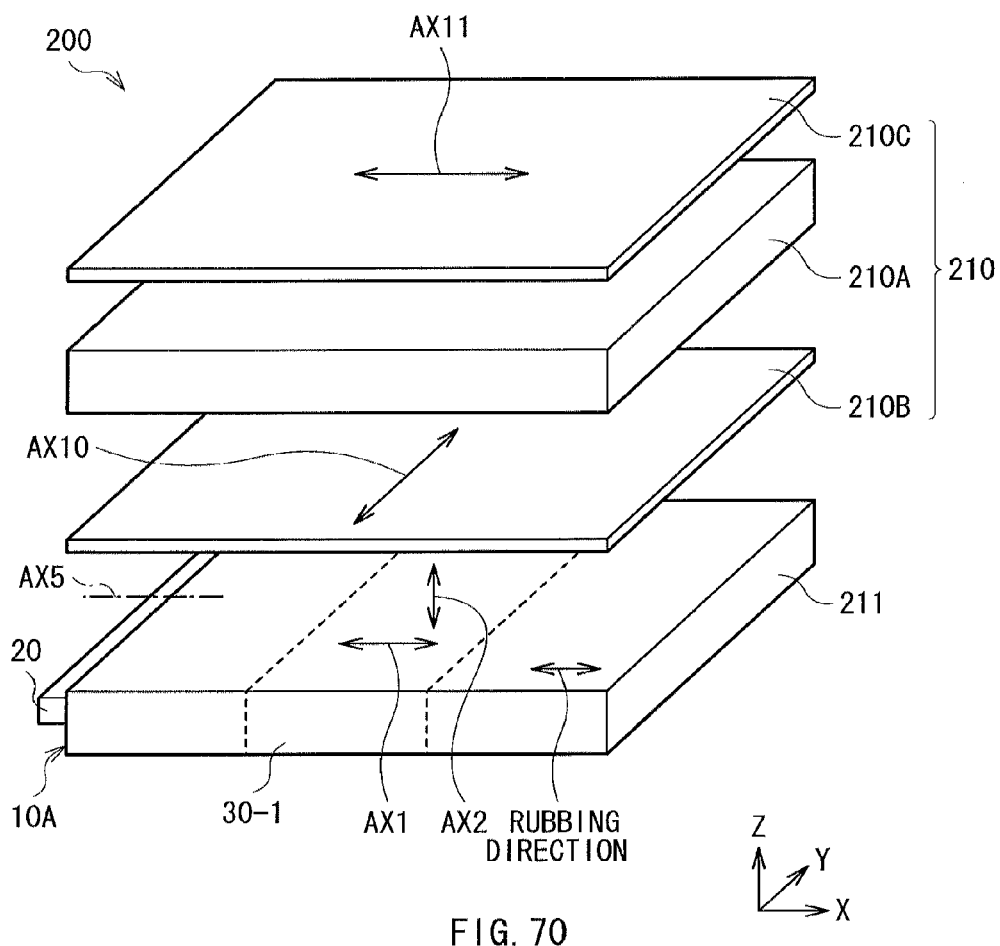
FIG. 70 is a diagram illustrating another example of the relationship between the optical axes of the polarizing plates of the display panel and the optical axes of the light modulation layer in FIG. 47.
Figure 71:
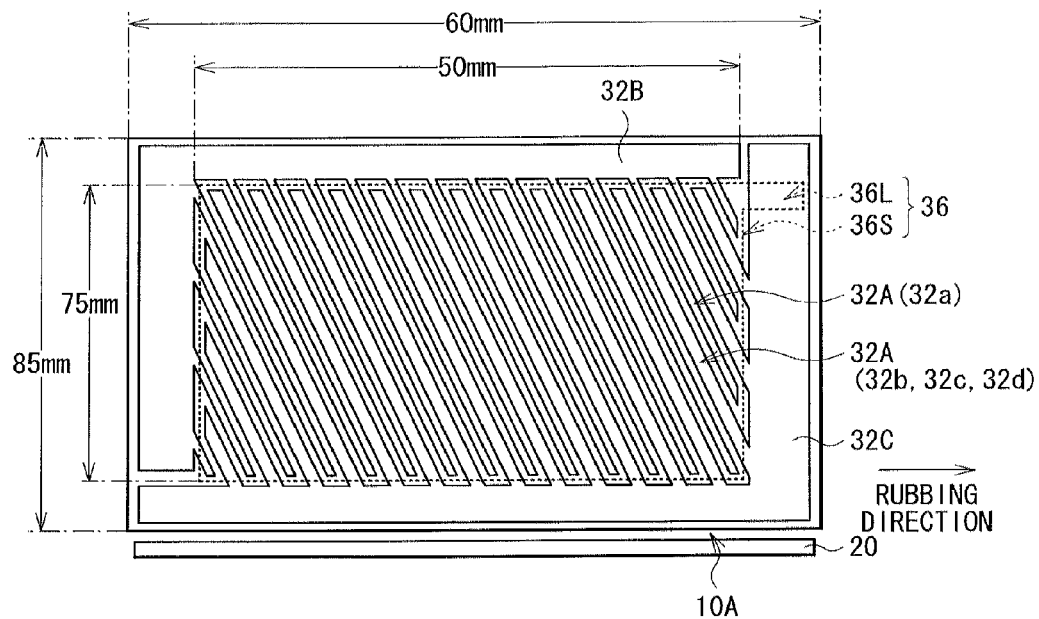
FIG. 71 is a diagram illustrating an electrode layout according to an example.
Figure 72:
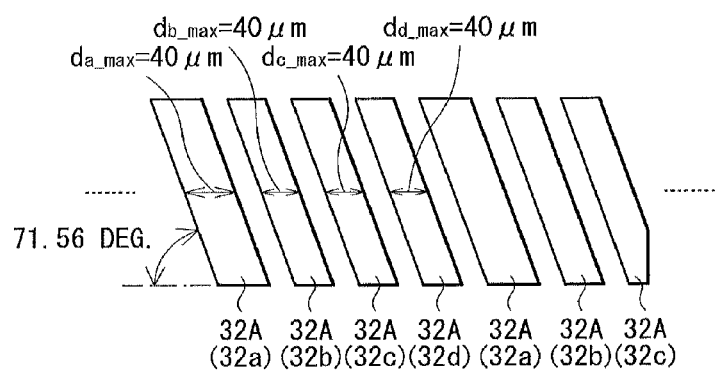
FIG. 72 is an enlarged view of the electrode layout in FIG. 71.
Figure 73:
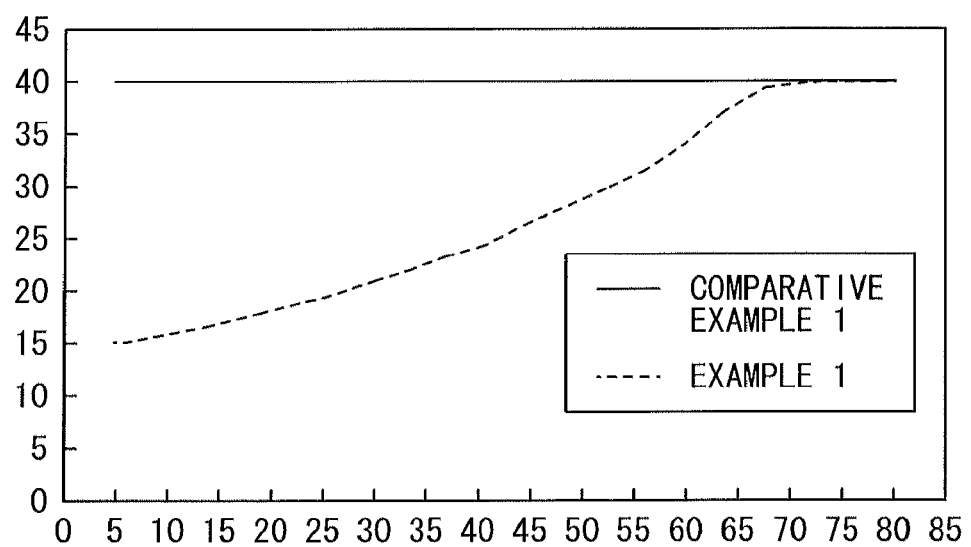
FIG. 73 is a diagram illustrating calculation results of luminance distributions in two-dimensional display in Example 1 and Comparative Example 1.

Preferred embodiments of the application will be described in detail below referring to the accompanying drawings. It is to be noted that description will be given in the following order.
1. First Embodiment (FIG. 1 to FIGS. 46A to 46C)
   An example in which a light modulation device (horizontal alignment inversion PDLC) is used in a backlight
2. Second Embodiment (FIG. 47 to FIGS. 50A to 50C)
   An example in which a light modulation device (vertical alignment inversion PDLC) is used in a backlight
3. Modifications (FIG. 51 to FIG. 70)
4. Examples (FIG. 71 to FIG. 73)

1. First Embodiment

[Configuration of Television Broadcast Signal Transmitter/Receiver System]

Figure 1:
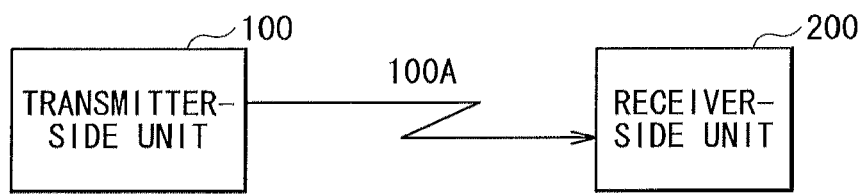
FIG. 1 is a diagram illustrating an example of a television broadcast signal transmitter/receiver system according to a first embodiment of the application.

FIG. 1 is a block diagram illustrating a configuration example of a transmitter/receiver system, which includes a receiver-side unit 200 according to a first embodiment of the application, with use of a television broadcast signal 100A. The transmitter/receiver system includes a transmitter-side unit 100 transmitting a television broadcast signal 100A through, for example, wired communication (such as cable TV) or wireless communication (such as terrestrial digital waves or satellite waves), and the receiver-side unit 200 receiving the television broadcast signal 100A from the transmitter-side unit 100 through the above-described wired or wireless communication. It is to be noted that the receiver-side unit 200 corresponds to a specific example of "display" in the application.

The television broadcast signal 100A includes image data for two-dimensional display (planar display) or image data for three-dimensional display (stereoscopic display). In this description, the image data for two-dimensional display refers to two-dimensional image data without perspective information. Moreover, the image data for three-dimensional display refers to two-dimensional image data with perspective information, and the image data for three-dimensional display includes plural sets of two-dimensional image data with perspectives different from one another. The transmitter-side unit 100 is, for example, a television broadcast signal transmitter installed in a broadcasting station, or a server on the Internet.

[Functional Block of Receiver-Side Unit 200]

Figure 2:
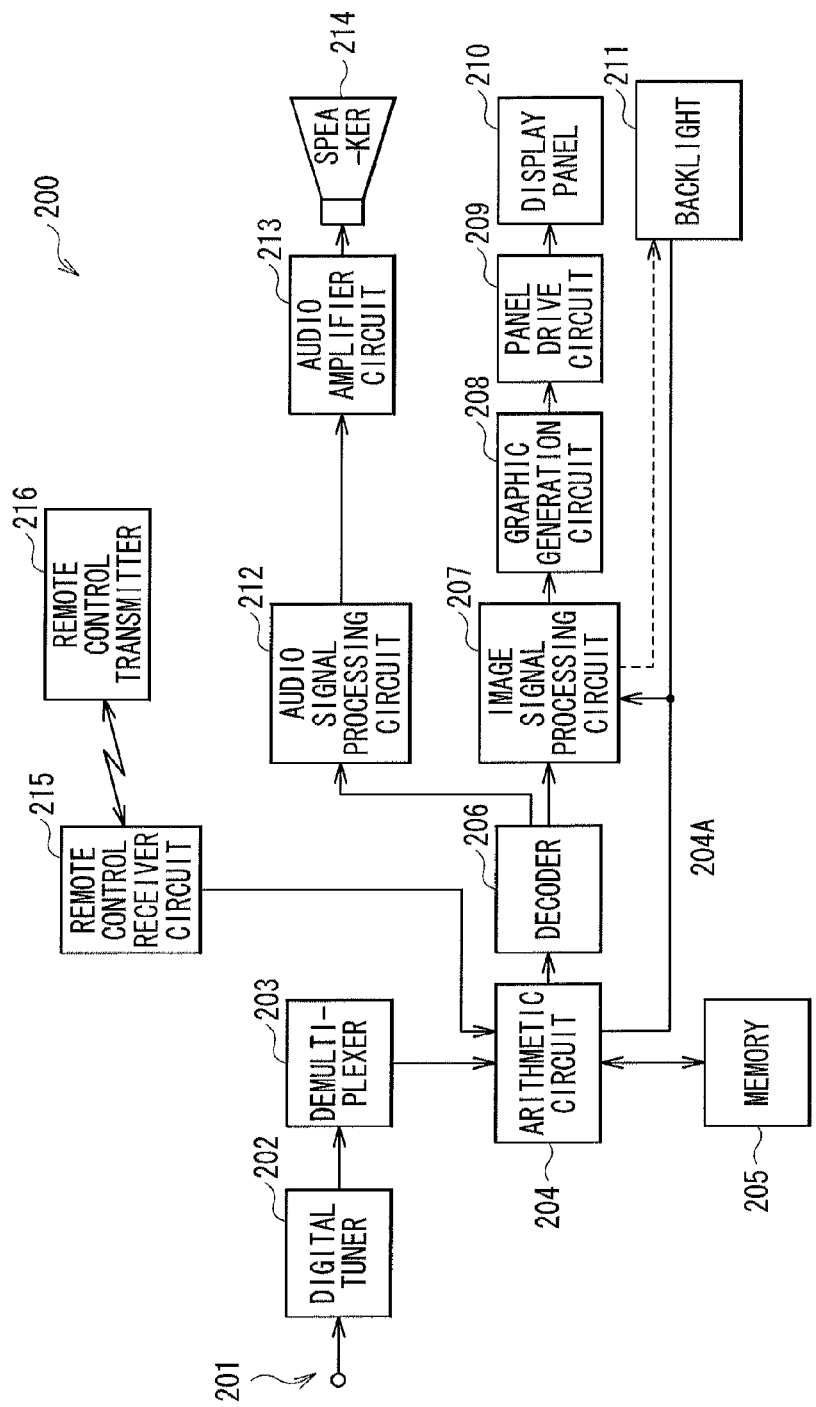
FIG. 2 is a diagram illustrating an example of functional blocks of a receiver-side unit in FIG. 1.

FIG. 2 is a block diagram of a configuration example of the receiver-side unit 200. The receiver-side unit 200 is, for example, a television capable of being connected to the above-described wired or wireless communication. The receiver-side unit 200 includes, for example, an antenna terminal 201, a digital tuner 202, a demultiplexer 203, an arithmetic circuit 204, and a memory 205. The receiver-side unit 200 further includes, for example, a decoder 206, an image signal processing circuit 207, a graphic generation circuit 208, a panel drive circuit 209, a display panel 210, a backlight 211, an audio signal processing circuit 212, an audio amplifier circuit 213, and a speaker 214. The receiver-side unit 200 further includes, for example, a remote control receiver circuit 215 and a remote control transmitter 216. It is to be noted that the display panel 210 corresponds to a specific example of "display panel" in the application, and the backlight 211 corresponds to a specific example of "illumination unit" in the application.

The antenna terminal 201 is a terminal receiving the television broadcast signal 100A received by a receiving antenna (not illustrated). For example, the digital tuner 202 processes the television broadcast signal 100A having entered into the antenna terminal 201 to output a predetermined transport stream associated with a channel selected by a user. For example, the demultiplexer 203 extracts a partial TS (Transport Stream) associated with the channel selected by the user from the transport stream obtained in the digital tuner 202.

The arithmetic circuit 204 controls operations of respective components of the receiver-side unit 200. For example, the arithmetic circuit 204 allows the memory 205 to hold the partial TS obtained by the demultiplexer 203, or transmits the partial TS read from the memory 205 to the decoder 206. Moreover, for example, the arithmetic circuit 204 transmits a control signal 204A specifying two-dimensional display or three-dimensional display to the image signal processing circuit 207 and the backlight 211. The arithmetic circuit 204 provides the above-described control signal 204A based on, for example, setting information stored in the memory 205, predetermined information included in the partial TS, or setting information supplied from the remote control receiver circuit 215.

For example, the memory 205 holds the setting information of the receiver-side unit 200 and manages data. The memory 205 is allowed to hold, for example, the partial TS obtained by the demultiplexer 203 or setting information such as display method.

For example, the decoder 206 performs a decoding process on an image PES (Packetized Elementary Stream) packet included in the partial TS which is obtained by the demultiplexer 203 to obtain image data. For example, the decoder 206 also performs a decoding process on an audio PES packet included in the partial TS which is obtained by the demultiplexer 203 to obtain audio data. In this description, the image data refers to image data for two-dimensional display or image data for three-dimensional display.

For example, the image signal processing circuit 207 and the graphic generation circuit 208 perform, as necessary, multiple image processing, a graphic data superimposing process, or the like on the image data obtained by the decoder 206.

In the case where the image signal processing circuit 207 receives a signal specifying three-dimensional display as the control signal 204A from the arithmetic circuit 204, and image data supplied from the decoder 206 is image data for three-dimensional display, the image signal processing circuit 207 generates, for example, one set of two-dimensional image data with use of plural sets of two-dimensional image data with perspectives different from one another included in the image data for three-dimensional display supplied from the decoder 206 to select the generated two-dimensional image data as image data which is to be supplied to the graphic generation circuit 208. For example, in the case where the image data for three-dimensional display includes two sets of two-dimensional image data with perspectives different from each other, the image signal processing circuit 207 performs a process of alternately arranging the two sets of two-dimensional image data in a horizontal direction from one row to another to generate one set of image data in which the two sets of two-dimensional image data are alternately arranged in the horizontal direction. Likewise, for example, in the case where the image data for three-dimensional display includes four sets of two-dimensional image data with perspectives different from one another, the image signal processing circuit 207 performs a process of periodically alternately arranging the four sets of two-dimensional image data in the horizontal direction from one row to another to generate one set of image data in which four sets of two-dimensional image data are periodically alternately arranged in the horizontal direction.

In the case where the image signal processing circuit 207 receives a signal specifying two-dimensional display as the control signal 204A from the arithmetic circuit 204, and image data supplied from the decoder 206 is image data for three-dimensional display, for example, the image signal processing circuit 207 selects, as image data which is to be supplied to the graphic generation circuit 208, one set of image data from plural sets of two-dimensional image data with perspectives different from one another which are included in image data for three-dimensional display supplied from the decoder 206. In the case where the image signal processing circuit 207 receives the signal specifying two-dimensional display as the control signal 204A from the arithmetic circuit 204, and the image data supplied from the decoder 206 is image data for two-dimensional display, for example, the image signal processing circuit 207 selects image data for two-dimensional display supplied from the decoder 206 as image data which is to be supplied to the graphic generation circuit 208.

The graphic generation circuit 208 generates, for example, a UI (User Interface) screen which is to be used for screen display. For example, the panel drive circuit 209 drives the display panel 210 based on image data supplied from the graphic generation circuit 208.

Configurations of the display panel 210 and the backlight 211 will be described in detail later. For example, the audio signal processing circuit 212 performs a process such as D/A conversion on audio data obtained by the decoder 206. The audio amplifier circuit 213 amplifies, for example, an audio signal supplied from the audio signal processing circuit 212 to supply the amplified audio signal to the speaker 214.

The remote control receiver circuit 215 receives, for example, a remote control signal transmitted from the remote control transmitter 216 to supply the remote control signal to the arithmetic circuit 204. The arithmetic circuit 204 controls, for example, respective components of the receiver-side unit 200 in response to the remote control signal.

[Sectional Configuration of Receiver-Side Unit 200]

Figure 3:
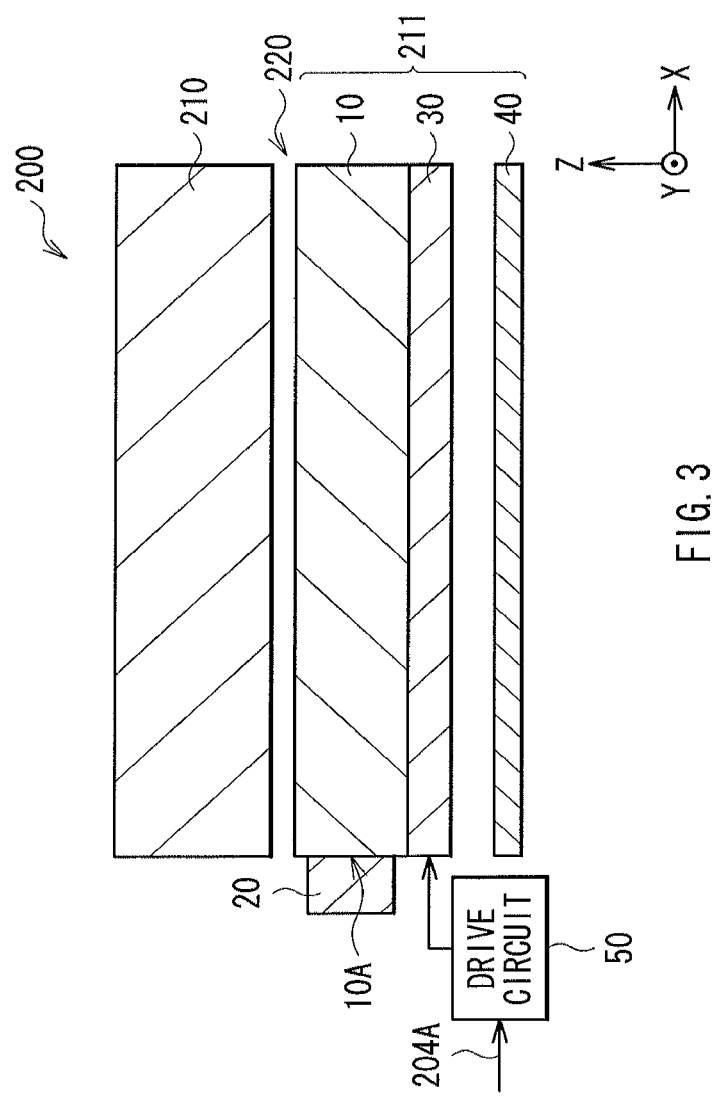
FIG. 3 is a sectional view illustrating an example of a configuration of a display section in the receiver-side unit in FIG. 1.

FIG. 3 illustrates an example of a sectional configuration of a display section of the receiver-side unit 200. It is to be noted that FIG. 3 is a schematic illustration, and dimensions and shapes in the illustration are not necessarily the same as actual dimensions and shapes. The receiver-side unit 200 includes the display panel 210 and the backlight 211 disposed behind the display panel 210.

The display panel 210 includes a plurality of pixels which are two-dimensionally arranged, and displays an image by driving respective pixels or specific pixels. The display panel 210 is, for example, a transmissive liquid crystal display panel (LCD) in which respective pixels or specific pixels are driven based on an image signal, and has a configuration in which a liquid crystal layer is sandwiched between a pair of transparent substrates. The display panel 210 includes a polarization plate, a transparent substrate, pixel electrodes, an alignment film, a liquid crystal layer, an alignment film, a common electrode, a color filter, a transparent substrate, and a polarization plate in order from the backlight 211.

The transparent substrates are configured of substrates transparent to visible light, for example, plate glass. It is to be noted that, for example, an active drive circuit (not illustrated) including TFTs (thin film transistors), wiring, and the like electrically connected to the pixel electrodes is formed on the transparent substrate located closer to the backlight 211. The pixel electrodes and the common electrode are made of, for example, indium tin oxide (ITO). The pixel electrodes are two-dimensionally arranged on the transparent substrate, and function as electrodes for respective pixels. On the other hand, the common electrode is formed on an entire surface of the color filter, and functions as a common electrode facing the respective pixel electrodes. The alignment films are made of a polymer material such as polyimide, and perform an alignment process on a liquid crystal.

The liquid crystal layer is made of, for example, a VA (Vertical Alignment) mode, TN (Twisted Nematic) mode or STN (Super Twisted Nematic) mode liquid crystal, and has a function of changing the direction of a polarizing axis of emitted light from the backlight 211 in each pixel by a voltage applied from the drive circuit (not illustrated). It is to be noted that liquid crystal alignment is changed in a stepwise manner to adjust the direction of a transmission axis of each pixel in a stepwise manner. In the color filter, color filters separating light having passed through the liquid crystal layer into, for example, three primary colors of red (R), green (G), and blue (B), or four colors such as R, G, B, and white (W), respectively, are arranged corresponding to the arrangement of the pixel electrodes.

The polarization plates are optical shutters of one kind, and allow only light (polarized light) in a certain vibration direction to pass therethrough. It is to be noted that the polarization plates may be absorption polarizers absorbing light (polarized light) in a vibration direction other than a transmission axis, but the polarization plates are preferably reflective polarizers reflecting light toward the backlight 211 in terms of an improvement in luminance. The two polarization plates are disposed to allow their polarizing axes to be different by 90° from each other, thereby allowing emitted light from the backlight 211 to pass therethrough via the liquid crystal layer, or to be shielded.

The backlight 211 illuminates, for example, the display panel 210 from a back side thereof, and includes a light guide plate 10, a light source 20 disposed on a side surface of the light guide plate 10, a light modulation device 30 and a reflective plate 40 disposed behind the light guide plate 10, and a drive circuit 50 driving the light modulation device 30. It is to be noted that the light guide plate 10 corresponds to a specific example of "first transparent substrate" or "second transparent substrate" in the application. The light source 20 corresponds to a specific example of "light source" in the application.

The light guide plate 10 guides light from the light source 20 disposed on the side surface of the light guide plate 10 to a top surface of the light guide plate 10. The light guide plate 10 has a shape corresponding to the display panel 210 disposed on the top surface of the light guide plate 10, for example, a rectangular parallelepiped shape surrounded by a top surface, a bottom surface, and side surfaces. It is to be noted that a side surface where light from the light source 20 enters of the side surfaces of the light guide plate 10 is hereinafter referred to as a "light incident surface 10A". It is to be noted that the light incident surface 10A corresponds to a specific example of "first end surface" in the application. In the light guide plate 10, one or both of the top surface and the bottom surface have a predetermined patterned shape, and the light guide plate 10 has a function of scattering and uniformizing light incident from the light incident surface 10A. It is to be noted that, in the case where a voltage applied to the backlight 211 is modulated to uniformize luminance, a flat light guide plate which is not patterned may be used as the light guide plate 10. The light guide plate 10 is formed by mainly including a transparent thermoplastic resin such as a polycarbonate resin (PC) or an acrylic resin (polymethylmethacrylate (PMMA)).

The light source 20 is a linear light source, and is configured of, for example, a hot cathode fluorescent lamp (HCFL), a cold cathode fluorescent lamp (CCFL), or a plurality of LEDs (Light Emitting Diodes) linearly arranged. In the case where the light source 20 is configured of a plurality of LEDs, all of the LEDs are preferably white LEDs in terms of efficiency, a reduction in profile, and uniformity. It is to be noted that the light source 20 may be configured of, for example, red LEDs, green LEDs, and blue LEDs. The light source 20 may be disposed on only one side surface of the light guide plate 10 (refer to FIG. 3), or on two side surfaces, three side surfaces, or all side surfaces of the light guide plate 10.

The reflective plate 40 returns light leaked from the back side of the light guide plate 10 through the light modulation device 30 to the light guide plate 10, and has, for example, functions such as reflection, diffusion, and scattering. The reflective plate 40 allows light emitted from the light source 20 to be efficiently used, and is also useful to improve front luminance. The reflective plate 40 is made of, for example, foamed PET (polyethylene terephthalate), a silver-evaporated film, a multilayer reflective film, or white PET. It is to be noted that, for example, the reflective plate 40 may not be included, as necessary.

Figure 4:
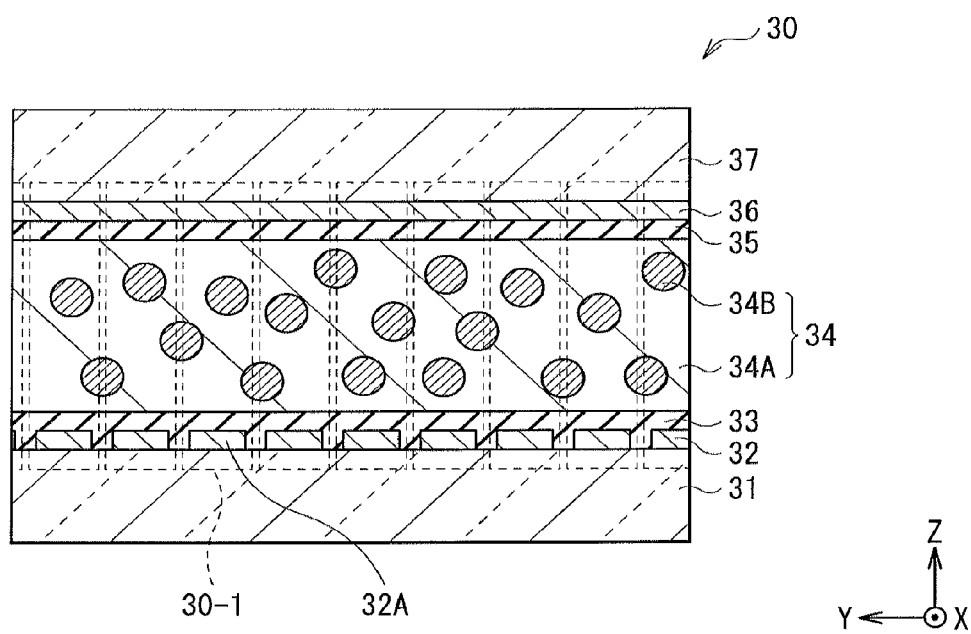
FIG. 4 is a sectional view illustrating an example of a configuration of a light modulation device in FIG. 3.

In the embodiment, the light modulation device 30 is in close contact with a back side (the bottom surface) of the light guide plate 10 without an air layer in between, and is bonded to the back side of the light guide plate 10 with, for example, an adhesive (not illustrated) in between. For example, as illustrated in FIG. 4, the light modulation device 30 is configured by arranging a transparent substrate 31, a lower electrode 32, an alignment film 33, a light modulation layer 34, an alignment film 35, an upper electrode 36, and a transparent substrate 37 in order from the reflective plate 40.

The transparent substrates 31 and 37 support the light modulation layer 34, and are typically configured of substrates transparent to visible light, for example, glass plates or plastic films. The lower electrode 32 is disposed on a surface located closer to the transparent substrate 37 of the transparent substrate 31, and, for example, as illustrated in FIG. 4, the lower electrode 32 is configured of a plurality of sub-electrodes 32A. It is to be noted that the sub-electrodes 32A corresponds to a specific example of "first strip-like electrodes" in the application.

When three-dimensional display is performed in the receiver-side unit 200, two or more specific sub-electrodes 32A (hereinafter referred to as "sub-electrodes 32a") selected from the plurality of sub-electrodes 32A are used to generate strip-like illumination light beams (refer to FIG. 5). It is to be noted that the strip-like illumination light beams generated by the sub-electrodes 32a correspond to a specific example of "first strip-like illumination light beams" in the application. The strip-like illumination light beams generated by the sub-electrodes 32a each have a shape corresponding to a shape of the sub-electrode 32a, and each have a strip-like light emission shape extending in a direction intersecting with or orthogonal (or substantially orthogonal) to the light incident surface 10A. In other words, the sub-electrodes 32a each have a shape corresponding to the light emission shape of each of the strip-like illumination light beams generated by the sub-electrodes 32a. It is to be noted that an angle between each of the strip-like illumination light beams generated by the sub-electrodes 32a and the light incident surface 10 corresponds to a specific example of "first angle" in the application.

The two or more sub-electrodes 32a are arranged with a pixel pitch P1 corresponding to (equal to or close to) a pixel pitch P2 (refer to FIG. 34) when three-dimensional display is performed in the receiver-side unit 200. When two-dimensional display is performed in the receiver-side unit 200, other sub-electrodes 32A (hereinafter referred to as "sub-electrodes 32b and 32c") except for the sub-electrodes 32a are used with the sub-electrodes 32a to generate planar illumination light. In other words, when two-dimensional display is performed in the receiver-side unit 200, all sub-electrodes 32A are used to generate planar illumination light. The sub-electrodes 32a, 32b, and 32c are arranged in this order in an arrangement direction (a direction orthogonal to the light incident surface 10A), and a plurality of combinations of the sub-electrodes 32a, 32b, and 32c are arranged in the arrangement direction.

The sub-electrodes 32A each have a strip-like shape extending in one direction in a plane as well as in a direction intersecting with or orthogonal (or substantially orthogonal) to the light incident surface 10A. The sub-electrodes 32A each have a strip-like shape extending in an extending direction of strip-like illumination light beams generated by the sub-electrodes 32A. For example, as illustrated in FIG. 5, in each of the sub-electrodes 32A, an area of a portion used for one pixel 210a in the display panel 210 (an area of a gray portion in the drawing) varies with a distance from the light source 20. Therefore, the strip-like illumination light beams generated by the sub-electrodes 32A each also have a strip-like shape extending in one direction in the plane as well as in a direction intersecting with or orthogonal (or substantially orthogonal) to the light incident surface 10A. Moreover, a light emission area per unit area of each of the strip-like illumination light beams generated by the sub-electrodes 32A also varies with the distance from the light source 20.

More specifically, the width of each sub-electrode 32A varies with the distance from the light source 20, and is smaller at a shorter distance from the light source 20 and larger at a longer distance from the light source 20. For example, as illustrated in FIG. 5, the width of each sub-electrode 32A is increased in proportion to the distance from the light source 20. Therefore, the width of each of the strip-like illumination light beams generated by the sub-electrodes 32A also varies with the distance from the light source 20, and is smaller at a shorter distance from the light source 20 and larger at a longer distance from the light source 20. For example, although not illustrated, the width of each of the strip-like illumination light beams generated by the sub-electrodes 32A is increased in proportion to the distance from the light source 20.

It is to be noted that, in the case where the width of each of the sub-electrodes 32A varies with the distance from the light source 20, the shapes of the respective sub-electrodes 32A are preferably adjusted to allow central lines in a width direction thereof to be parallel to one another. In this case, central lines in a width direction of the respective strip-like illumination light beams are parallel to one another. It is to be noted that the widths of the respective sub-electrodes 32A may be uniform at ends thereof located farthest from or closest to the light source 20.

Figure 5:
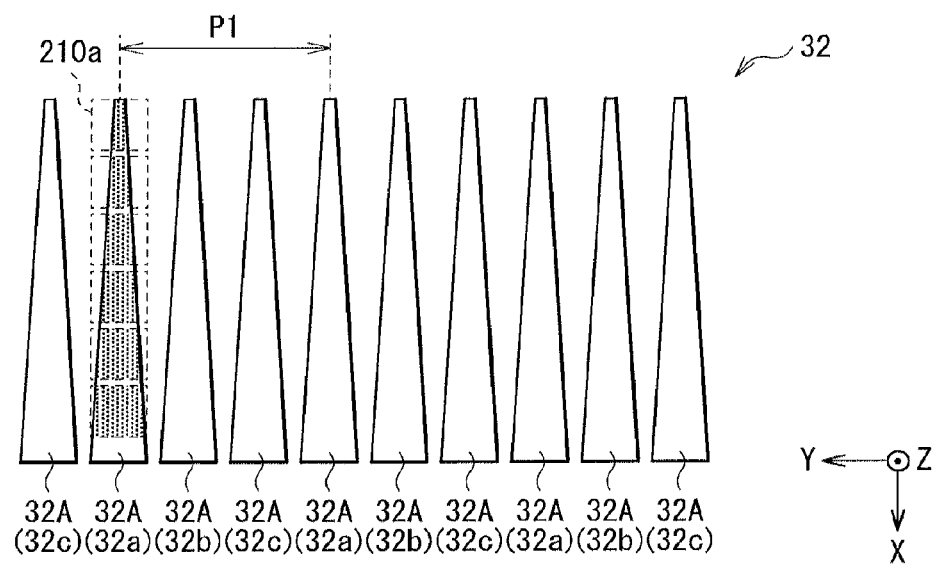
FIG. 5 is a plan view illustrating an example of a configuration of a lower electrode in FIG. 4.
Figure 6:
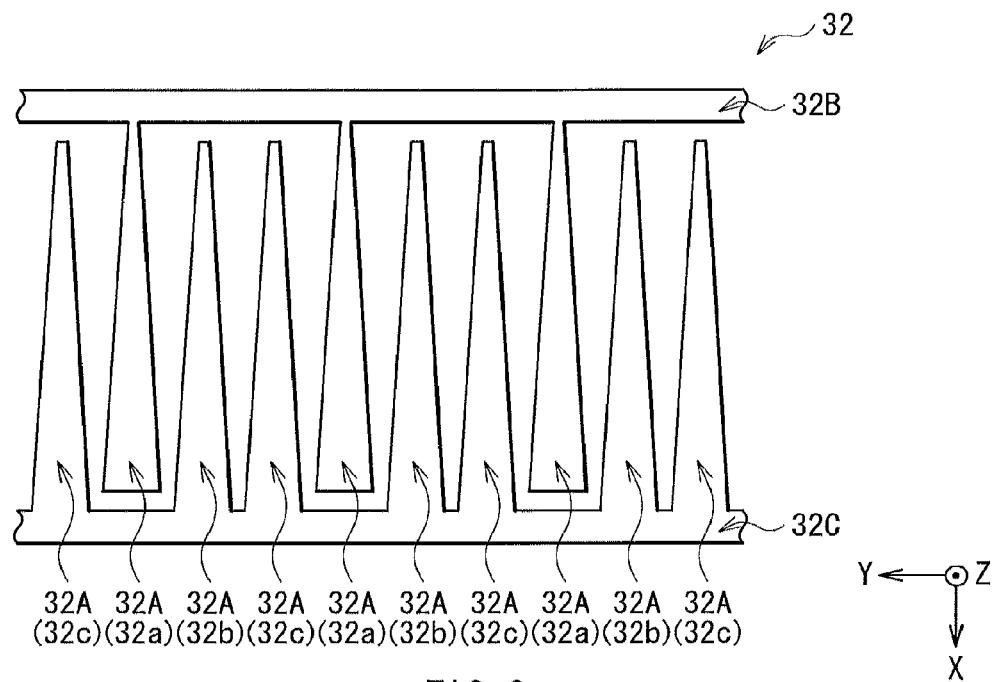
FIG. 6 is a plan view illustrating a first modification of the configuration of the lower electrode in FIG. 5.
Figure 7:
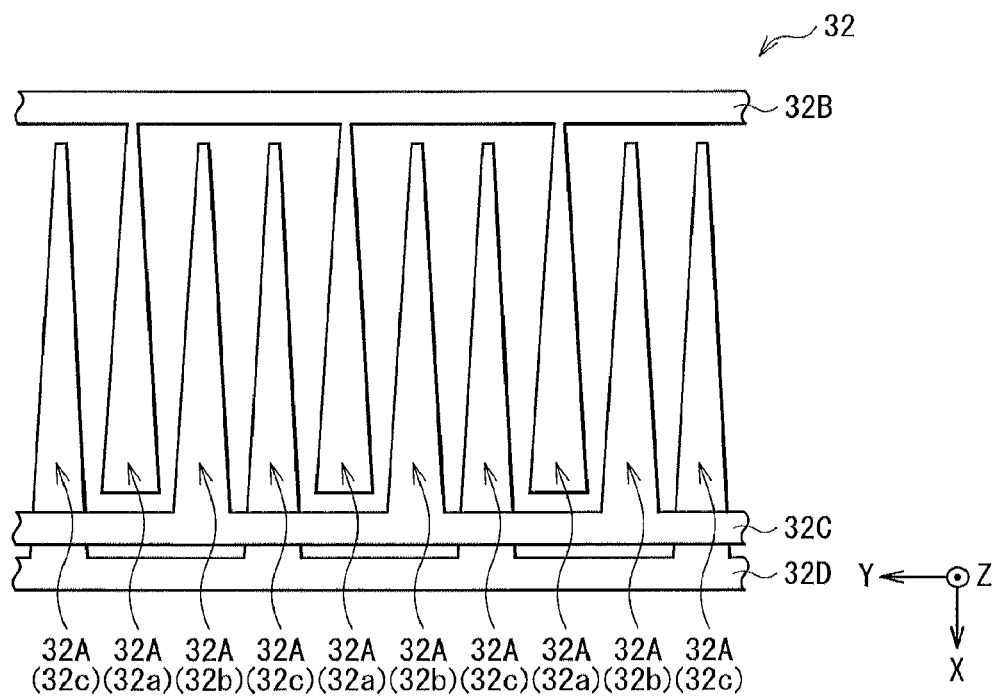
FIG. 7 is a plan view illustrating a second modification of the configuration of the lower electrode in FIG. 5.

For example, as illustrated in FIG. 5, the sub-electrodes 32A may be formed separately from one another and may be allowed to be driven independently of one another; however, all of the sub-electrodes 32a may be electrically connected to one another. For example, as illustrated in FIG. 6, all of the sub-electrodes 32a may be electrically connected to one another through a wiring line 32B extending in the arrangement direction. Moreover, for example, all of the sub-electrodes 32b and 32c may be electrically connected to one another. For example, as illustrated in FIG. 6, all of the sub-electrodes 32b and 32c may be electrically connected to one another through a wiring line 32C extending in the arrangement direction. It is to be noted that, in the case where multi-perspective display is performed in two-dimensional display, the sub-electrodes 32b and the sub-electrodes 32c are preferably electrically separated from each other. In this case, for example, as illustrated in FIG. 7, all of the sub-electrodes 32b may be electrically connected to one another through the wiring line 32C extending in the arrangement direction, and all of the sub-electrodes 32c may be electrically connected to one another through a wiring line 32D extending in the arrangement direction. It is to be noted that the wiring lines 32B and 32C correspond to specific examples of "first wiring line" in the application.

Figure 8:
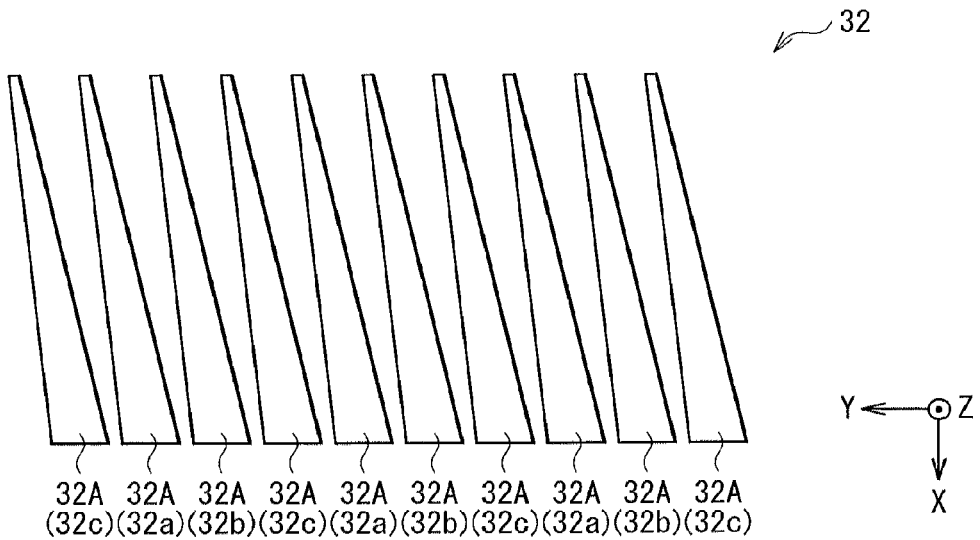
FIG. 8 is a plan view illustrating a third modification of the configuration of the lower electrode in FIG. 5.
Figure 9:
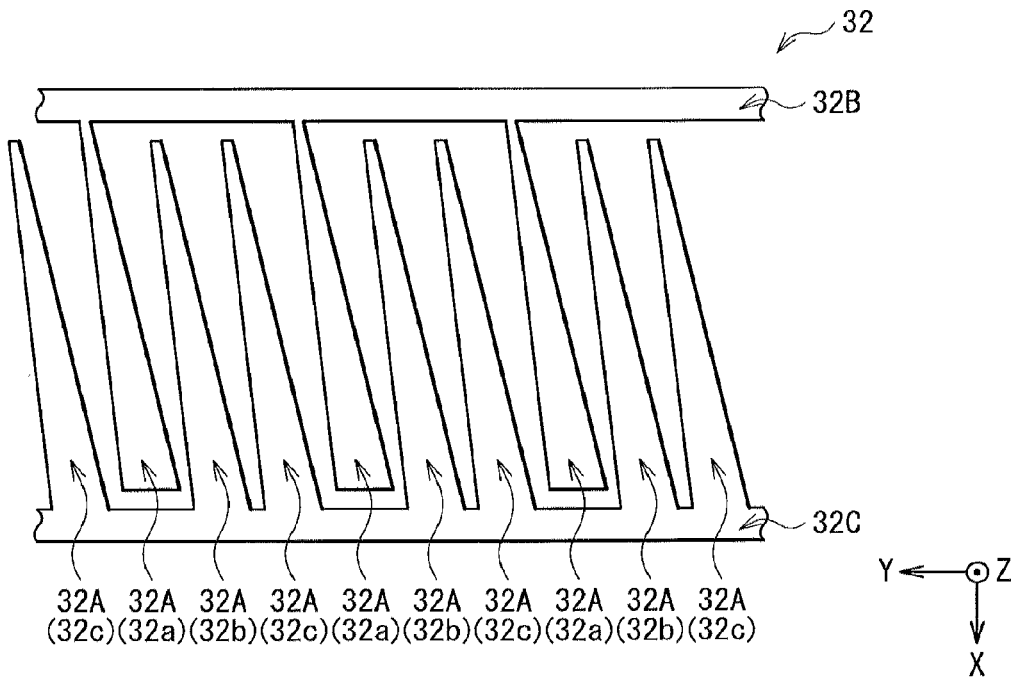
FIG. 9 is a plan view illustrating a fourth modification of the configuration of the lower electrode in FIG. 5.
Figure 10:
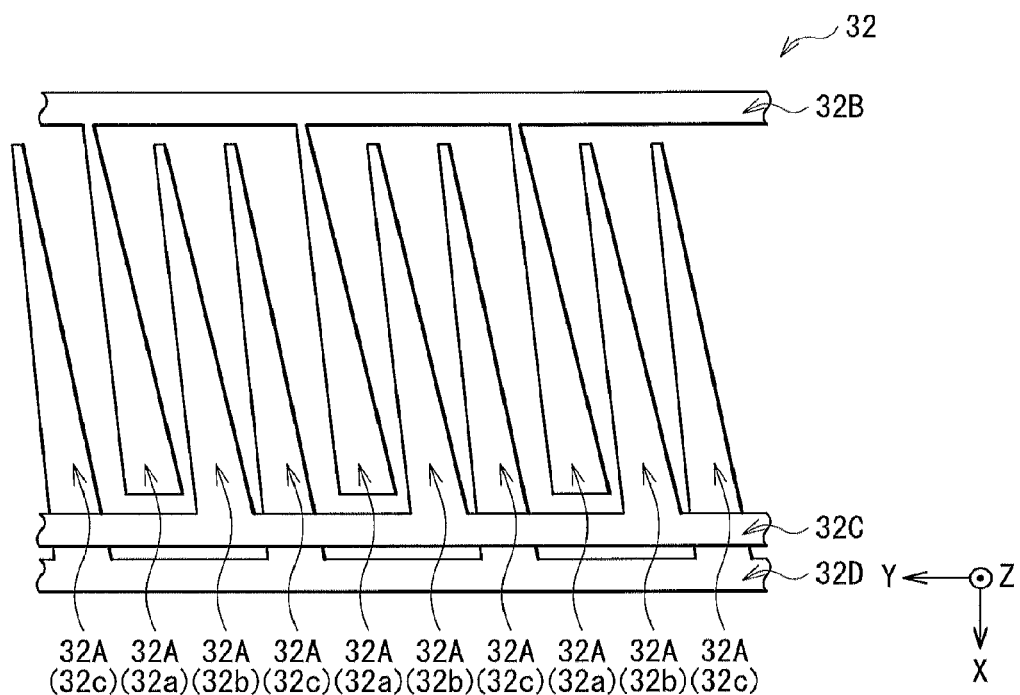
FIG. 10 is a plan view illustrating a fifth modification of the configuration of the lower electrode in FIG. 5.

For example, as illustrated in FIGS. 8, 9, and 10, the sub-electrodes 32A may extend in a direction diagonally intersecting with a normal to the light incident surface 10A. At this time, the strip-like illumination light beams also extend in the direction diagonally intersecting with the normal to the light incident surface 10A, and the sub-electrodes 32A are arranged in the extending direction of the strip-like illumination light beams generated by the sub-electrodes 32A as well as in a direction intersecting with the strip-like illumination light beams. It is to be noted that, in the case where the sub-electrodes 32A (or the strip-like illumination light beams) extend in the direction diagonally intersecting with the normal to the light incident surface 10A, the extending direction of the sub-electrodes 32A (or the strip-like illumination light beams) preferably extends in a direction intersecting with a pixel arrangement direction of the display panel 210. In such a case, as will be described in detail later, a difference between resolution in a direction parallel to the normal to the light incident surface 10A and resolution in a direction parallel to the light incident surface 10A is allowed to be reduced.

Figure 11:
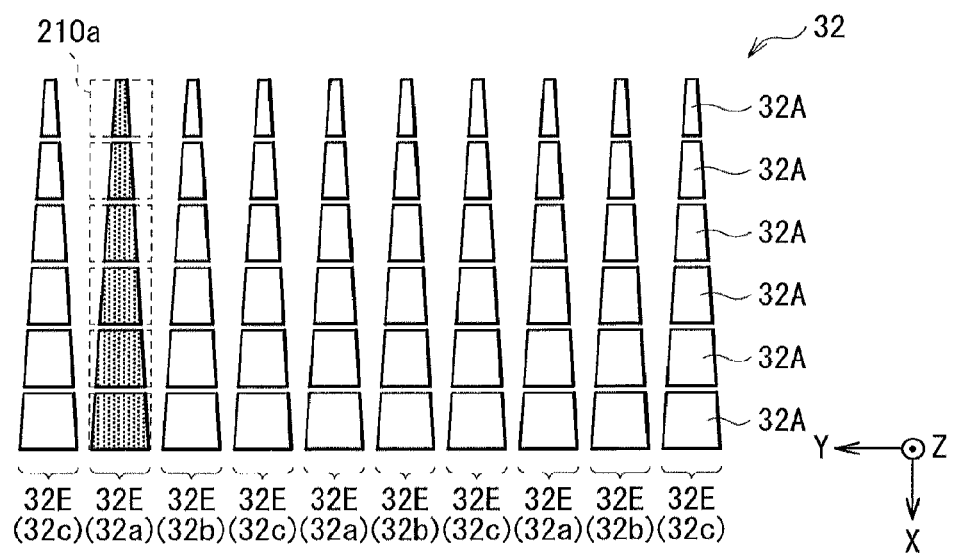
FIG. 11 is a plan view illustrating a sixth modification of the configuration of the lower electrode in FIG. 5.
Figure 12:
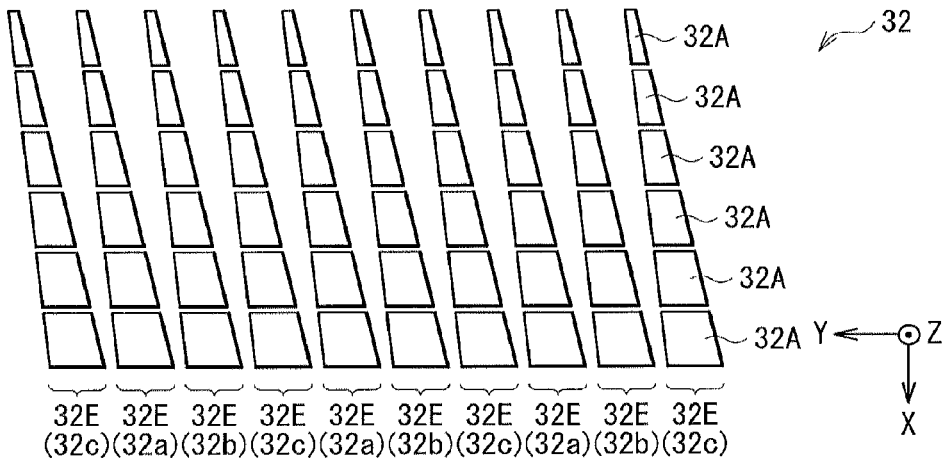
FIG. 12 is a plan view illustrating a seventh modification of the configuration of the lower electrode in FIG. 5.
Figure 13:
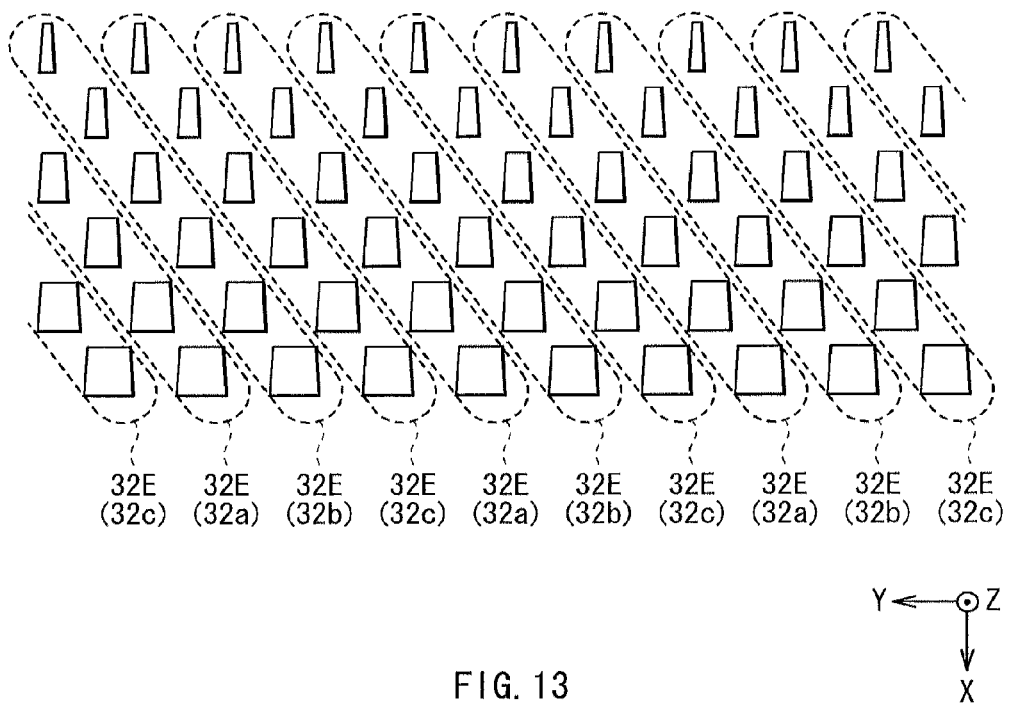
FIG. 13 is a plan view illustrating an eighth modification of the configuration of the lower electrode in FIG. 5.

Moreover, for example, as illustrated in FIGS. 11, 12, and 13, the plurality of sub-electrodes 32A may each have a block shape, and may be two-dimensionally arranged. In this case, illumination light beams generated by the sub-electrodes 32A are block-like illumination light beams, and illumination light generated by two or more of the sub-electrodes 32A linearly arranged has a light emission shape in which a plurality of block-like illumination light beams are linearly arranged. It is to be noted that, in FIGS. 11 and 12, a state where the plurality of the sub-electrodes 32A are arranged in lines is illustrated. On the other hand, FIG. 13 illustrates a state where each of the sub-electrodes 32A is displaced from other adjacent sub-electrodes 32A in a horizontal direction (a Y-axis direction) by a width of the pixel 210a. It is to be noted that the sub-electrodes 32A in this case correspond to a specific example of "first sub-electrodes" in the application.

In this case, when a combination of two or more of the plurality of sub-electrodes 32A is considered as one linear electrode 32E, for example, as illustrated in FIG. 11, an area of a portion used for one pixel 210a in the display panel 210 (an area of a gray portion in the drawing) of each linear electrode 32E varies with the distance from the light source 20. Therefore, in this case, the light emission area per unit area of each of the strip-like illumination light beams generated by the linear electrodes 32E also varies with the distance from the light source 20. It is to be noted that the linear electrode 32E corresponds to a specific example of "virtual strip-like electrode" in the application.

More specifically, the width of each linear electrode 32E varies with the distance from the light source 20, and is smaller at a shorter distance from the light source 20 and larger at a longer distance from the light source 20. For example, as illustrated in FIGS. 11, 12, and 13, the width of each linear electrode 32E is increased in proportion to the distance from the light source 20. Therefore, the width of a strip-like illumination light beam generated by the linear electrode 32E varies with the distance from the light source 20, and is smaller at a shorter distance from the light source 20 and larger at a longer distance from the light source 20. For example, although not illustrated, the width of the strip-like illumination light beam generated by the linear electrode 32E is increased in proportion to the distance from the light source 20.

It is to be noted that, in the case where the width of each of the sub-electrodes 32A varies with the distance from the light source 20, the shape of each of the sub-electrodes 32A is preferably adjusted to allow a barycenter thereof to be placed on one line. In this case, central lines in a width direction of respective linear electrodes 32E (or respective strip-like illumination light beams generated by the linear electrodes 32E) are parallel to one another. It is to be noted that the widths of the respective linear electrodes 32E may be uniform at ends thereof located farthest from or closest to the light source 20.

Figure 14:
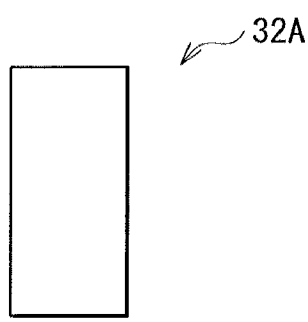
FIG. 14 is a plan view illustrating a ninth modification of the configuration of the lower electrode in FIG. 5.
Figure 15:
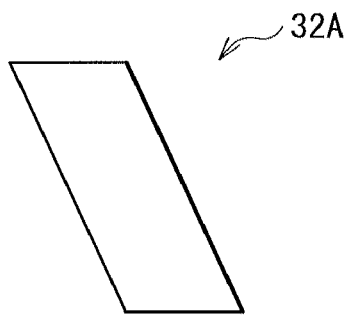
FIG. 15 is a plan view illustrating a tenth modification of the configuration of the lower electrode in FIG. 5.

It is to be noted, in some cases, an area of a portion used for one pixel 210a in the display panel 210 of each sub-electrode 32A may be uniform irrespective of the distance from the light source 20. For example, as illustrated in FIGS. 14 and 15, the width of each sub-electrode 32A may be uniform.

Figure 16:
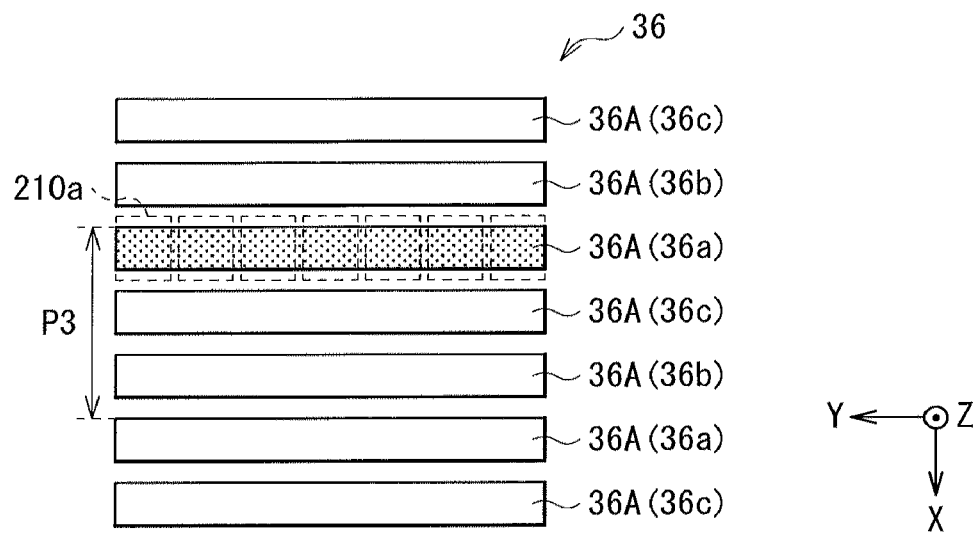
FIG. 16 is a plan view illustrating an example of a configuration of an upper electrode in FIG. 4.

The upper electrode 36 is disposed on a surface located closer to the transparent substrate 31 of the transparent substrate 37, and, for example, as illustrated in FIG. 16, the upper electrode 36 is configured of a plurality of sub-electrodes 36A. It is to be noted that the sub-electrodes 36A corresponds to a specific example of "second strip-like electrodes" in the application. When three-dimensional display is performed in the receiver-side unit 200, two or more specific sub-electrodes 36A (hereinafter referred to as "sub-electrodes 36a") selected from the plurality of sub-electrodes 36A are used to generate strip-like illumination light beams. It is to be noted that the strip-like illumination light beams generated by the sub-electrodes 36a correspond to a specific example of "second strip-like illumination light beams" in the application. The strip-like illumination light beams generated by the sub-electrodes 36a each have a shape corresponding to a shape of the sub-electrode 36a, and each have a strip-like light emission shape extending in a direction intersecting with or orthogonal (or substantially orthogonal) to the normal to the light incident surface 10A. In other words, the sub-electrodes 36a each have a shape corresponding to the light emission shape of each of the strip-like illumination light beams generated by the sub-electrodes 36a. It is to be noted that an angle between each of the strip-like illumination light beams generated by the sub-electrodes 36a and the light incident surface 10A is smaller than the angle between each of the strip-like illumination light beams generated by the sub-electrodes 32a and the light incident surface 10A.

The two or more sub-electrodes 36a are arranged with a pitch P3 corresponding to (equal to or close to) the pixel pitch P2 (refer to FIG. 34) when three-dimensional display is performed in the receiver-side unit 200. When two-dimensional display is performed in the receiver-side unit 200, other sub-electrodes 36A (hereinafter referred to as "sub-electrodes 36b and 36c") except for the sub-electrodes 36a are used with the sub-electrodes 36a to generate planar illumination light. In other words, when two-dimensional display is performed in the receiver-side unit 200, all sub-electrodes 36A are used to generate planar illumination light. The sub-electrodes 36a, 36b, and 36c are arranged in this order in an arrangement direction (a direction orthogonal to the light incident surface 10A), and a plurality of combinations of the sub-electrodes 36a, 36b and 36c are arranged in the arrangement direction.

The sub-electrodes 36A each have a strip-like shape extending in one direction in a plane as well as in a direction intersecting with or orthogonal (or substantially orthogonal) to the normal to the light incident surface 10A. The sub-electrodes 36A each have a strip-like shape extending in the extending direction of strip-like illumination light beams generated by the sub-electrodes 36A. For example, an area of a portion used for one pixel 210a in the display panel 210 in each of the sub-electrodes 36A may be uniform irrespective of the distance from the light source 20. For example, as illustrated in FIG. 16, the width of each of the sub-electrodes 36A is uniform. It is to be noted that the width of the each of the sub-electrode 36A may be nonuniform.

Figure 17:
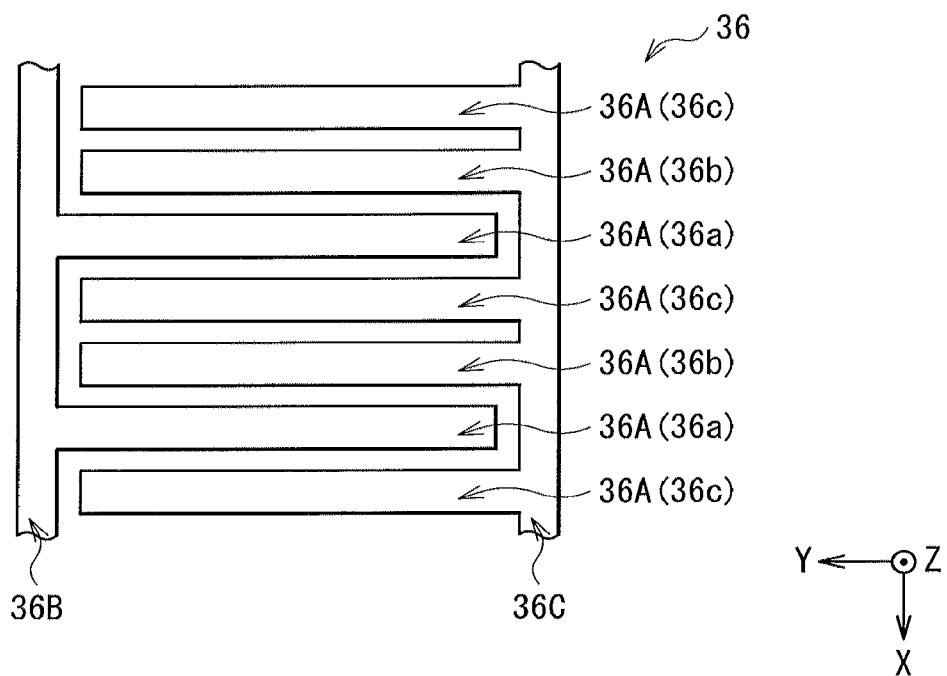
FIG. 17 is a plan view illustrating a first modification of the configuration of the upper electrode in FIG. 16.
Figure 18:
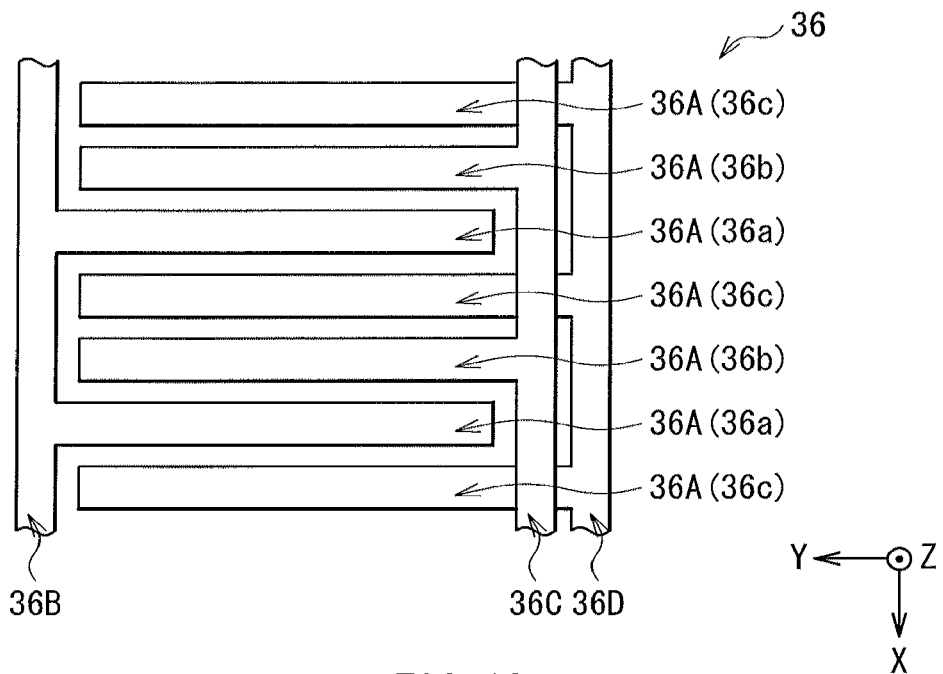
FIG. 18 is a plan view illustrating a second modification of the configuration of the upper electrode in FIG. 16.

For example, as illustrated in FIG. 16, the sub-electrodes 36A may be formed separately from one another and may be allowed to be driven independently of one another; however, all of the sub-electrodes 36a may be electrically connected to one another. For example, as illustrated in FIG. 17, all of the sub-electrodes 36a may be electrically connected to one another through a wiring line 36B extending in the arrangement direction. Moreover, for example, all of the sub-electrodes 36b and 36c may be electrically connected to one another. For example, as illustrated in FIG. 17, all of the sub-electrodes 36b and 36c may be electrically connected to one another through a wiring line 36C extending in the arrangement direction. It is to be noted that, in the case where multi-perspective display is performed in two-dimensional display, the sub-electrodes 36b and the sub-electrodes 36c are preferably electrically separated from each other. In this case, for example, as illustrated in FIG. 18, all of the sub-electrodes 36b may be electrically connected to one another through the wiring line 36C extending in the arrangement direction, and all of the sub-electrodes 36c may be electrically connected to one another through a wiring line 36D extending in the arrangement direction. It is to be noted that the wiring lines 36B and 36C correspond to specific examples of "second wiring line" in the application.

Figure 19:
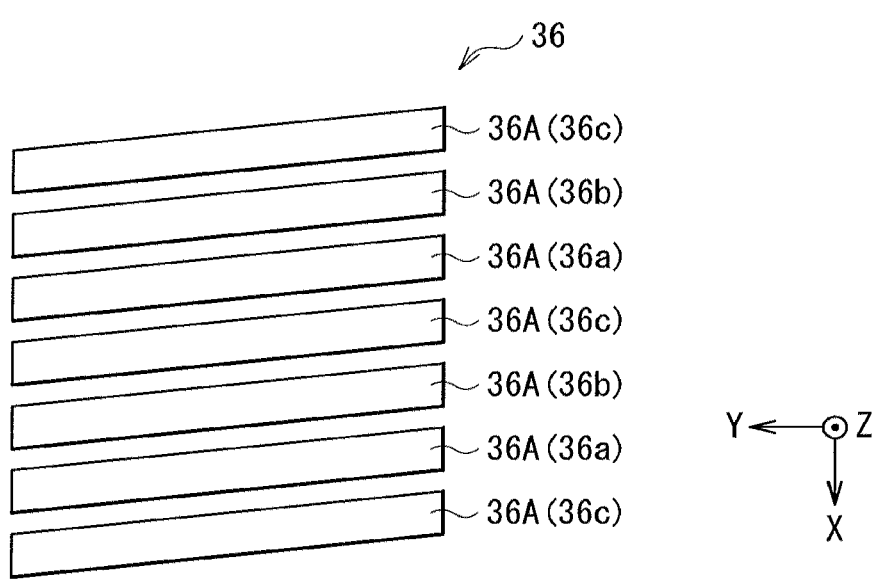
FIG. 19 is a plan view illustrating a third modification of the configuration of the upper electrode in FIG. 16.
Figure 20:
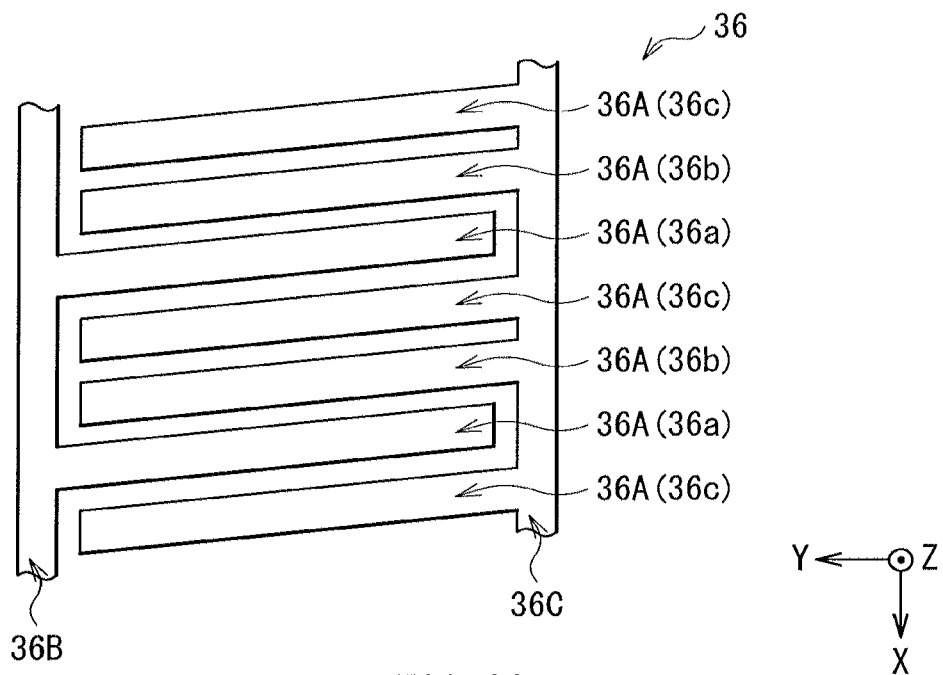
FIG. 20 is a plan view illustrating a fourth modification of the configuration of the upper electrode in FIG. 16.
Figure 21:
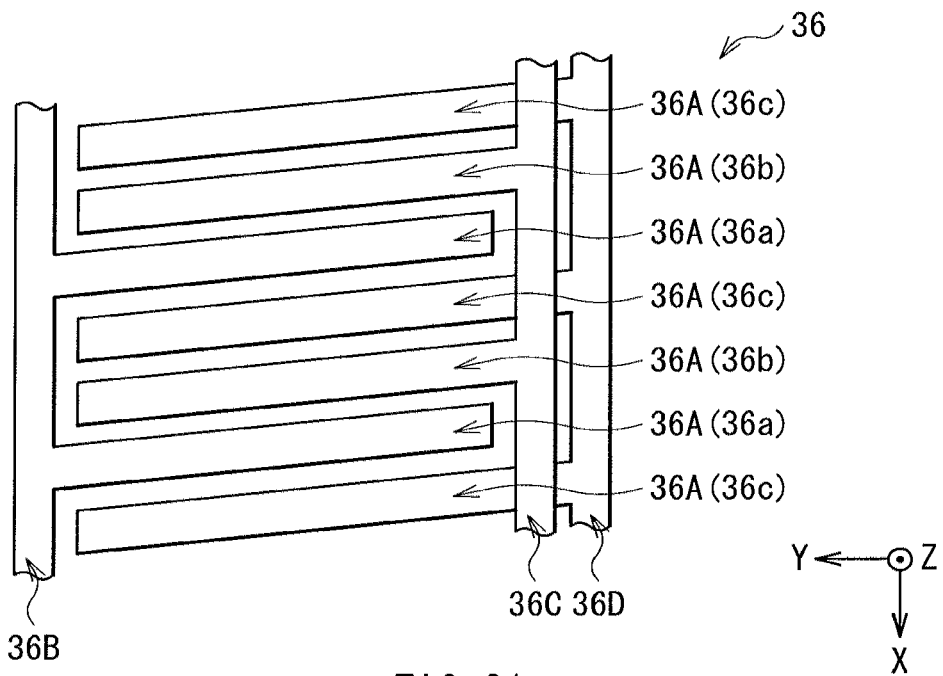
FIG. 21 is a plan view illustrating a fifth modification of the configuration of the upper electrode in FIG. 16.

For example, as illustrated in FIGS. 19, 20, and 21, the sub-electrodes 36A may extend in a direction diagonally intersecting with the light incident surface 10A. At this time, the strip-like illumination light beams generated by the sub-electrodes 36A extend in the direction diagonally intersecting with the light incident surface 10A, and the sub-electrodes 36A are arranged in the extending direction of the strip-like illumination light beams generated by the sub-electrodes 36A and in a direction intersecting with the strip-like illumination light beams. It is to be noted that, in the case where the sub-electrodes 36A (or the strip-like illumination light beams) extend in the direction diagonally intersecting with the light incident surface 10A, the extending direction of the sub-electrodes 36A (or the strip-like illumination light beams) preferably extends in a direction intersecting with the pixel arrangement direction of the display panel 210. In such a case, as will be described in detail later, a difference between resolution in a direction parallel to the normal to the light incident surface 10A and resolution in a direction parallel to the light incident surface 10A is allowed to be reduced.

Figure 22:
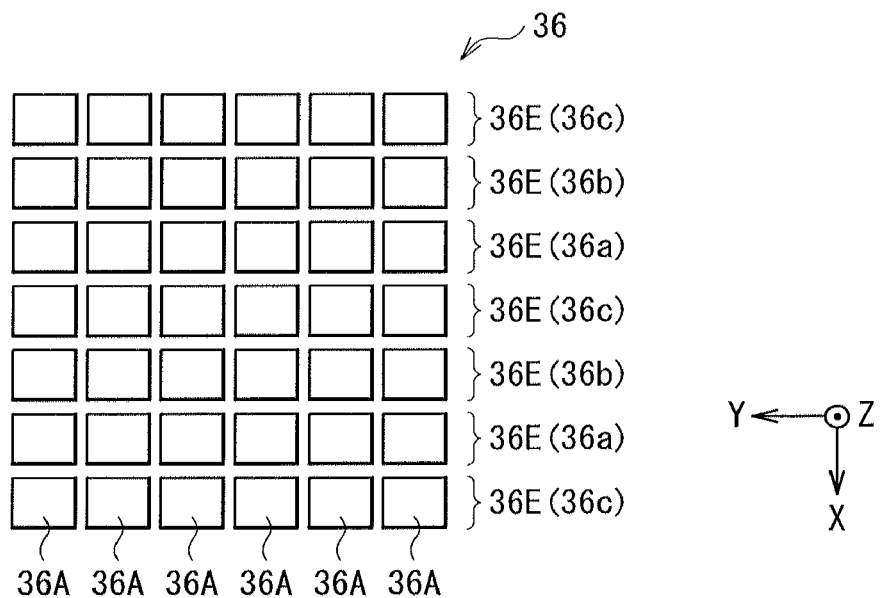
FIG. 22 is a plan view illustrating a sixth modification of the configuration of the upper electrode in FIG. 16.
Figure 23:
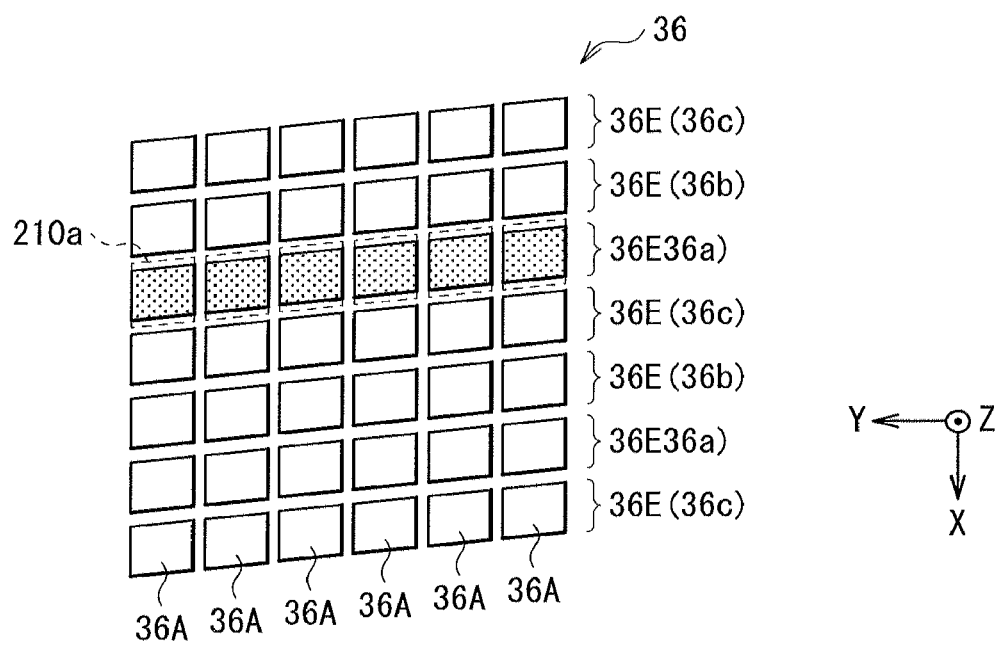
FIG. 23 is a plan view illustrating a seventh modification of the configuration of the upper electrode in FIG. 16.

Moreover, for example, as illustrated in FIGS. 22 and 23, the plurality of the sub-electrodes 36A may each have a block shape, and may be two-dimensionally arranged. In this case, when a combination of two or more of the plurality of the sub-electrodes 36A are considered as one linear electrode 36E, for example, an area of a portion used for one pixel 210a in the display panel 210 (an area of a gray portion in the drawing) of each linear electrode 32E is uniform irrespective of the distance from the light source 20. For example, the width of each linear electrode 36E is uniform. It is to be noted that the sub-electrodes 36A in this case correspond to a specific example of "second sub-electrodes" in the application. It is to be noted that the width of each linear electrode 36E may be nonuniform.

Figure 24:
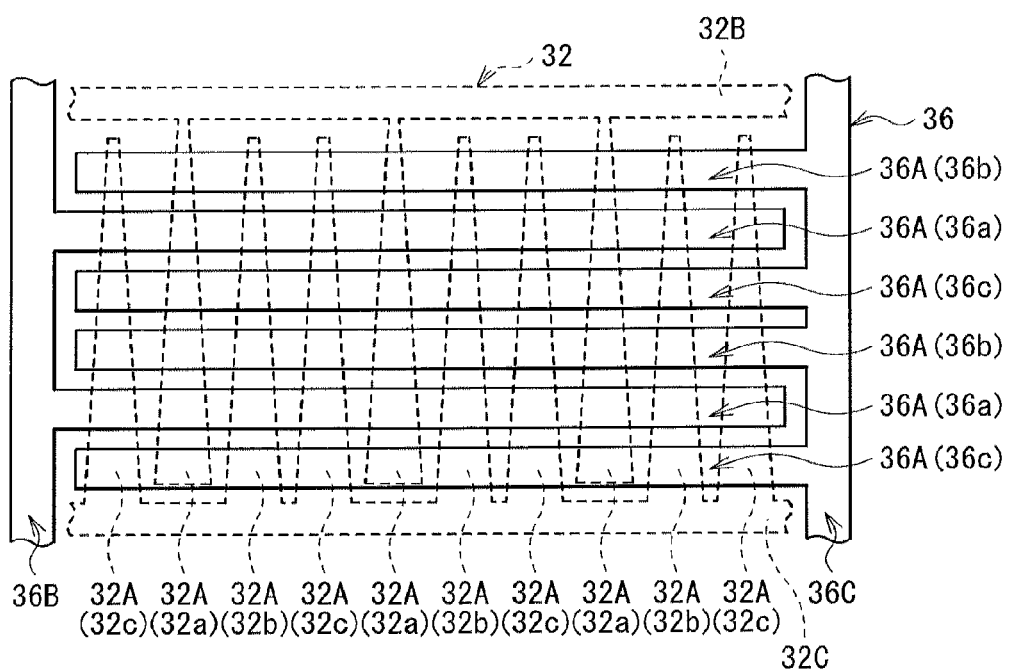
FIG. 24 is a plan view illustrating an example of superimposition of the lower electrode in FIG. 6 and the upper electrode in FIG. 17.

For example, as illustrated in FIG. 24, the sub-electrodes 36A are formed in a region facing the sub-electrodes 32A of the lower electrode 32, and are not formed in regions facing the wiring lines 32B and 32C of the lower electrode 32. Likewise, for example, as illustrated in FIG. 24, the sub-electrodes 32A are formed in a region facing the sub-electrodes 36A of the upper electrode 36, and are not formed in regions facing the wiring lines 36B and 36C of the upper electrode 36. It is because, in the case where the sub-electrodes 36A and the wiring lines 32B and 32C face each other, or the sub-electrodes 32A and the wiring lines 36B and 36C face each other, when a voltage is applied to the wiring lines 32B, 32C, 36B, and 36C, portions facing the wiring lines 32B, 32C, 36B, and 36C of the light modulation layer 34 are driven to extract unnecessary light.

The upper electrode 36 (an electrode on a top surface of the backlight 211) or both of the lower electrode 32 and the upper electrode 36 each are configured of a transparent conductive film. The transparent conductive film preferably has, for example, a property represented by the following expression (refer to FIG. 25A). The transparent conductive film is configured of, for example, a film including ITO (hereinafter referred to as "ITO film"). It is to be noted that the lower electrode 32 and the upper electrode 36 may be made of indium zinc oxide (IZO), a metal nanowire, a carbon nanotube, graphene, or the like.

$$|A1-A2| \le 2.00$$

A1: Maximum light absorptance (%) within a range of 450 nm to 650 nm
A2: Minimum light absorptance (%) within a range of 450 nm to 650 nm As visible light is used as illumination light beams, a difference in light absorption of the transparent conductive film is preferably small within a range of 380 to 780 nm. A difference between a maximum value and a minimum value of light absorptance within a range of 380 to 780 nm is preferably 10.00 or less, and more preferably 7.00 or less. In particular, in the case where the transparent conductive film is applied to a backlight or the like, a difference between a maximum value and a minimum value of light absorptance within a wavelength region range of a used light source is preferably 2.00 or less, and more preferably 1.00 or less. In the case where a typical LED is used as a light source, a difference between a maximum value and a minimum value of light absorptance within a range of 450 to 650 nm is preferably 2.00 or less, and more preferably 1.00 or less. It is to be noted that absorptance was measured with use of V-550 manufactured by JASCO Corporation, and reflectivity and transmittance of light incident at 5° from a direction of a normal to a substrate were measured, and a value obtained by subtracting values of the reflectivity and the transmittance from 100% was determined as absorptance.

Figure 25A:
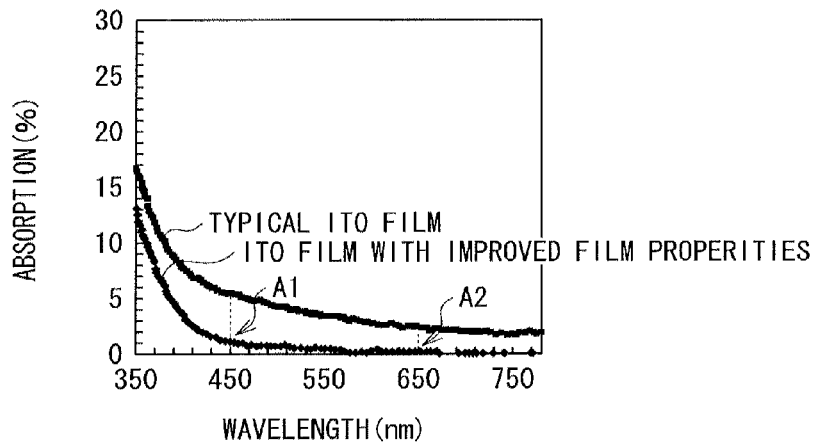
FIGS. 25A to 25C are diagrams illustrating an example of optical properties of an ITO film and positional dependence of chromaticity change in a backlight.
Figure 25B:
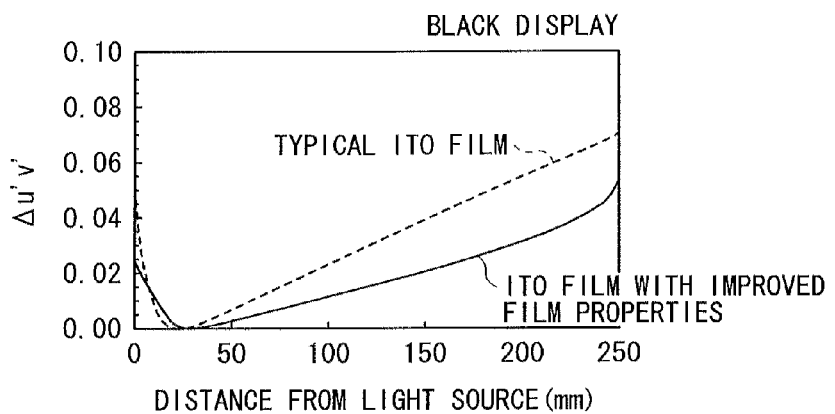
Figure 25C:
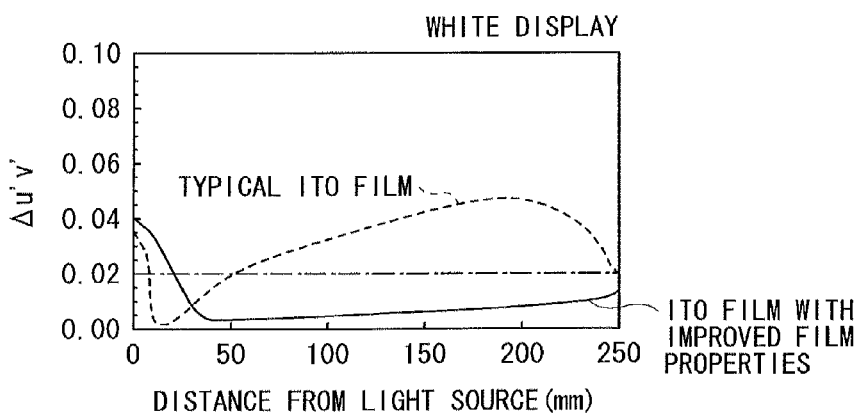
Figure 26A:
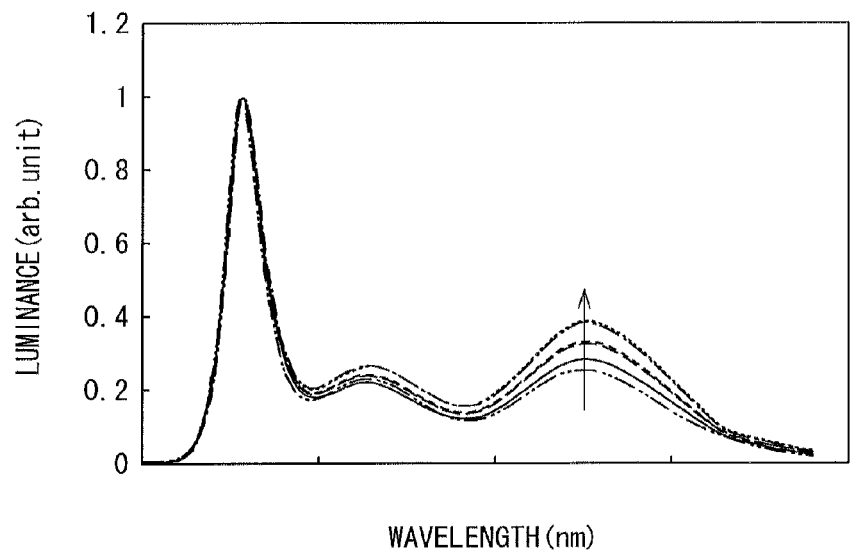
FIGS. 26A and 26B are diagrams illustrating an example of positional dependence of guided light spectrum.
Figure 26B:
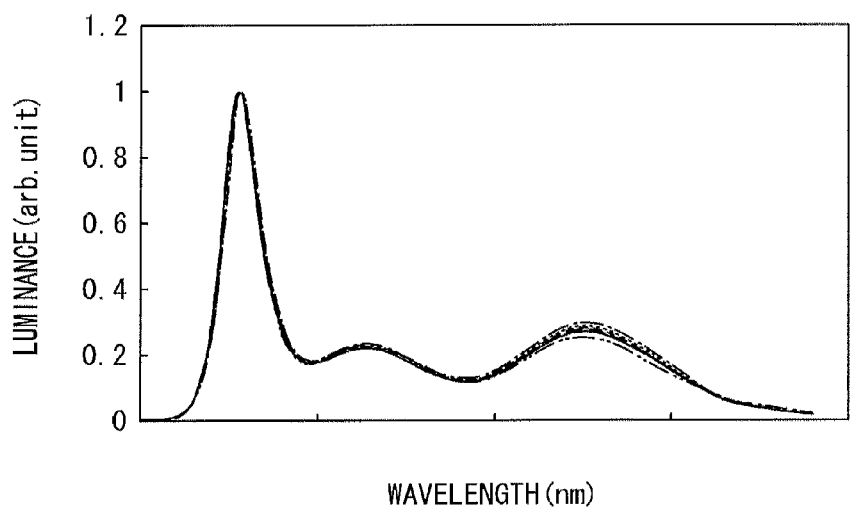

In the case where the transparent conductive film has the property represented by the above-described expression, when light emitted from the light source 20 repeatedly passes through the transparent conductive film in the light modulation device 30 in a process of propagating the light through the light guide plate 10, wavelength dependence of absorption in the transparent conductive film is suppressed. In the case where the transparent conductive film is configured of a typical ITO film, for example, as illustrated by broken lines in FIGS. 25B and 25C and an arrow in FIG. 26A, a long-wavelength-side component is increased with an increase in a distance from the light source 20. On the other hand, in the case where the transparent conductive film is configured of an ITO film, with improved film properties, which has the above-described property represented by the above-described expression, for example, as illustrated by solid lines in FIGS. 25B, 25C, and FIG. 26B, a rate of increase of the long-wavelength-side component with the distance from the light source 20 is reduced. It is to be noted that Δu'v' on a vertical axis in FIGS. 25B and 25C is a barometer indicating that the long-wavelength-side component is increased with an increase in the value of Δu'v'.

Moreover, for example, in the case where one or both of a pair of the lower electrode 32 and the upper electrode 36 included in the light modulation device 30 each are configured of an ITO film, a dye or a pigment absorbing light on a long wavelength side more than light on a short wavelength side is preferably included in some part (for example, one or both of the light guide plate 10 and the light modulation device 30) of an optical path guiding light. As the above-described dye or pigment, a known material is allowed to be used. In particular, in the case where a process of applying ultraviolet light is included in formation of the light modulation layer 34, for example, after the light modulation device 30 is formed, the light guide plate 10 including the dye or the pigment and the light modulation device 30 are preferably bonded together, or a part including the dye or the pigment is preferably protected from ultraviolet light by an ultraviolet absorption layer to prevent damage due to ultraviolet light. When light emitted from the light source 20 repeatedly passes through the light modulation device 30 in a process of propagating the light through the light guide plate 10, wavelength dependence of absorption of the light modulation device 30 including an ITO film is suppressed by adding the above-described dye or pigment to some part in the optical path guiding light in the above-described manner.

However, the lower electrode 32 (an electrode on a bottom surface of the backlight 211) may not be made of a transparent material, and may be made of, for example, metal. It is to be noted that, in the case where the lower electrode 32 is made of metal, the lower electrode 32 also has a function of reflecting light entering from a back side of the light guide plate 10 into the light modulation device 30 as in the case of the reflective plate 40. Therefore, in this case, for example, the reflective plate 40 may not be included.

Portions in positions, where the lower electrode 32 and the upper electrode 36 face each other in the case where the lower electrode 32 and the upper electrode 36 are viewed from a direction of a normal to the light modulation device 30, of the light modulation device 30 configure light modulation cells 30-1 (refer to FIG. 4). The light modulation cells 30-1 are portions in positions, where the sub-electrodes 32A and the sub-electrode 36B face each other, of the light modulation device 30.

The light modulation cells 30-1 are allowed to be separately and independently driven by applying a predetermined potential difference to the lower electrode 32 (the sub-electrodes 32A) and the upper electrode 36 (the sub-electrodes 36A), and exhibit transparency or a scattering property with respect to light from the light source 20, depending on magnitude of the potential difference applied to the lower electrode 32 and the upper electrode 36. However, in the case where the sub-electrodes 32A are connected to one another through the above-described wiring line 32B or the above-described wiring line 32C, a portion, corresponding to a plurality of sub-electrodes 32A connected to one another through the wiring line 32B (or the wiring line 32C), of the light modulation device 30 configures the light modulation cell 30-1. Likewise, in the case where the sub-electrodes 36A are connected to one another through the above-described wiring line 36B or the above-described wiring line 36C, a portion, corresponding to a plurality of sub-electrodes 36A connected to one another through the wiring line 36B (or the wiring line 36C), of the light modulation device 30 configures the light modulation cell 30-1. It is to be noted that transparency and the scattering property will be described in more detail when the light modulation layer 34 is described.

The alignment films 33 and 35 align, for example, a liquid crystal or a monomer used in the light modulation layer 34. Kinds of alignment films include a vertical alignment film and a horizontal alignment film, and in the embodiment, horizontal alignment films are used as the alignment films 33 and 35. Examples of the horizontal alignment films include an alignment film formed by performing a rubbing process on polyimide, polyamide imide, polyvinyl alcohol, or the like, and an alignment film provided with a groove by transfer or etching. Other examples of the horizontal alignment films include an alignment film formed by obliquely evaporating an inorganic material such as silicon oxide, a diamond-like carbon alignment film formed by ion beam irradiation, and an alignment film provided with an electrode pattern slit. In the case where plastic films are used as the transparent substrates 31 and 37, in a manufacturing process, polyamide imide capable of forming a film at a temperature of 100° C. or less is preferably used for the alignment films 33 and 35, because a firing temperature after coating surfaces of the transparent substrates 31 and 37 with the alignment films 33 and 35 is preferably as low as possible.

Moreover, it is only necessary for both of vertical and horizontal alignment films to have a function of aligning a liquid crystal and a monomer, and reliability, which is necessary for a typical liquid crystal display, with respect to repeated voltage application is not necessary, because reliability with respect to voltage application after forming a device is determined by an interface between a resultant formed by polymerizing a monomer, and a liquid crystal. Moreover, even if the alignment film is not used, for example, when an electric field or a magnetic field is applied between the lower electrode 32 and the upper electrode 36, a liquid crystal or a monomer used in the light modulation layer 34 is allowed to be aligned. In other words, while an electric field or a magnetic field is applied between the lower electrode 32 and the upper electrode 36, the alignment state of the liquid crystal or the monomer under voltage application is allowed to be fixed by ultraviolet irradiation. In the case where a voltage is used to form the alignment film, an electrode for alignment and an electrode for drive may be separately formed, or as a liquid crystal material, a dual-frequency liquid crystal allowing the sign of dielectric constant anisotropy to be inverted by a frequency may be used. Moreover, in the case where a magnetic field is used to form the alignment film, for the alignment film, a material with large magnetic susceptibility anisotropy is preferably used, and, for example, a material with a large number of benzene rings is preferably used.

The light modulation layer 34 exhibits a scattering property or transparency with respect to light from the light source 20 depending on magnitude of an electric field. For example, as illustrated in FIG. 4, the light modulation layer 34 is a composite layer including a bulk 34A and a plurality of microparticles 34B dispersed in the bulk 34A. The bulk 34A and the microparticles 34B have optical anisotropy. It is to be noted that the bulk 34A corresponds to a specific example of "second region" in the application, and the microparticle 34B corresponds to a specific example of "first region" in the application.

Figure 27A:
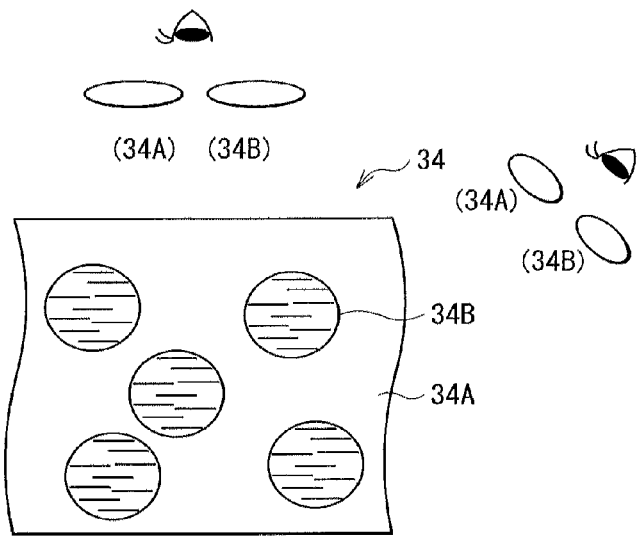
FIGS. 27A to 27C are schematic views for describing an example of a function of a light modulation layer in FIG. 4.

FIG. 27A schematically illustrates an example of an alignment state in the microparticles 34B in the case where a potential difference is not applied between the lower electrode 32 and the upper electrode 36 (hereinafter simply referred to as "under no potential difference application"). It is to be noted that, in FIG. 27A, an alignment state in the bulk 34A is not illustrated. In this description, "under no potential difference application" is a concept including "when a second potential difference lower than a first potential difference is applied". In this description, the first potential difference is a potential difference allowing the light modulation layer 34 to exhibit the scattering property. The second potential difference is a potential difference allowing the light modulation layer 34 to exhibit transparency.

Figure 27B:
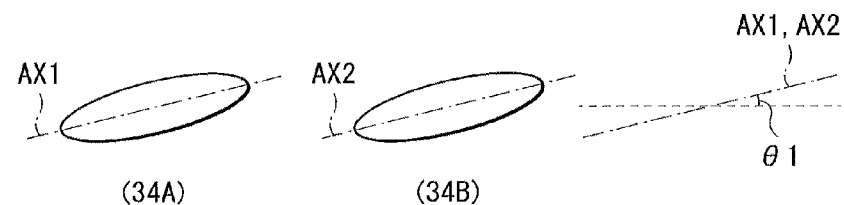
Figure 27C:
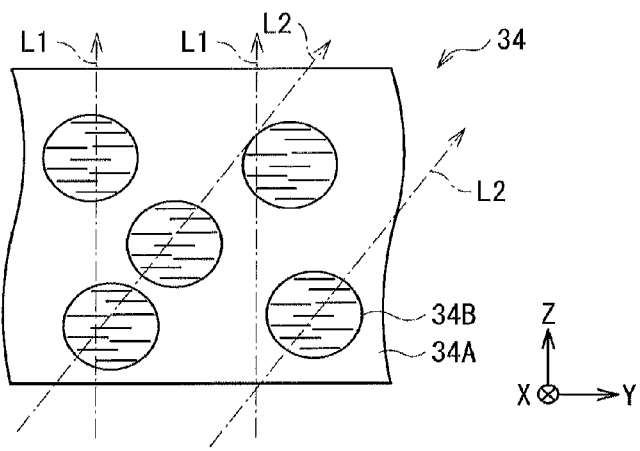

FIG. 27B illustrates an example of refractive index ellipsoids exhibiting refractive index anisotropy of the bulk 34A and the microparticle 34B under no potential difference application. The refractive index ellipsoid is a tensor ellipsoid representing a refractive index of linearly polarized light incident from various directions, and when a section of an ellipsoid from a light incident direction is observed, the refractive index is allowed to be geometrically learned. FIG. 27C schematically illustrates an example of a state where light L1 toward a front direction and light L2 toward an oblique direction pass through the light modulation layer 34 under no potential difference application.

Figure 28A:
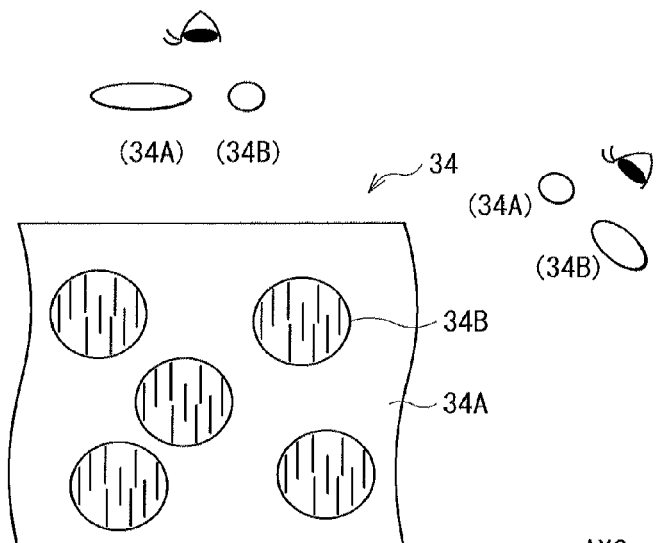
FIGS. 28A to 28C are schematic views for describing another example of the function of the light modulation layer in FIG. 4.

FIG. 28A schematically illustrates an example of an alignment state in the microparticles 34B in the case where a potential difference is applied between the lower electrode 32 and the upper electrode 36 (hereinafter simply referred to as "under potential difference application"). It is to be noted that, in FIG. 28A, an alignment state in the bulk 34A is not illustrated. In this description, "under potential difference application" means "when the first potential difference is applied".

Figure 28B:
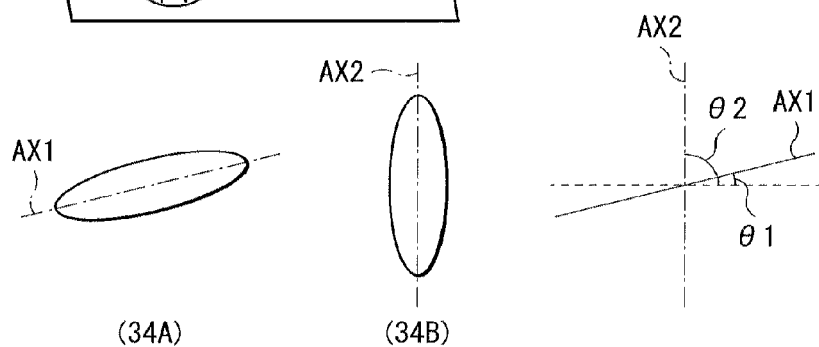
Figure 28C:
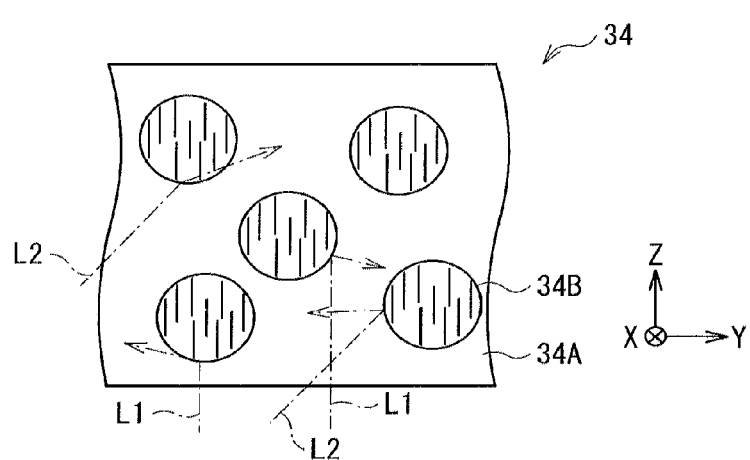

FIG. 28B illustrates an example of refractive index ellipsoids exhibiting refractive index anisotropy of the bulk 34A and the microparticle 34B under potential difference application. FIG. 28C schematically illustrates an example of a state where the light L1 toward the front direction and the light L2 toward the oblique direction are scattered by the light modulation layer 34 in the case where a potential difference is applied between the lower electrode 32 and the upper electrode 36.

For example, as illustrated in FIGS. 27A and 27B, the bulk 34A and the microparticle 34B are structured to allow the direction of an optical axis AX1 of the bulk 34A and the direction of an optical axis AX2 of the microparticle 34B to coincide with (are parallel to) each other under no potential difference application. It is to be noted that the optical axes AX1 and AX2 each indicate a line parallel to a travel direction of a light beam allowing a refractive index to have one value irrespective of polarization direction. Moreover, it is not necessary for the directions of the optical axis AX1 and the optical axis AX2 to consistently coincide with each other, and the directions of the optical axis AX1 and the optical axis AX2 may be slightly deviated from each other due to, for example, a manufacturing error.

Moreover, for example, the microparticle 34B is structured to allow the optical axis AX2 thereof to be parallel to the light incident surface 10A of the light guide plate 10 under no potential difference application. Further, for example, the microparticle 34B is further structured to allow the optical axis AX2 thereof to intersect with surfaces of the transparent substrates 31 and 37 at a slight angle θ1 (refer to FIG. 27B) under no potential difference application. It is to be noted that the angle θ1 will be described in more detail when a material forming the microparticle 34B is described.

On the other hand, for example, the bulk 34A is structured to have a fixed optical axis AX1 irrespective of whether or not a potential difference is applied between the lower electrode 32 and the upper electrode 36. More specifically, for example, as illustrated in FIGS. 27A, 27B, 28A, and 28B, the bulk 34A is structured to have the optical axis AX1 parallel to the light incident surface 10A of the light guide plate 10 as well as intersecting with the surfaces of the transparent substrates 31 and 37 at the predetermined angle θ1. In other words, under no potential difference application, the optical axis AX1 of the bulk 34A is parallel to the optical axis AX2 of the microparticle 34B.

It is to be noted that it is not necessary for the optical axis AX2 to be consistently parallel to the light incident surface 10A as well as to consistently intersect with the surfaces of the transparent substrates 31 and 37 at the angle θ1, and the optical axis AX2 may intersect with the surfaces of the transparent substrates 31 and 37 at an angle slightly different from the angle θ1 due to, for example, a manufacturing error. Moreover, it is not necessary for the optical axes AX1 and AX2 to be consistently parallel to the light incident surface 10A, and the optical axes AX1 and AX2 may intersect with the light incident surface 10A at a small angle due to, for example, a manufacturing error.

Figure 29:
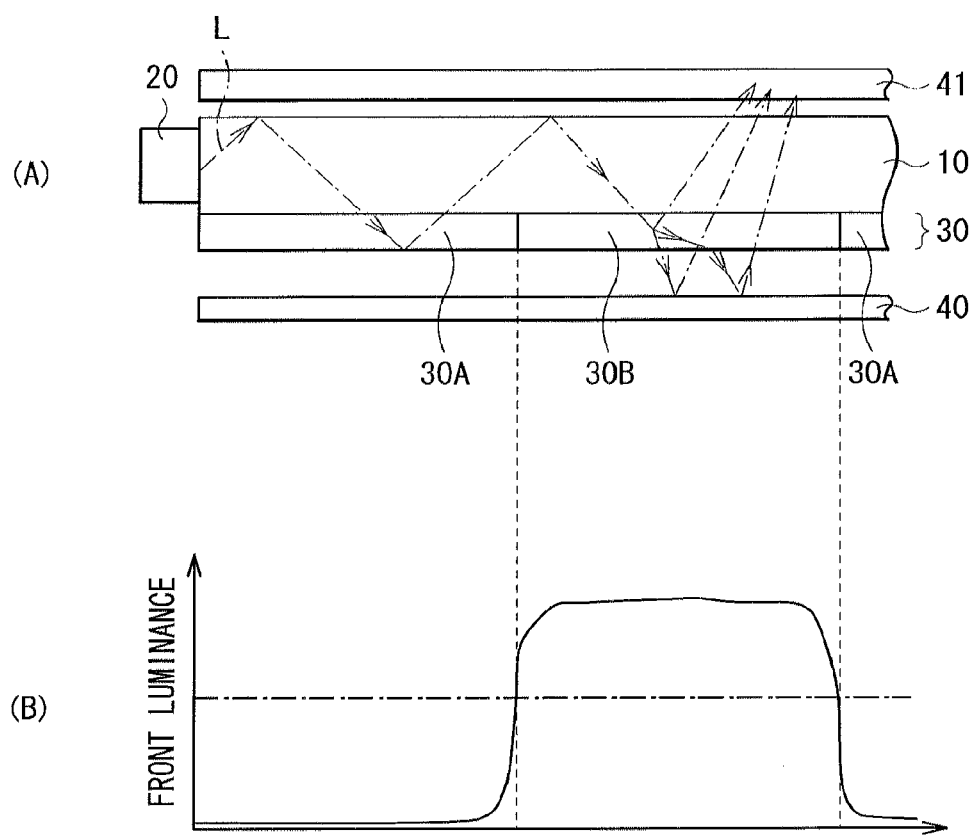
FIG. 29 is a schematic view for describing an example of a function of the backlight in FIG. 4.

In this case, ordinary refractive indices of the bulk 34A and the microparticle 34B are preferably equal to each other, and extraordinary refractive indices of the bulk 34A and the microparticle 34B are preferably equal to each other. In this case, for example, under no potential difference application, as illustrated in FIG. 27A, there is little difference in refractive index in all directions including the front direction and the oblique direction, and high transparency is obtained. Therefore, for example, as illustrated in FIG. 27C, the light L1 toward the front direction and the light L2 toward the oblique direction pass through the light modulation layer 34 without being scattered in the light modulation layer 34. As a result, for example, as illustrated in parts (A) and (B) in FIG. 29, light L from the light source 20 (light from an oblique direction) is totally reflected by interfaces (a bottom surface of the transparent substrate 31 and a top surface of the light guide plate 10) of a transparent region (a transparent region 30A) of the light modulation layer 34, and luminance (luminance in black display) in the transparent region 30A is decreased, compared to the case where light is uniformly emitted from an entire surface of the backlight 211 (indicated by an alternate long and short dash line in the part (B) in FIG. 29). It is to be noted that a profile of front luminance in the part (B) in FIG. 29 is obtained by arranging a diffusion sheet 41 on the light guide plate 10, and measuring the front luminance through the diffusion sheet 41.

It is to be noted that the top surface of the light guide plate 10 as one interface of the transparent region 30A is in contact with a gap between the display panel 210 and the light guide plate 10; however, the gap is preferably filled with a material with a lower refractive index than that of the top surface of the light guide plate 10. A layer made of such a low-refractive-index material (a low-refractive-index material layer 220 (refer to FIG. 3)) is typically air, and may be a glue or an adhesive made of a low-refractive-index material.

For example, under potential difference application, as illustrated in FIG. 28A, the bulk 34A and the microparticle 34B are structured to allow the directions of the optical axis AX1 and the optical axis AX2 to be different from (intersect with or be orthogonal (or substantially orthogonal) to) each other. Moreover, for example, under potential difference application, the microparticle 34B is structured to allow the optical axis AX2 thereof to be parallel to the light incident surface 10A of the light guide plate 10 as well as to intersect with the surfaces of the transparent substrates 31 and 37 at an angle θ2 (for example, 90°) larger than the angle θ1. It is to be noted that the angle θ2 will be described in more detail when the material forming the microparticles 34B is described.

Therefore, under potential difference application, in the light modulation layer 34, a difference in refractive index in all directions including the front direction and the oblique direction is increased to obtain a high scattering property. For example, as illustrated in FIG. 28C, the light L1 toward the front direction and the light L2 toward the oblique direction are thereby scattered in the light modulation layer 34. As a result, for example, as illustrated in the part (A) in FIG. 19, the light L from the light source 20 (light from the oblique direction) passes through an interface (an interface between the transparent substrate 31 or the light guide plate 10 and the air) of a scattering region 30B, and light having passed toward the reflective plate 40 is reflected by the reflective plate 40 to pass through the light modulation device 30. Therefore, the luminance of the scattering region 30B is extremely higher than that in the case where light is uniformly emitted from the entire surface of the backlight 211 (indicated by the alternate long and short dash line in the part (B) in FIG. 29), and luminance in white display is partially increased (partial luminance enhancement) by a reduced amount of the luminance of the transparent region 30A.

It is to be noted that the ordinary refractive indices of the bulk 34A and the microparticle 34B may be slightly different from each other due to, for example, a manufacturing error, and are preferably, for example, 0.1 or less, and more preferably 0.05 or less. Moreover, the extraordinary refractive indices of the bulk 34A and the microparticle 34B may be slightly different from each other due to, for example, a manufacturing error, and are preferably, for example, 0.1 or less, and more preferably 0.05 or less.

Moreover, a refractive index difference in the bulk 34A ($\Delta n_P$=extraordinary refractive index $ne_P$—ordinary refractive index $no_P$) and a refractive index difference in the microparticle 34B ($\Delta n_L$=extraordinary refractive index $ne_L$—ordinary refractive index $no_L$) are preferably as large as possible, and are preferably 0.05 or over, more preferably 0.1 or over, and still more preferably 0.15 or over. In the case where the refractive index differences in the bulk 34A and the microparticle 34B are large, the scattering power of the light modulation layer 34 is enhanced to allow light guide conditions to be easily disrupted, thereby allowing light from the light guide plate 10 to be easily extracted.

Figure 30A:
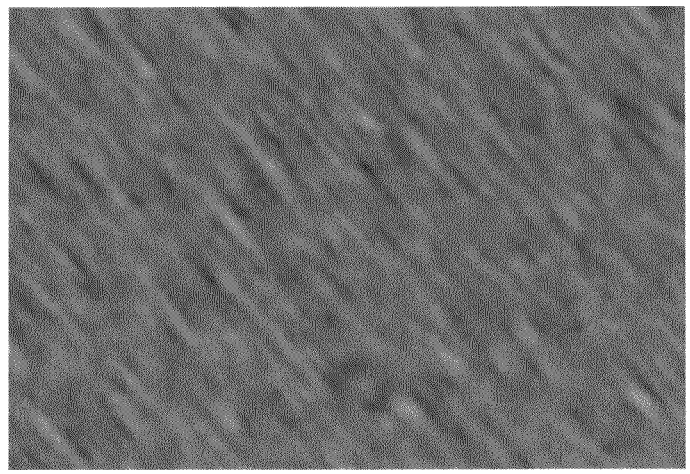
FIGS. 30A and 30B are diagrams illustrating an example of a streaky structure in a bulk in FIG. 4.
Figure 30B:
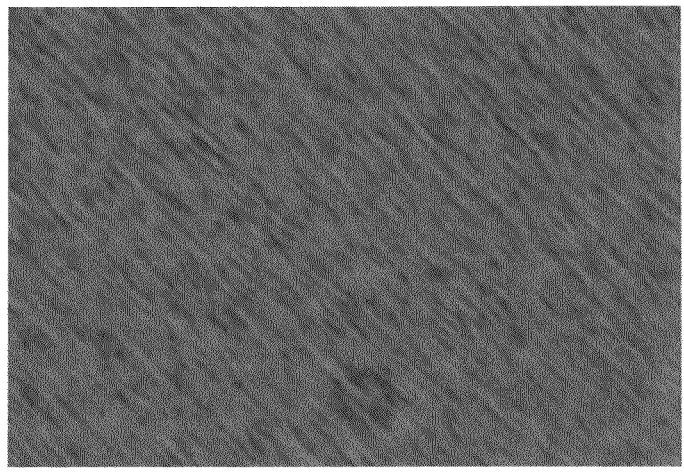

Further, the bulk 34A and the microparticle 34B have different response speeds with respect to an electric field. The bulk 34A has, for example, a streaky structure (refer to FIGS. 30A and 30B), a porous structure, or a rod-like structure having a response speed slower than that of the microparticle 34B. It is to be noted that FIGS. 30A and 30B are polarizing micrographs in the case where an electric field is applied to the light modulation device 30, and bright streaky parts in FIGS. 30A and 30B correspond to the above-described streaky structure. FIG. 30A illustrates a state of the streaky structure of the bulk 34A in the case where the weight ratio of a liquid crystal to a monomer is 95:5, and FIG. 30B illustrates a state of the streaky structure of the bulk 34A in the case where the weight ratio of the liquid crystal to the monomer is 90:10. The bulk 34A is formed of, for example, a polymer material obtained by polymerizing a low-molecular monomer. The bulk 34A is formed, for example, by polymerizing, by one or both of heat and light, a material (for example, a monomer) with orientation and polymerization which is aligned along the alignment direction of the microparticles 34B or the alignment directions of the alignment films 33 and 35.

For example, the streaky structure, the porous structure or the rod-like structure of the bulk 34A has a long axis in a direction parallel to the light incident surface 10A of the light guide plate 10 as well as intersecting with the surfaces of the transparent substrates 31 and 37 at the slight angle Δ1. In the case where the bulk 34A has the streaky structure, an average streaky texture size in a short-axis direction is preferably within a range of 0.1 μm to 10 μm both inclusive to enhance a scattering property of guided light, and more preferably within a range of 0.2 μm to 2.0 μm both inclusive. In the case where the average streaky texture size in the short-axis direction is within a range of 0.1 μm to 10 μm both inclusive, scattering power in the light modulation device 30 is substantially equal in a visible region of 380 to 780 nm. Therefore, in a plane, only light of a specific wavelength component is not increased or decreased; therefore, a balance in a visible region is achievable in the plane. In the case where the average streaky texture size in the short-axis direction is smaller than 0.1 μm or exceeds 10 μm, the scattering power of the light modulation device 30 is low irrespective of wavelength, and it is difficult for the light modulation device 30 to function as a light modulation device.

Moreover, to reduce wavelength dependence of scattering, the average streaky texture size in the short-axis direction is preferably within a range of 0.5 μm to 5 μm both inclusive, and more preferably within a range of 1 μm to 3 μm. In such a case, in a process of propagating light emitted from the light source 20 through the light guide plate 10, when the light repeatedly passes through the bulk 34A in the light modulation device 30, wavelength dependence of scattering in the bulk 34A is suppressed. The streaky texture size is allowed to be observed by a polarizing microscope, a confocal microscope, an electron microscope, or the like.

On the other hand, the microparticles 34B mainly include, for example, a liquid crystal material, and have a response speed sufficiently higher than that of the bulk 34A. Examples of the liquid crystal material (liquid crystal molecules) included in the microparticles 34B include rod-like molecules. As liquid crystal molecules included in the microparticles 34B, liquid crystal molecules having positive dielectric constant anisotropy (a so-called positive type liquid crystal) are preferably used.

In this case, under no potential difference application, the long-axis directions of the liquid crystal molecules in the microparticles 34B are parallel to the optical axis AX1. At this time, the long axes of the liquid crystal molecules in the microparticles 34B are parallel to the light incident surface 10A of the light guide plate 10, as well as intersect with the surfaces of the transparent substrates 31 and 37 at the slight angle θ1. In other words, under no potential difference application, the liquid crystal molecules in the microparticles 34B are aligned to be tilted at the angle θ1 in a plane parallel to the light incident surface 10A of the light guide plate 10. The angle θ1 is called a pretilt angle, and is, for example, preferably within a range of 0.1° to 30° both inclusive. The angle θ1 is more preferably within a range of 0.5° to 10° both inclusive, and still more preferably within a range of 0.7° to 2° both inclusive. When the angle θ1 is increased, scattering efficiency tends to be reduced due to the following reason. Moreover, when the angle θ1 is too small, the angle of a direction where the liquid crystal rises under potential difference application varies. For example, the liquid crystal may rise in a 180°-different direction (reverse tilt). Therefore, refractive index differences in the microparticles 34B and the bulk 34A are not allowed to be effectively used; therefore, scattering efficiency tends to be reduced, and luminance tends to be reduced.

Further, under potential difference application, in the microparticles 34B, the long-axis directions of the liquid crystal molecules intersect with or are orthogonal (or substantially orthogonal) to the optical axis AX1. At this time, the long axes of the liquid crystal molecules in the microparticles 34B are parallel to the light incident surface 10A of the light guide plate 10, as well as intersect with the surfaces of the transparent substrates 31 and 37 at the angle θ2 (for example, 90°) which is larger than the angle θ1. In other words, under potential difference application, the liquid crystal molecules in the microparticles 34B are aligned to be tilted at the angle θ2 in a plane parallel to the light incident surface 10A of the light guide plate 10 or to rise upright at the angle θ2 (=90°).

The above-described monomer having orientation and polymerization may be a material having optical anisotropy and forming a composite material with a liquid crystal; however, a low-molecular monomer which is cured with ultraviolet light is preferable in this embodiment. It is preferable that, in a state where no voltage is applied, directions of optical anisotropy of the liquid crystal and a resultant (a polymer material) formed by polymerizing a low-molecular monomer coincide with each other; therefore, before curing the low-molecular monomer with ultraviolet light, the liquid crystal and the low-molecular monomer are preferably aligned in the same direction. In the case where a liquid crystal is used as the microparticles 34B, when the liquid crystal includes rod-like molecules, the used monomer material preferably has a rod-like shape. As described above, a material having both of polymerization and liquid crystal properties is preferably used as the monomer material, and, for example, the monomer material preferably includes one or more functional groups selected from the group consisting of an acrylate group, a methacrylate group, an acryloyloxy group, a methacryloyloxy group, a vinyl ether group, and an epoxy group as polymerizable functional groups. These functional groups are allowed to be polymerized by ultraviolet, infrared, or electron irradiation, or by heating. To suppress a reduction in the degree of alignment under ultraviolet irradiation, a liquid crystal material having a polyfuncitonal group may be added. In the case where the bulk 34A has the above-described streaky structure, as the material of the bulk 34A, a bifunctional liquid crystal monomer is preferably used. Moreover, a monofunctional monomer may be added to the material of the bulk 34A to adjust a temperature at which liquid crystal properties are exhibited, or a tri- or more-functional monomer may be added to the material of the bulk 34A to improve crosslink density.

For example, the drive circuit 50 controls the magnitude of a potential difference applied to a pair of electrodes (the lower electrode 32 and the upper electrode 36) of each of the light modulation cells 30-1 to allow the optical axes AX2 of the microparticles 34B in one light modulation cell 30-1 to be parallel or substantially parallel to the optical axis AX1 of the bulk 34A, as well as to allow the optical axes AX2 of the microparticles 34B in another light modulation cell 30-1 to intersect with or be orthogonal (or substantially orthogonal) to the optical axis AX1 of the bulk 34A. In other words, the drive circuit 50 allows, by electric field control, the direction of the optical axis AX1 of the bulk 34A and the directions of the optical axes AX2 of the microparticles 34B to coincide with (or substantially coincide with) each other or to be different from (or orthogonal to) each other.

The drive circuit 50 allows strip-like illumination light beams associated with the plurality of sub-electrodes 32A or the plurality of sub-electrodes 36A to be emitted in response to the control signal 204A supplied from the arithmetic circuit 204. The control signal 204A is a control signal including posture information and generated by the arithmetic circuit 204 based on, for example, a signal supplied from a gyro sensor (not illustrated) or the like included in the receiver-side unit 200. For example, in the case where the receiver-side unit 200 has two main perspectives, the arithmetic circuit 204 determines, based on the signal supplied from the gyro sensor (not illustrated) or the like, which one of the main perspectives is closer to a vertical direction, and then outputs the control signal 204A including a determination result (posture information) to the drive circuit 50.

When the drive circuit 50 receives the signal specifying three-dimensional display as the control signal 204A (in a three-dimensional display mode), the drive circuit 50 allows the backlight 211 to emit a plurality of strip-like illumination light beams. Moreover, when the drive circuit 50 receives, as the control signal 204A, posture information allowing the drive circuit 50 to select the sub-electrodes 32A, the drive circuit 50 allows illumination light beams associated with the sub-electrodes 32A to be emitted. More specifically, when the drive circuit 50 receives, as the control signals 204A, the signal specifying three-dimensional display and the posture information allowing the drive circuit 50 to select the sub-electrodes 32A, the drive circuit 50 applies, to each light modulation cell 30-1 including the specific sub-electrode 32a of the plurality of sub-electrodes 32A, a potential difference allowing the light modulation layer 34 to exhibit the scattering property, and applies, to each light modulation cell 30-1 including the specific sub-electrode 32b or the specific sub-electrode 32c of the plurality of sub-electrodes 32A, a potential difference allowing the light modulation layer 34 to exhibit transparency. In other words, the drive circuit 50 controls the magnitude of a potential difference applied to a pair of electrodes (the sub-electrodes 32A and 36A) of each of the light modulation cells 30-1 to allow the optical axes AX2 of the microparticles 34B in each light modulation cell 30-1 including the sub-electrode 32a to intersect with or be orthogonal (or substantially orthogonal) to the optical axis AX1 of the bulk 34A, as well as to allow the optical axes AX2 of the microparticles 34B in each light modulation cell 30-1 including the sub-electrode 32b or the sub-electrode 32c to be parallel to the optical axis AX1 of the bulk 34A. Therefore, an electric field for a first mode is generated in the light modulation layer 34. It is to be noted that the electric field for the first mode indicates an electric field having an in-plane distribution corresponding to the position, shape, and size of each light modulation cell 30-1 including the sub-electrode 32a.

When the drive circuit 50 receives, as the control signal 204A, posture information allowing the drive circuit 50 to select the sub-electrodes 36A, the drive circuit 50 allows illumination light beams associated with the sub-electrodes 36A to be emitted. More specifically, when the drive circuit 50 receives, as the control signals 204A, the signal specifying three-dimensional display and the posture information allowing the drive circuit 50 to select the sub-electrodes 36A, the drive circuit 50 applies, to each light modulation cell 30-1 including the specific sub-electrode 36a of the plurality of sub-electrodes 36A, a potential difference allowing the light modulation layer 34 to exhibit the scattering property, and applies, to each light modulation cell 30-1 including the sub-electrode 36b or the sub-electrode 36c of the plurality of sub-electrodes 36A, a potential difference allowing the light modulation layer 34 to exhibit transparency. In other words, the drive circuit 50 controls the magnitude of a potential difference applied to a pair of electrodes (the sub-electrodes 32A and 36A) of each of the light modulation cells 30-1 to allow the optical axes AX2 of the microparticles 34B in each light modulation cell 30-1 including the sub-electrode 36a to intersect with or be orthogonal (or substantially orthogonal) to the optical axis AX1 of the bulk 34A, as well as to allow the optical axes AX2 of the microparticles 34B in each light modulation cell 30-1 including the sub-electrode 36b or the sub-electrode 36c to be parallel to the optical axis AX1 of the bulk 34A. Therefore, an electric field for a second mode is generated in the light modulation layer 34. It is to be noted that the electric field for the second mode means an electric field having an in-plane distribution corresponding to the position, shape, and size of each sub-electrode 36a.

Moreover, when the drive circuit 50 receives the signal specifying two-dimensional display as the control signal 204A (in a two-dimensional display mode), the drive circuit 50 allows the backlight 211 to emit planar illumination light irrespective of posture information. More specifically, when the drive circuit 50 receives the signal specifying two-dimensional display as the control signal 204A, the drive circuit 50 applies, to each of the light modulation cells 30-1, a potential difference allowing the light modulation layer 34 to exhibit the scattering property. In other words, the drive circuit 50 controls the magnitude of a potential difference applied to a pair of electrodes (the sub-electrodes 32A and 36A) of each of the light modulation cells 30-1 to allow the optical axes AX2 of the microparticles 34B in all light modulation cells 30-1 included in the backlight 211 to intersect with or be orthogonal (or substantially orthogonal) to the optical axis AX1 of the bulk 34A. Therefore, an electric field for the two-dimensional display mode is generated in the light modulation layer 34. It is to be noted that the electric field for the two-dimensional display mode means an electric field having a distribution in an entire plane.

It is to be noted that when the drive circuit 50 receives the signal specifying two-dimensional display as the control signal 204A as well as a signal associated with image data (in a dual-view mode), the drive circuit 50 may allow the backlight 211 to emit planar illumination light having a luminance distribution based on the image data (for example, planar illumination light having a dark part in a plane). However, in such a case, the lower electrode 32 preferably has a layout corresponding to pixels of the display panel 210. In the case where the lower electrode 32 has a layout corresponding to the pixels of the display panel 210, based on the image data, the drive circuit 50 applies a potential difference allowing the light modulation layer 34 to exhibit the scattering property to some of the light modulation cells 30-1, and applies a potential difference allowing the light modulation layer 34 to exhibit transparency to other light modulation cells 30-1. Therefore, an electric field for the dual-view mode is generated in the light modulation layer 34. It is to be noted that the electric field for the dual-view mode means an electric field having an in-plane distribution corresponding to the position, shape, and size of each of the light modulation cells 30-1 to which the potential difference allowing the light modulation layer 34 to exhibit the scattering property is applied.

Next, a method of manufacturing the backlight 211 according to the embodiment will be described below referring to FIGS. 31A to 31C to FIGS. 33A to 33C.

Figure 31A:
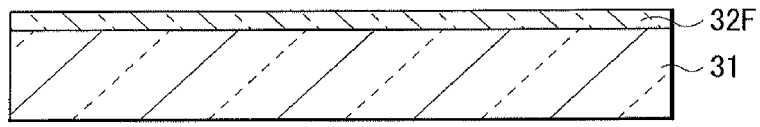
FIGS. 31A to 31C are sectional views for describing steps of manufacturing the light modulation device in FIG. 4.
Figure 31B:
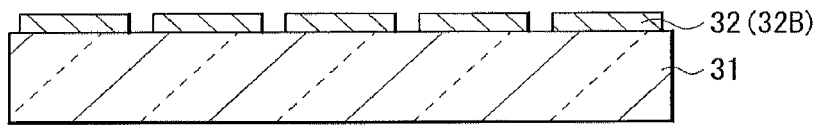

First, a transparent conductive film 32F made of ITO or the like is formed on the transparent substrate 31 configured of a glass substrate or a plastic film substrate (refer to FIG. 31A). Next, a resist layer is formed on an entire surface of the transparent conductive film 32F, and then an electrode pattern is formed on the resist layer by patterning. Then, the lower electrode 32 is formed by exposure and development, and the resist layer is removed (refer to FIG. 31B).

As a patterning method, for example, a photolithography method, a laser processing method, a pattern printing method, a screen printing method, or the like may be used. Moreover, for example, patterning may be performed by performing predetermined heating after performing screen printing with use of a "HyperEtch" material of Merck Ltd., and then rinsing the material with water. The electrode pattern is determined by a driving method and the number of divisions of partial drive. The electrode pattern is processed with a pixel pitch of a used display or a pitch close thereto. The processing width of an electrode depends on a processing method; however, in terms of light extraction efficiency, the width is preferably as small as possible. The processing width of the electrode is, for example, 50 μm or less, preferably 20 μm, and more preferably 5 μm or less. Moreover, the electrode pattern may be formed by performing pattern printing on ITO nanoparticles, and then firing the ITO nanoparticles.

Figure 31C:
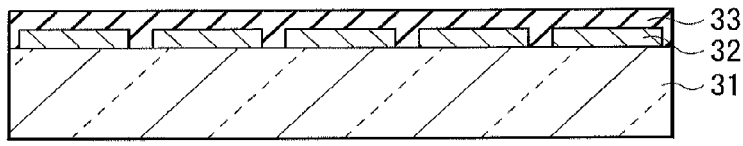

Next, after an entire surface of the transparent substrate 31 is coated with the alignment film 33, the alignment film 33 is dried and fired (refer to FIG. 31C). In the case where a polyimide-based material is used as the alignment film 33, NMP (N-methyl-2-pyrrolidone) is often used as a solvent; however, at this time, a temperature of approximately 200° C. is necessary under an atmosphere. It is to be noted that, in this case, when a plastic substrate is used as the transparent substrate 31, the alignment film 33 may be vacuum-dried and fired at 100° C. After that, a rubbing process is performed on the alignment film 33. Therefore, the alignment film 33 functions as an alignment film for horizontal alignment, and a pretilt is allowed to be formed in a rubbing direction of the alignment film 33.

Likewise, a transparent conductive film made of ITO or the like is formed on the transparent substrate 37 configured of a glass substrate or a plastic film substrate. Next, a resist layer is formed on an entire surface of the transparent conductive film, and then an electrode pattern is formed on the resist layer by patterning. Then, the upper electrode 36 is formed by exposure and development, and the resist layer is removed. Next, after an entire surface of the upper electrode 36 is coated with the alignment film 35, the alignment film 35 is dried and fired. After that, a rubbing process is performed on the alignment film 35. Therefore, the alignment film 35 functions as an alignment film for horizontal alignment, and a pretilt is allowed to be formed in a rubbing direction of the alignment film 35.

Figure 32A:
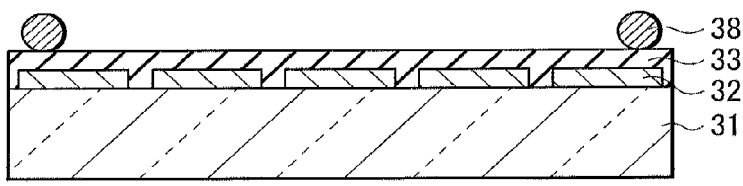
FIGS. 32A to 32C are sectional views for describing manufacturing steps following FIGS. 31A to 31C.
Figure 32B:
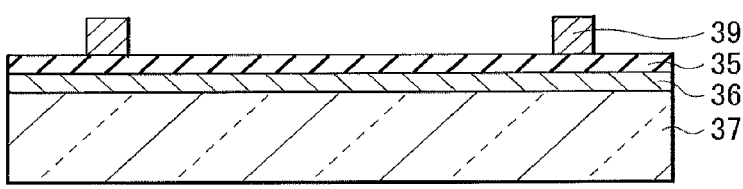

Next, spacers 38 allowing a cell gap to be formed are sprayed on the alignment film 33 by a dry method or a wet method (refer to FIG. 32A). It is to be noted that, in the case where the light modulation cells 30-1 are formed by a vacuum bonding method, the spacers 38 may be mixed in a mixture which is to be dropped. Alternatively, columnar spacers may be formed by a photolithography method, instead of the spacers 38. Then, the alignment film 35 is coated with a sealant pattern 39 for bonding and preventing leakage of the liquid crystal in, for example, a frame shape (refer to FIG. 32B). The sealant pattern 39 is allowed to be formed by a dispenser method or a screen printing method.

The vacuum bonding method (a one-drop-fill (ODF) method) will be described below; however, the light modulation cells 30-1 may also be formed by a vacuum injection method, a roll bonding method, or the like.

Figure 32C:
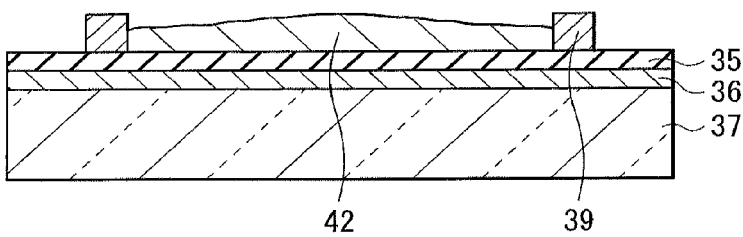

First, a mixture 42 of a liquid crystal and a monomer, corresponding to a volume determined by a cell gap, a cell area, or the like, is dropped uniformly on a plane (refer to FIG. 32C). The mixture 42 is preferably dropped with use of a linear guide precise dispenser; however, a die coater or the like may be used with use of the sealant pattern 39 as a bank.

The above-described materials may be used as the liquid crystal and the monomer, and a weight ratio of the liquid crystal to the monomer is within a range of 98:2 to 50:50, preferably within a range of 95:5 to 75:25, and more preferably within a range of 92:8 to 85:15. A drive voltage is allowed to be decreased by increasing the ratio of the liquid crystal; however, when the liquid crystal is increased too much, the liquid crystal tends to have difficulty in returning to a transparent state, such as a decline in whiteness under voltage application or a decrease in the response speed after turning the voltage off.

In addition to the liquid crystal and the monomer, a polymerization initiator may be added to the mixture 42. A monomer ratio of the added polymerization initiator may be adjusted within a range of 0.1 to 10 wt %, depending on a used ultraviolet wavelength. A polymerization inhibitor, a plasticizer, a viscosity modifier, or the like may be further added to the mixture 42, as necessary. When the monomer is a solid or gel at room temperature, a cap, a syringe, and a substrate are preferably warmed.

Figure 33A:
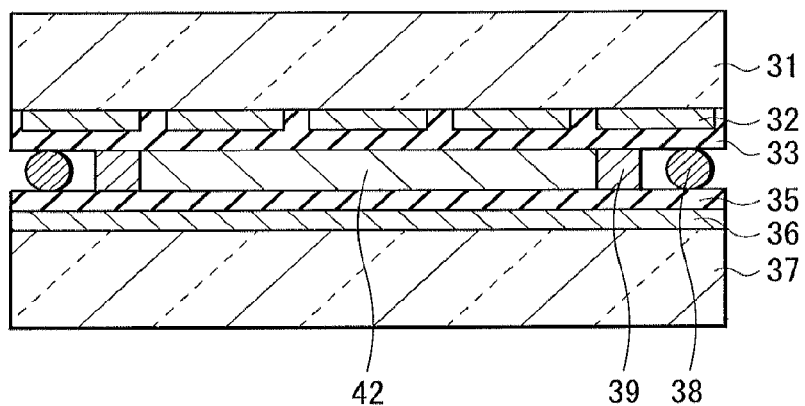
FIGS. 33A to 33C are sectional views for describing manufacturing steps following FIGS. 32A to 32C.
Figure 33B:
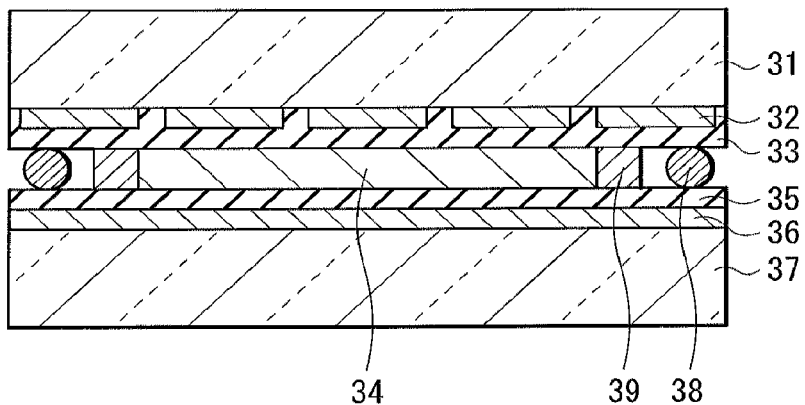

After the transparent substrates 31 and 37 are put in a vacuum bonding system (not illustrated), evacuation is performed to bond the transparent substrates 31 and 37 (refer to FIG. 33A). After that, a resultant is released to the atmosphere to uniformize the cell gap by uniform pressurization under atmospheric pressure. The cell gap may be appropriately selected based on a relationship between white luminance (whiteness) and the drive voltage; however, the cell gap is within a range of 5 to 40 μm, preferably within a range of 6 to 20 μm, and more preferably within a range of 7 to 10 μm.

After bonding, an alignment process is preferably performed as necessary (not illustrated). In the case where light leakage occurs by an insertion of a bonded cell between crossed-Nicols polarization plates, the cell may be heated for a predetermined time or be left at room temperature to be aligned. After that, the monomer is irradiated with ultraviolet light L3 to be polymerized (refer to FIG. 33B). Thus, the light modulation device 30 is manufactured.

It is preferable to prevent the temperature of the cell from being changed under ultraviolet irradiation. An infrared cut filter is preferably used, or an UV-LED or the like is preferably used as a light source. Ultraviolet irradiance exerts an influence on an organization structure of a composite material; therefore, the ultraviolet irradiance is preferably adjusted appropriately based on a used liquid crystal material or a used monomer material, and a composition thereof, and the ultraviolet irradiance is preferably within a range of 0.1 to 500 mW/cm$^2$, and more preferably within a range of 0.5 to 30 mW/cm$^2$. There is a tendency that the lower the ultraviolet irradiance is, the lower the drive voltage becomes, and preferable ultraviolet irradiance is allowed to be selected in terms of both of productivity and properties.

Figure 33C:
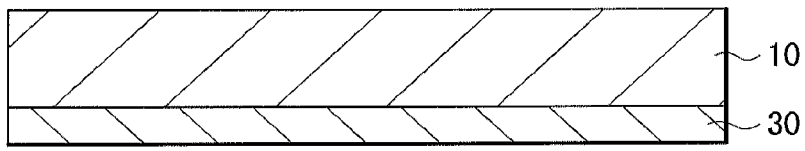

Then, the light modulation device 30 is bonded to the light guide plate 10 (refer to FIG. 33C). Bonding may be carried out by sticking or adhesion; however, it is preferable that the light modulation device 30 be adhered or stuck with a material having a refractive index which is as close to a refractive index of the light guide plate 10 and a refractive index of a substrate material of the light modulation device 30 as possible. Finally, leading lines (not illustrated) are attached to the lower electrode 32 and the upper electrode 36. Thus, the backlight 211 according to the embodiment is manufactured.

Although the process of forming the light modulation device 30, and finally bonding the light modulation device 30 to the light guide plate 10 is described, the transparent substrate 37 on which the alignment film 35 is formed may be bonded in advance to the surface of the light guide plate 10 to form the backlight 211. Moreover, the backlight 211 may be formed by one of a sheet-feeding method and a roll-to-roll method.

Next, functions and effects of the backlight 211 according to the embodiment will be described below.

In the backlight 211 according to the embodiment, in three-dimensional display, a potential difference is applied to a pair of electrodes (the sub-electrodes 32A and 36A) of each of the light modulation cells 30-1 to allow the optical axes AX2 of the microparticles 34B in each light modulation cell 30-1 including the sub-electrode 32a (36a) to intersect with or be orthogonal (substantially orthogonal) to the optical axis AX1 of the bulk 34A, and to allow the optical axes AX2 of the microparticles 34B in each light modulation cell 30-1 including the sub-electrode 32b (36b) or the sub-electrode 32c (36c) to be parallel or substantially parallel to the optical axis AX1 of the bulk 34A. Therefore, in the light modulation device 30, each light modulation cell 30-1 including the sub-electrode 32a (36a) serves as a scattering region 30B, and each light modulation cell 30-1 including the sub-electrode 32b (36b) or the sub-electrode 32c (36c) serves as a transparent region 30A. As a result, light emitted from the light source 20 and entering into the light guide plate 10 passes through the transparent region 30A of the light modulation device 30, and is scattered in the scattering region 30B of the light modulation device 30 (refer to FIG. 34). The light modulation device 30 (the light modulation layer 34) uses light from the light source 20 in such a manner to generate a plurality of strip-like illumination light beams extending in a direction intersecting with or orthogonal (or substantially orthogonal) to the light incident surface 10A. Light beams having passed through a bottom surface of the scattering region 30B in the strip-like illumination light beams (scattered light beams) are reflected by the reflective plate 40 to be returned to the light guide plate 10 again, and then the light beams are emitted from a top surface of the backlight 211. Moreover, light beams toward a top surface of the scattering region 30B in the strip-like illumination light beams (the scattered light beams) pass through the light guide plate 10, and then are emitted from the top surface of the backlight 211. Thus, in three-dimensional display, light beams are hardly emitted from the top surface of the transparent region 30A, and light beams are emitted from the top surface of the scattering region 30B. Thus, for example, as illustrated in FIG. 34, a plurality of strip-like illumination light beams are emitted to a front direction.

Figure 34:
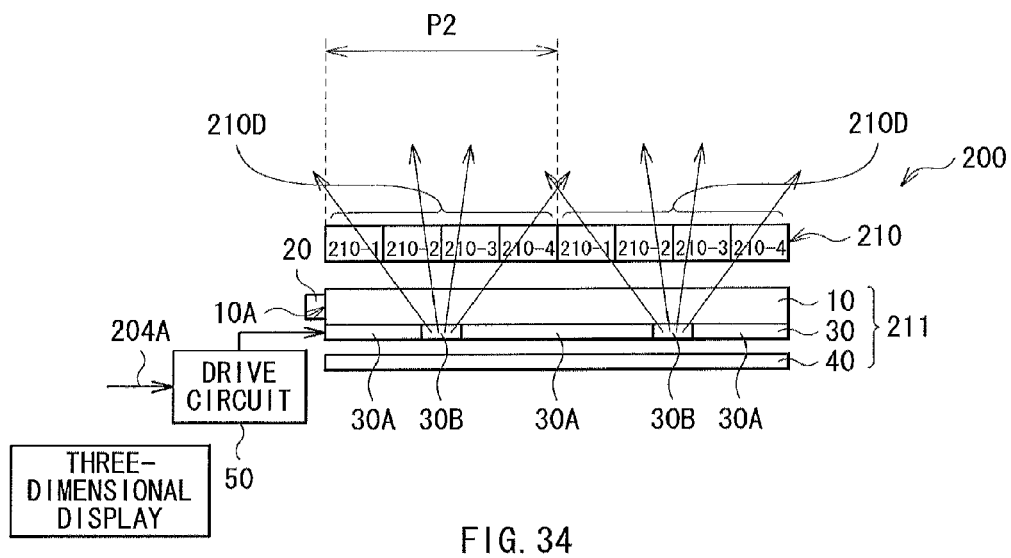
FIG. 34 is a schematic view for describing an example of three-dimensional display on the display section in FIG. 3.
Figure 35:
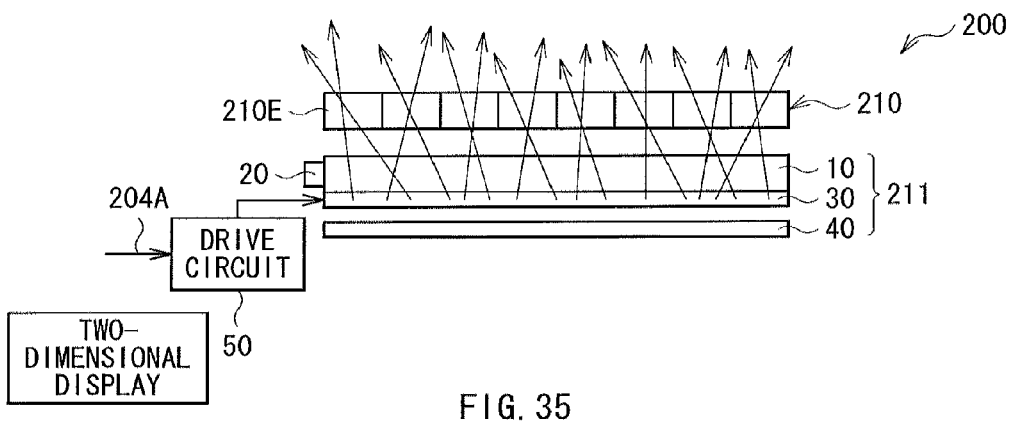
FIG. 35 is a schematic view for describing an example of two-dimensional display on the display section in FIG. 3.

Therefore, as respective strip-like illumination light beams emitted toward the front direction enter into a back surface of the display panel 210, for example, in the case where two-dimensional image data for three-dimensional display is generated in the image signal processing circuit 207 to allow respective pixel rows in a pixel arrangement corresponding to respective strip-like illumination light beams to serve as three-dimensional pixels 210D, the respective strip-like illumination light beams enter, at a substantially equal angle, into pixels (for example, 210-1, 210-2, 210-3, or 210-4 in FIG. 34)

in the same position in respective three-dimensional pixels 210D. As a result, image light modulated by the pixels in the same position in respective three-dimensional pixels 210D is emitted from the pixels at a predetermined angle. At this time, a viewer views different images having a parallax therebetween with his right and left eyes; therefore, the viewer perceives that a three-dimensional image (a stereoscopic image) is displayed on the display panel 210.

In the embodiment, strip-like illumination light beams are emitted, based on posture information of the display panel 211 supplied from the gyro sensor (not illustrated), with use of the plurality of sub-electrodes 32*a* included in the lower electrode 32 or the plurality of sub-electrodes 32*a* included in the upper electrode 36. Therefore, when a user of the receiver-side unit 200 rotates the display panel 210 by 90°, the gyro sensor or the like detects such rotation, and the sub-electrodes 32*a* or 36*a* used for 3D display are selected with use of a detection result. As a result, the user is allowed to perceive a three-dimensional image irrespective of the direction of the display panel 210.

Moreover, in the embodiment, the lower electrode 32 and the upper electrode 36 applying an electric field to the light modulation layer 34 each are configured of a plurality of sub-electrodes, and a predetermined potential difference is applied to the plurality of sub-electrodes 32A included in the lower electrode 32, or a predetermined potential difference is applied to the plurality of sub-electrodes 36A included in the upper electrode 36. Therefore, a three-dimensional image for a certain main perspective is allowed to be displayed on the display panel 210 by strip-like illumination light beams associated with the sub-electrodes 32A, and a three-dimensional image for another main perspective is allowed to be displayed on the display panel 210 by strip-like illumination light beams associated with the sub-electrodes 36A. In other words, three-dimensional images for different main perspectives are allowed to be selectively displayed on the display panel 210.

Further, in the embodiment, one light modulation layer 34 is included in the edge-light type backlight 211, and two electrodes (the lower electrode 32 and the upper electrode 36) are disposed on and below the light modulation layer 34; therefore, three-dimensional images for different main perspectives are allowed to be selectively displayed on the display panel 210. Accordingly, it is not necessary to laminate a plurality of light modulation layers 34 or a large number of electrodes. Therefore, in the embodiment, a thin high-luminance display which has a plurality of main perspectives and is capable of performing three-dimensional display is allowed to be achieved.

Moreover, in the backlight 211 according to the embodiment, in two-dimensional display, for example, a potential difference is applied to a pair of electrodes (the sub-electrodes 32A and 36A) of each of the light modulation cells 30-1 to allow the optical axes AX2 of the microparticles 34B in each of the light modulation cells 30-1 to intersect with or be orthogonal (or substantially orthogonal) to the optical axis AX1 of the bulk 34A. Therefore, light beams emitted from the light source 20 and entering into the light guide plate 10 are scattered in the scattering region 30B formed in the entire light modulation device 30 (refer to FIG. 35). Light beams having passed through the bottom surface of the scattering region 30B in the scattered light beams are reflected by the reflective plate 40 to be returned to the light guide plate 10 again, and then the light beams are emitted from the top surface of the backlight 211. Moreover, light beams toward the top surface of the scattering region 30B in the scattered light beams pass through the light guide plate 10 to be emitted from the top surface of the backlight 211. Thus, in two-dimensional display, for example, light beams are emitted from the entire top surface of the light modulation device 30 to emit planar illumination light toward a front direction.

Therefore, as the planar illumination light emitted toward the front direction enters into the back surface of the display panel 210, for example, when two-dimensional image data for two-dimensional display associated with respective pixels 210E is generated in the image signal processing circuit 207, planar illumination light enters into the respective pixels 210E at all angles, and image light modulated by the respective pixels 210E is emitted from the respective pixels 210E. At this time, as the viewer views the same image with both eyes, the viewer perceives that a two-dimensional image (a planar image) is displayed on the display panel 210.

Figure 36A:
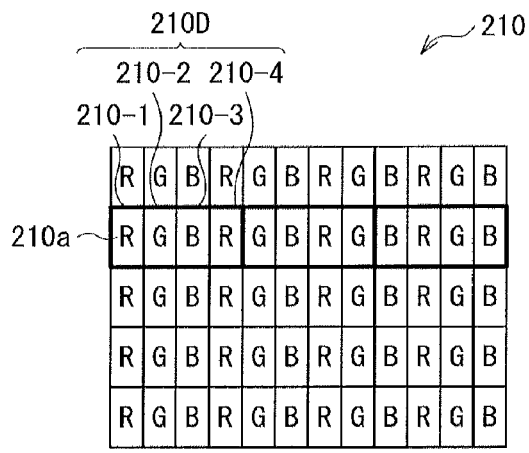
FIGS. 36A to 36D are schematic views for describing a first modification of three-dimensional display on the display section in FIG. 3.
Figure 36B:
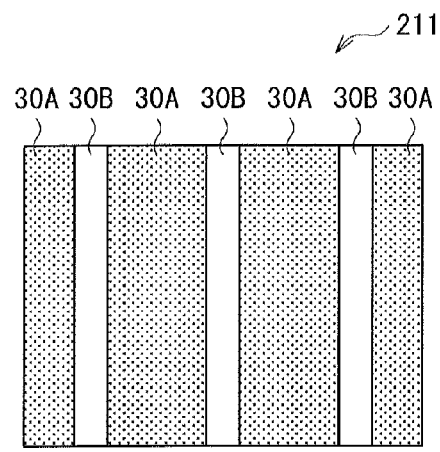
Figure 36C:
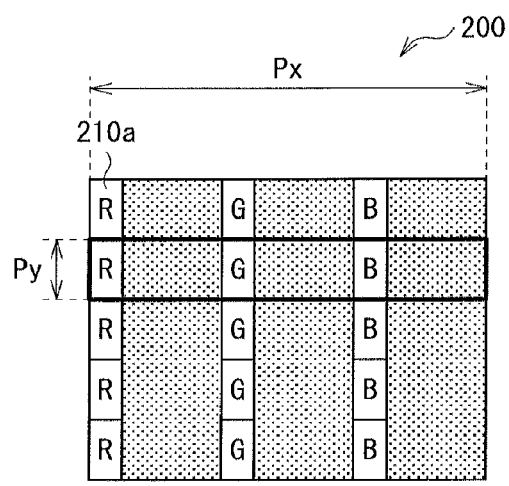
Figure 36D:
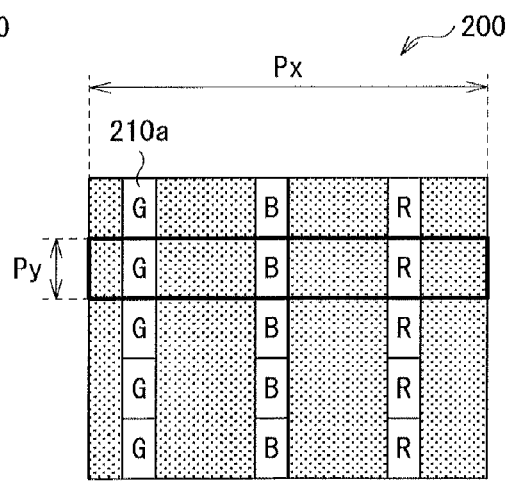

Moreover, in the embodiment, the light modulation layer 34 exhibiting the scattering property or transparency with respect to light from the light source, depending on magnitude of an electric field is included in the backlight 211. Therefore, light emitted from the light source 20 and propagating through the transparent substrate 31 and the like passes through a region exhibiting transparency by electric field control of the light modulation layer 34 to be totally reflected by the top surface of the backlight 211 or to be reflected by the top surface of the backlight 211 with high reflectivity. As a result, luminance in a region corresponding to a region exhibiting transparency in a light emission region (hereinafter simply referred to as "transparent region in the light emission region") of the backlight 211 is reduced, compared to the case where light is uniformly emitted from the entire surface of the backlight 211. On the other hand, light propagating through the transparent substrate and the like is scattered by a region exhibiting the scattering property by the electric field control of the light modulation layer 34 to pass through the top surface of the backlight 211. As a result, luminance in a region corresponding to a region exhibiting the scattering property in the light emission region (hereinafter simply referred to "scattering region in the light emission region") of the backlight 211 is increased, compared to the case where light is uniformly emitted from the entire surface of the backlight 211. Moreover, luminance in white display is partially increased (partial luminance enhancement) by a reduced amount of the luminance of the transparent region in the light emission region. Further, in the embodiment, the area per unit area of each sub-electrode 32A or each linear electrode 32E varies with the distance from the light source 20. Therefore, a density distribution of the transparent region and the scattering region in the light emission region is allowed to be adjusted to become a desired distribution. As a result, compared to the case where a light emission area per unit area of each of the strip-like illumination light beams does not vary with the distance from the light source 20, luminance on a side closer to the light source 20 of the light emission region is allowed to become lower, and luminance on a side farther from the light source 20 of the light emission region is allowed to become higher. Accordingly, in three-dimensional display, a modulation ratio is allowed to be increased, while in-plane luminance is uniformized In the embodiment, for example, as illustrated by a thick-frame in FIG. 36A, in three-dimensional display, a combination of four pixels 210-1 to 210-4 of the display panel 210 is driven as one three-dimensional pixel 210D. At this time, for example, as illustrated in FIG. 36B, the backlight 211 forms one scattering region 30B per three-dimensional pixel 210D to allow backlight light to enter the pixels 210-1 to 210-4 at different incident angles. Therefore, strip-like illumination light beams enter into pixels (for example, in FIG. 34, pixels 210-1, 210-2, 210-3, or 210-4) in the same position in respective three-dimensional pixels 210D at a substantially same angle. As a result, the pixels in the same position in respective three-dimensional pixels 210D outputs image light modulated by the pixels at a predetermined angle. At this time, the viewer concurrently views, for example, image light from the pixel 210a illustrated in FIG. 36C with his right eye and image light from the pixel 210a illustrated in FIG. 36D with his left eye. In other words, the viewer views different images having a parallax therebetween with his right and left eyes. As a result, the viewer perceives that a three-dimensional image (a stereoscopic image) is displayed on the display panel 210.

When a pixel pitch Px in a horizontal direction and a pixel pitch Py in a vertical direction are compared to each other, the pixel pitch Px in the horizontal direction is several times as large as the pixel pitch Py in the vertical direction. Therefore, the viewer views an image with pixel pitches in the vertical direction and the horizontal direction which are greatly different from each other. At this time, the viewer may perceive that image quality is degraded.

Figure 37A:
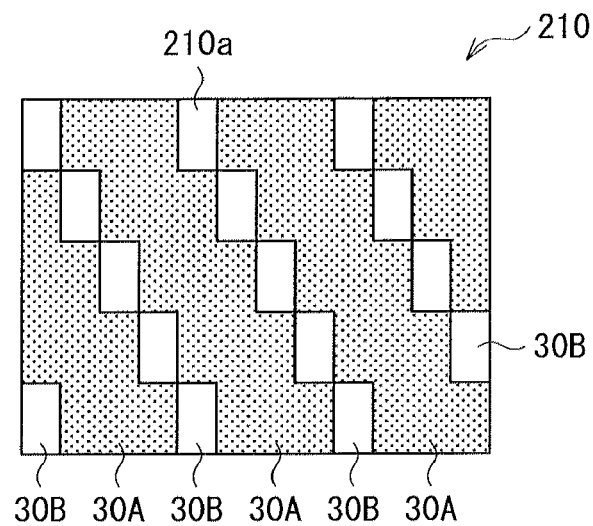
FIGS. 37A and 37B are schematic views for describing a second modification of three-dimensional display on the display section in FIG. 3.
Figure 37B:
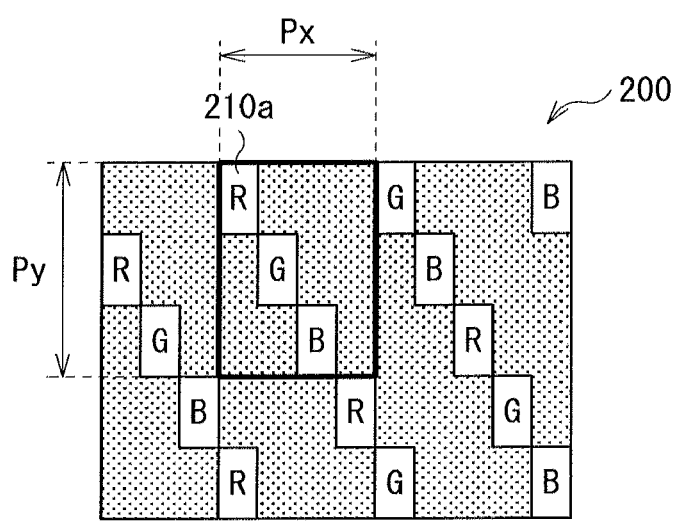

Therefore, for example, as illustrated in FIG. 37A, respective scattering regions 30B are displaced, in relation to other adjacent scattering regions 30B, by the width of the pixel 210a in the horizontal direction (the Y-axis direction). In such a case, as illustrated in FIG. 37B, the pixel pitch Px in the horizontal direction and the pixel pitch Py in the vertical direction are allowed to be closer to each other, compared to the case in FIGS. 36C and 36D. As a result, degradation in image quality is allowed to be suppressed.

Figure 38A:
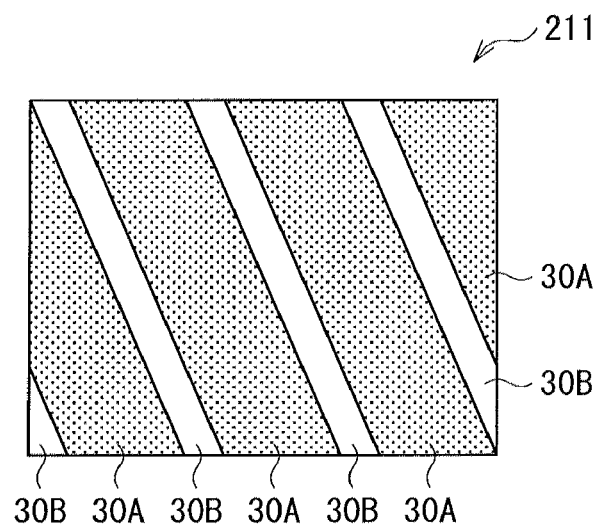
FIGS. 38A and 38B are schematic views for describing a third modification of three-dimensional display on the display section in FIG. 3.
Figure 38B:
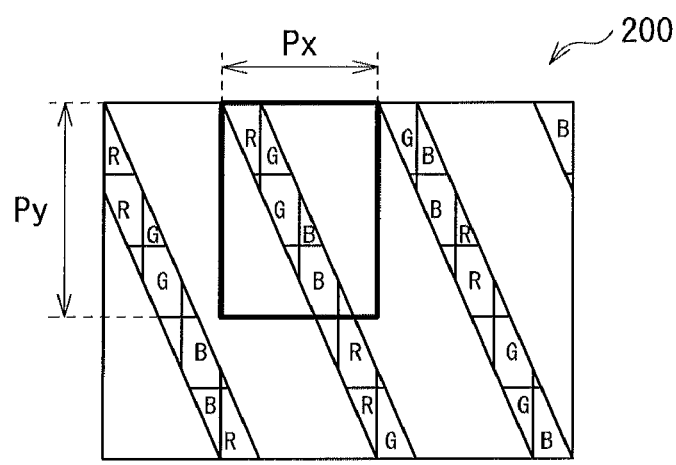

It is to be noted that, as illustrated in FIG. 38A, respective scattering regions 30B may be arranged in oblique stripes. In such a case, as illustrated in FIG. 38B, the pixel pitch Px in the horizontal direction and the pixel pitch Py in the vertical direction are allowed to be closer to each other, compared to the case in FIGS. 36C and 36D. As a result, degradation in image quality is allowed to be suppressed. It is to be noted that, in the case of a display panel having a panel size of 3.5 inches and 800 (vertical)×480 (horizontal)×3 (RGB) pixels, a tilt angle of each scattering region 30B is 71.57 degrees in 4 parallaxes.

It is to be noted that, only to suppress the above-described degradation in image quality, an area of a portion used for one pixel 210a in the display panel 210 of each sub-electrode 32A may be uniform irrespective of the distance from the light source 20. For example, as illustrated in FIGS. 14 and 15, the width of each sub-electrode 32A may be uniform.

Next, other effects of the receiver-side unit 200 according the embodiment will be described below.

Typically, the PDLC is a composite layer which is formed by mixing the liquid crystal material and an isotropic low-molecular material, and causing phase separation by ultraviolet irradiation, drying of a solvent, or the like, and has microparticles of the liquid crystal material dispersed in a polymer material. The liquid crystal material in the composite layer is aligned in random directions under no potential difference application, and thus exhibits the scattering property, but on the other hand, under potential difference application, the liquid crystal material is aligned in an electric field direction; therefore, in the case where the ordinary refractive index of the liquid crystal material and the refractive index of the polymer material are equal to each other, the liquid crystal material exhibits high transparency in the front direction (in a direction of a normal to the PDLC). However, in this liquid crystal material, a difference between the extraordinary refractive index of the liquid crystal material and the refractive index of the polymer material becomes pronounced in an oblique direction; therefore, even if the liquid crystal material has transparency in the front direction, the liquid crystal material exhibits the scattering property in the oblique direction.

A typical light modulation device utilizing the PDLC often has a configuration in which the PDLC is sandwiched between two glass plates on which transparent conductive films are formed. When light obliquely enters from air into the light modulation device with the above-described configuration, the light incident from the oblique direction is refracted by a refractive index difference between the air and the glass plate to enter into the PDLC at a smaller angle. Therefore, large scattering does not occur in such a light modulation device. For example, when light enters from air at an angle of 80°, the incident angle of the light to the PDLC is reduced to approximately 40° by refraction at a glass interface.

However, in an edge-light system with use of a light guide plate, as light enters through the light guide plate, the light crosses the PDLC at a large angle of approximately 80°. Accordingly, a difference between the extraordinary refractive index of the liquid crystal material and the refractive index of the polymer material is large, and light crosses the PDCL at a larger angle, thereby causing a longer optical path subjected to scattering. For example, in the case where microparticles of a liquid crystal material having an ordinary refractive index of 1.5 and an extraordinary refractive index of 1.65 are dispersed in a polymer material having a refractive index of 1.5, there is no refractive index difference in the front direction (the direction of the normal to the PDLC), but the refractive index difference is large in the oblique direction. Therefore, the scattering property in the oblique direction is not allowed to be reduced, thereby causing low view angle characteristics. Further, in the case where an optical film such as a diffusion film is disposed on the light guide plate, oblique leak light is diffused also in the front direction by the diffusion film or the like, thereby causing an increase in light leakage in the front direction and a decrease in a modulation ratio in the front direction.

On the other hand, in the embodiment, as the bulk 34A and the microparticles 34B each include mainly an optical anisotropic material, the scattering property in an oblique direction is reduced, thereby enabling to improve transparency. For example, the bulk 34A and the microparticles 34B include mainly the optical anisotropic materials with ordinary refractive indices which are equal to each other and extraordinary refractive indices which are also equal to each other, and in addition thereto, the directions of the optical axes of the bulk 34A and the microparticles 34B coincide with or substantially coincide with each other in a region where a potential difference is not applied between the lower electrode 32 and the upper electrode 36. Therefore, the refractive index difference is reduced or eliminated in all directions including the front direction (a direction of the normal to the light modulation device 30) and the oblique direction, thereby obtaining high transparency. As a result, the leakage of light in a range having a large view angle is allowed to be reduced or substantially eliminated, and view angle characteristics are allowed to be improved.

For example, when a liquid crystal having an ordinary refractive index of 1.5 and an extraordinary refractive index of 1.65, and a liquid crystal monomer having an ordinary refractive index of 1.5 and an extraordinary refractive index of 1.65 are mixed, and the liquid crystal monomer is polymerized in a state where the liquid crystal and the liquid crystal monomer are aligned by an alignment film or an electric field, the optical axis of the liquid crystal and the optical axis of a polymer formed by polymerizing the liquid crystal monomer coincide with each other. Therefore, the refractive indices coincide with each other in all directions, thereby enabling to achieve a state where transparency is high, and to further improve the view angle characteristics.

Moreover, in the embodiment, for example, as illustrated in parts (A) and (B) FIG. 29, luminance in the transparent region 30A (luminance in black display) is lower, compared to the case where light is uniformly emitted from the entire surface of the backlight 211 (indicated by the alternate long and short dash line in the part (B) in FIG. 29). On the other hand, luminance in the scattering region 30B is significantly increased, compared to the case where light is uniformly emitted from the entire surface of the backlight 211 (indicated by the alternate long and short dash line in the part (B) in FIG. 29), and luminance in white display is partially increased (partial luminance enhancement) by a reduced amount of the luminance of the transparent region 30A.

The partial luminance enhancement is a technique of enhancing luminance when white display is partially performed, compared to the case where white display is performed on an entire screen. The partial luminance enhancement is generally used in a CRT, a PDP, or the like. However, in a liquid crystal display, as a backlight uniformly emits light in an entire surface thereof irrespective of an image, the luminance is not allowed to be partially enhanced. When an LED backlight in which a plurality of LEDs are two-dimensionally arranged is used as the backlight, some of the LEDs are allowed to be turned off. However, in such a case, diffusion light from dark regions in which the LEDs are turned off disappears; therefore, the luminance becomes lower, compared to the case where all of the LEDs are turned on. Also, the luminance may be increased by increasing a current applied to some LEDs which are turned on; however, in such a case, a large current flows for an extremely short time, thereby causing an issue in terms of load and reliability of a circuit.

On the other hand, in the embodiment, as the bulk 34A and the microparticles 34B each include mainly the optical anisotropic material, the scattering property in the oblique direction is suppressed to reduce leak light from the light guide plate in a dark state. Therefore, as light is guided from a part in a partially-dark state to a part in a partially-bright state, partial luminance enhancement is achievable without increasing electric power supplied to the backlight 211.

Moreover, in the embodiment, in a region where a potential difference is not applied between the lower electrode 32 and the upper electrode 36, the optical axes AX2 of the microparticles 34B are parallel to the light incident surface 10A of the light guide plate 10 and intersect with the surfaces of the transparent substrates 31 and 37 at the slight angle θ1. In other words, the liquid crystal molecules included in the microparticles 34B are aligned to be tilted at the angle θ1 in a plane parallel to the light incident surface 10A (i.e., to have a pretilt angle). Therefore, under potential difference application, the liquid crystal material included in the microparticles 34B does not rise in random directions, but rises in the plane parallel to the light incident surface 10A. At this time, the optical axis AX1 of the bulk 34A and the optical axes AX2 of the microparticles 34B intersect with or are orthogonal (substantially orthogonal) to each other in the plane parallel to the light incident surface 10A.

In this case, light vibrating perpendicularly with respect to the transparent substrate 31 in light incident from the light incident surface 10A of the light guide plate 10 exhibits a difference between the extraordinary refractive index of the microparticle 34B and the ordinary refractive index of the bulk 34A. At this time, as the difference between the extraordinary refractive index of the microparticle 34B and the ordinary refractive index of the bulk 34A is large, scattering efficiency of light vibrating perpendicularly with respect to the transparent substrate 31 is increased. On the other hand, light vibrating in parallel with the transparent substrate 31 exhibits a difference between the ordinary refractive index of the microparticle 34B and the extraordinary refractive index of the bulk 34A. At this time, as the difference between the ordinary refractive index of the microparticle 34B and the extraordinary refractive index of the bulk 34A is also large, scattering efficiency of light vibrating in parallel with the transparent substrate 31 is increased. Therefore, light propagating through a region where a potential difference is applied between the lower electrode 32 and the upper electrode 36 includes a large amount of a component in an oblique direction. For example, in the case where an acrylic light guide plate is used as the light guide plate 10, light in a region where a potential difference is applied between the lower electrode 32 and the upper electrode 36 propagates at an angle of 41.8° or over. As a result, a refractive index difference in all directions including the oblique direction is increased to obtain a high scattering property, thereby enabling to improve display luminance. Moreover, the display luminance is allowed to be further improved by the above-described partial luminance enhancement effect.

[Anisotropic Scattering]

Figure 39A:
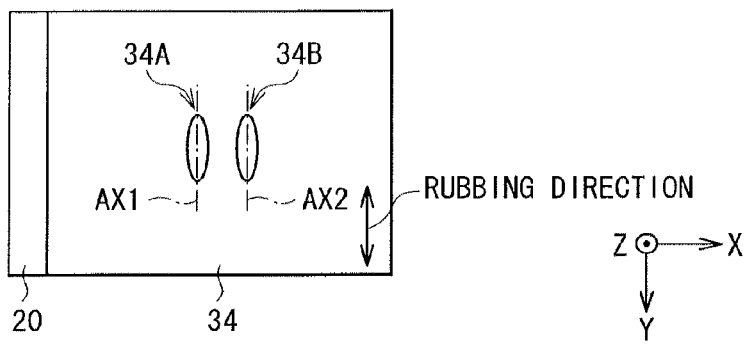
FIGS. 39A and 39B are schematic views for describing an example of a function of the light modulation layer in FIG. 4.
Figure 39B:
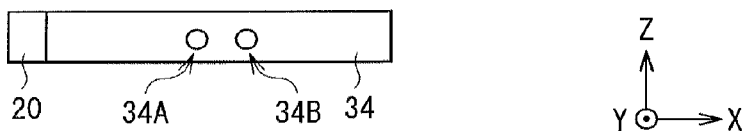
Figure 40A:
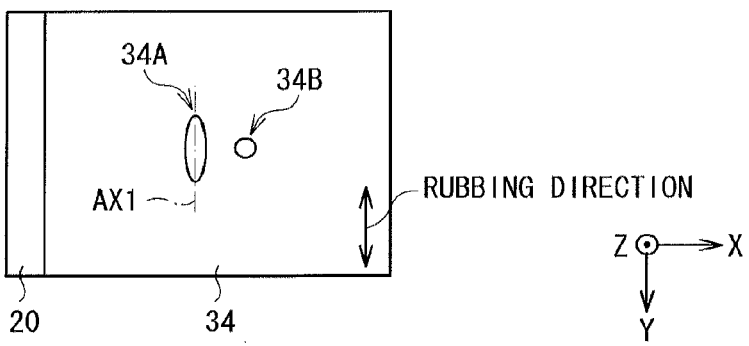
FIGS. 40A and 40B are schematic views for describing another example of the function of the light modulation layer in FIG. 4.
Figure 40B:
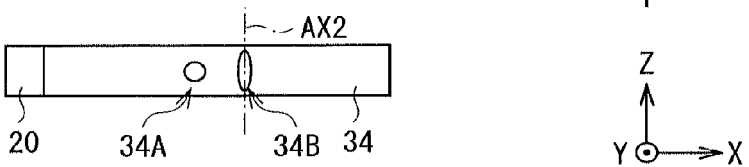

Next, anisotropic scattering in the embodiment will be described below. FIGS. 39A, 39B, 40A, and 40B illustrate examples of refractive index ellipsoids of the bulk 34A and the microparticle 34B in the light modulation layer 34 in the above-described embodiment. FIGS. 39A and 39B illustrate an example of refractive index ellipsoids of the bulk 34A and the microparticle 34B under no potential difference application, and FIGS. 40A and 40B illustrate an example of refractive index ellipsoids of the bulk 34A and the microparticle 34B under potential difference application.

As described above, as illustrated in FIGS. 39A and 39B, under no potential difference application, the optical axis of the bulk 34A and the optical axis of the microparticle 34B are aligned in a direction parallel to the light incident surface 10A of the light guide plate 10 as well as in a direction intersecting with the surfaces of the transparent substrates 31 and 37 at the angle θ1. Moreover, as described above, as illustrated in FIGS. 40A and 40B, under potential difference application, the optical axis of the bulk 34A is aligned in the same direction as that under no potential difference application. Further, the optical axis of the microparticle 34B is aligned in a direction parallel to the light incident surface 10A of the light guide plate 10 as well as in a direction intersecting with the surfaces of the transparent substrates 31 and 37 at the angle θ2 (for example, 90°) larger than the angle θ1.

Thus, the above-described change is caused in liquid crystal molecules in the microparticles 34B in response to potential difference application and no potential difference application; however, in the course of the change, the bulk 34A does not respond to a potential difference change, or the response speed of the bulk 34A is slow; therefore, the long-axis direction of the streaky structure of the bulk 34A is aligned in a rubbing direction (a direction parallel to the light incident surface 10A (a Y-axis direction in FIGS. 39A, 39B, 40A, and 40B)). Thus, under potential difference application, light which is emitted from the light source 20 and propagates through the light modulation layer 34 propagates while exhibiting a difference between the extraordinary refractive index of the microparticle 34B and the ordinary refractive index of the bulk 34A, or a difference between the ordinary refractive index of the microparticle 34B and the extraordinary refractive index of the bulk 34A in cycles of average streaky texture size in a short-axis direction of the streaky structure of the bulk 34A. As a result, the light propagating through the light modulation layer 34 is largely scattered in a thickness direction of the light modulation layer 34, but is not scattered much in a direction parallel to the light incident surface 10A. In other words, the light modulation layer 34 exhibits anisotropy in the scattering property in the Y-axis direction and a Z-axis direction in a plane (a YZ plane) parallel to the light incident surface 10A. Thus, the light modulation layer 34 exhibits anisotropic scattering with respect to light emitted from the light source 20 and propagating through the light modulation layer 34.

In the light modulation layer 34, in consideration of the refractive index ellipsoids of the bulk 34A and the microparticles 34B, a Y-axis-direction (rubbing direction)-polarized component in light propagating in the Z-axis direction in FIGS. 40A and 40B has higher scattering power, compared to an X-axis-direction-polarized component. In other words, the light modulation layer 34 also exhibits an anisotropic scattering property in a polarization direction with respect to light propagating in the thickness direction of the light modulation layer 34. Light polarized in the X-axis direction is scattered by a difference between the ordinary refractive index of the bulk 34A and the ordinary refractive index of the microparticle 34B, but the values thereof are substantially equal to each other; therefore, the scattering property is low. On the other hand, light polarized in the Y-axis direction is scattered by a difference between the extraordinary refractive index of the bulk 34A and the ordinary refractive index of the microparticle 34B, and the values thereof are largely different from each other; therefore, the scattering property is high.

The degree of anisotropic scattering actually exhibited by the light modulation layer 34 will be examined below.

Figure 41A:
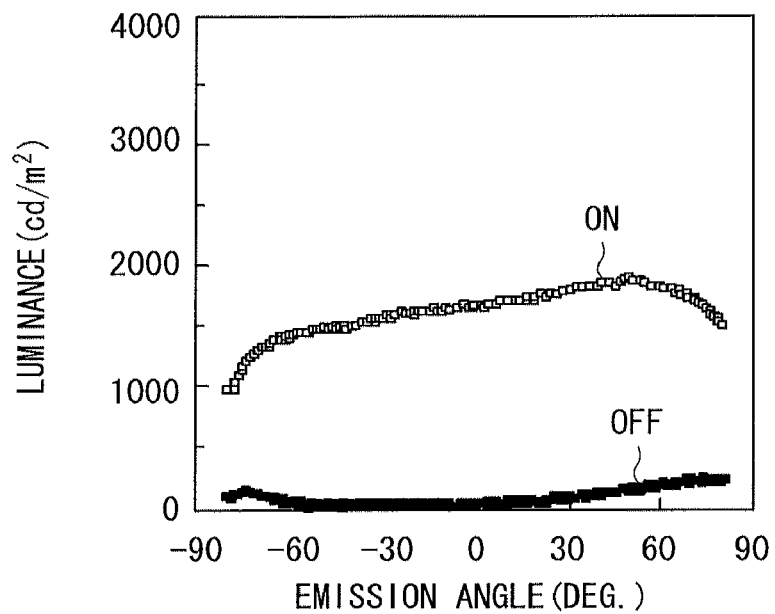
FIGS. 41A and 41B are diagrams for describing effects of the light modulation layer in FIG. 4 and a comparative example.
Figure 41B:
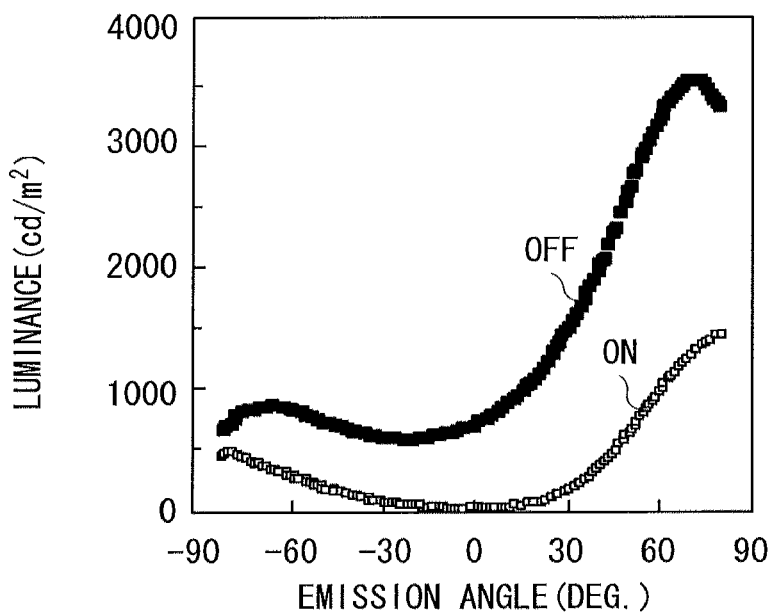
Figure 42A:
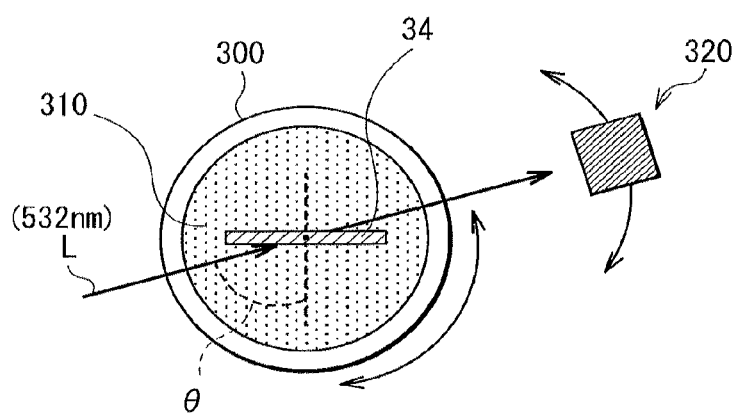
FIGS. 42A and 42B are diagrams illustrating an example of a device measuring optical characteristics of the light modulation layer.
Figure 42B:
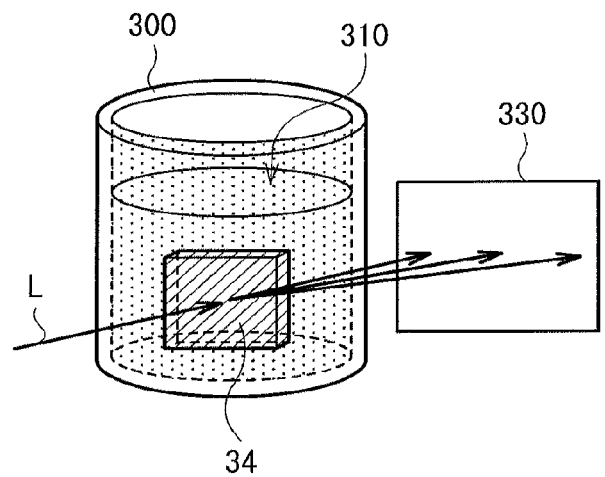

FIGS. 41A and 41B illustrate results of measuring emission angle characteristics of light from the light guide plate. FIG. 41A illustrates a result in the case where the modulation layer 34 was used, and FIG. 41B illustrates a result in the case where a light modulation layer exhibiting optical isotropy in a plane was used. Typically, a white reflective plate is used on a bottom surface of the light modulation layer; however, to accurately examine emission characteristics from the light modulation layer and the light guide plate, a black absorption layer was disposed on the bottom surface of the light modulation layer instead of the white reflective plate.

In the case where the light modulation layer exhibiting optical isotropy in a plane was used, light extracted from the light guide plate included a large amount of a component close to the light guide plate and a smaller amount of a component in the front direction. On the other hand, in the case where the light modulation layer 34 exhibiting optical anisotropy in a plane was used, the amount of light in the front direction was relatively large when light was extracted from the light guide plate, and such a profile is suitable for an illumination unit. Moreover, in a black state, the amount of light diagonally leaked in an optically isotropic modulation layer was larger than that in an anisotropic light modulation layer; therefore, the anisotropic light modulation layer has an advantage in terms of light modulation ratio performance. Further, in the case where an optical sheet is used on the light guide plate with an air interface in between, it is considered that the amount of light lost by reflection by the optical sheet and the air interface is large; therefore, emission characteristics from the light guide plate in which the amount of the component in the front direction is larger is suitable. As different monomer materials and different liquid crystal materials were used for the two light modulation layers used for examination, it is difficult to compare light extraction intensity between the two light modulation layers; however, in the case where a material having the same optical property is used as the light modulation layer, when light modulation layer 34 having optical anisotropy in a plane is used, light use efficiency is allowed to be increased.

Figure 43A:
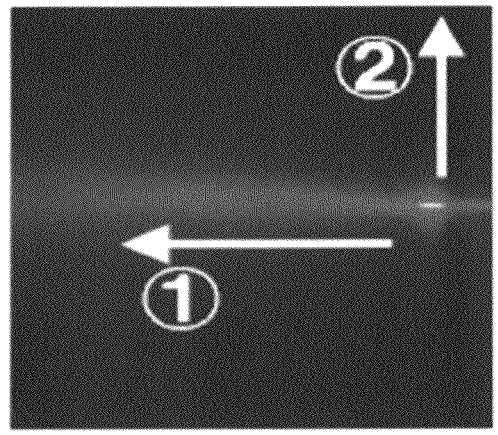
FIGS. 43A to 43C are diagrams illustrating an example of results determined by measurement with the device in FIGS. 42A and 42B.
Figure 43B:
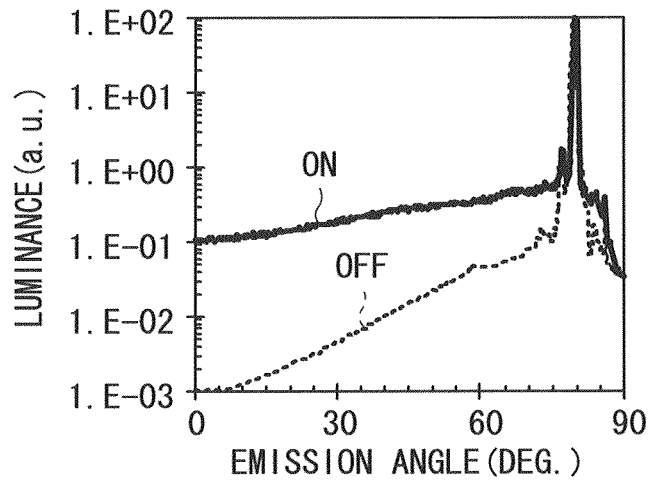
Figure 43C:
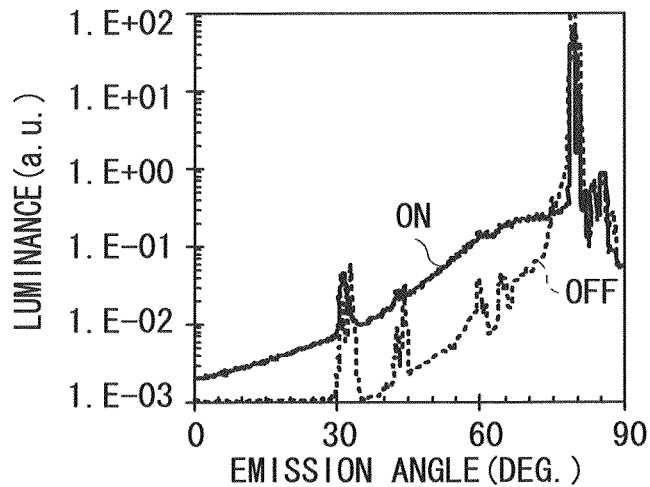

As it was found from the above-described results that, in the case where the two light modulation layers were used, the respective emission angle characteristics were different from each other, scattering characteristics of the light modulation layer 34 were next measured. In a state that the light guide plate is used, total reflection by the light guide plate occurs, and scattering angle characteristics are not allowed to be measured; therefore, the scattering angle characteristics were measured by a unit illustrated in FIGS. 42A and 42B. More specifically, a matching oil 310 and the light modulation layer 34 were put into a columnar glass container 300, and the light modulation layer 34 was irradiated with laser light L at a large incident angle θ (for example, 80°) allowing light to be guided through a light guide plate to evaluate the scattering angle characteristics. FIG. 43A illustrates a state of a luminance distribution shown on a measured surface 330 when the laser light L entered into the light modulation layer 34 at the large incident angle θ (for example) 80°. FIG. 43B illustrates a light intensity distribution obtained by scanning of a detector 320 around, as a central axis, an axis parallel to the optical axis AX1 (not illustrated) of the bulk 34A in the light modulation layer 34 in a plane perpendicular to the rubbing direction (corresponding to a ZX plane in FIGS. 39A, 39B, 40A, and 40B). The light intensity distribution at this time corresponds to a distribution in a direction indicated by (1) in FIG. 43A. Further, FIG. 43C illustrates a luminance distribution obtained by scanning of the detector 320 around, as the central axis, an axis perpendicular to the optical axis AX1 (not illustrated) of the bulk 34A in the light modulation layer 34 in a plane parallel to the rubbing direction as well as parallel to the light incident surface of the light modulation layer 34 (corresponding to a ZY plane of FIGS. 39A, 39B, 40A, and 40B). The light intensity distribution at this time corresponds to a distribution in a direction indicated by (2) in FIG. 43A.

From FIGS. 43A to 43C, scattering characteristics in the plane perpendicular to the rubbing direction (corresponding to the ZX plane in FIGS. 39A, 39B, 40A, and 40B) were higher than those in the plane parallel to the rubbing direction (corresponding to the ZY plane in FIGS. 39A, 39B, 40A, and 40B), and in the front direction (at an emission angle of 0°), intensity was different by approximately 50 times (under potential difference application). In other words, it was found that, for example, as illustrated in FIGS. 43A to 43C, the light modulation layer 34 had anisotropic scattering characteristics in which scattering in the thickness direction (Z-axis direction) of the light modulation layer 34 was larger than scattering in the rubbing direction (direction parallel to the light incident face 10A (a Y-axis direction)). Accordingly, it was found that when the liquid crystal molecules in the microparticles 34B were aligned in the thickness direction of the light modulation layer 34 in a state where the long-axis direction of the streaky structure of the bulk 34A was aligned in the rubbing direction (the direction parallel to the light incident face 10A (the Y-axis direction in FIGS. 39A, 39B, 40A, and 40B)), the light modulation layer 34 exhibited the above-described anisotropic scattering with respect to light emitted from the light source 20.

Figure 44A:
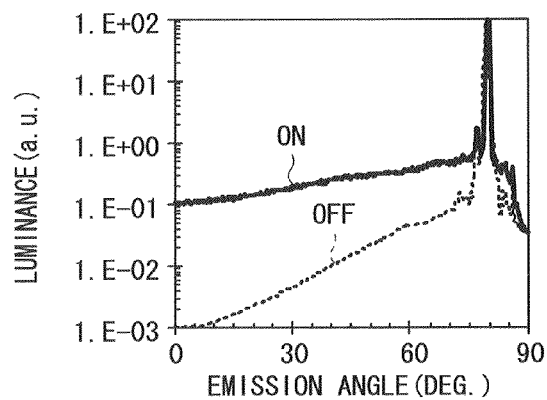
FIGS. 44A to 44C are diagrams illustrating another example of the results determined by measurement with the device in FIGS. 42A and 42B.
Figure 44A:
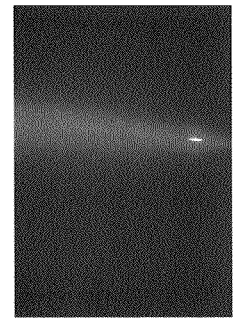
Figure 44B:
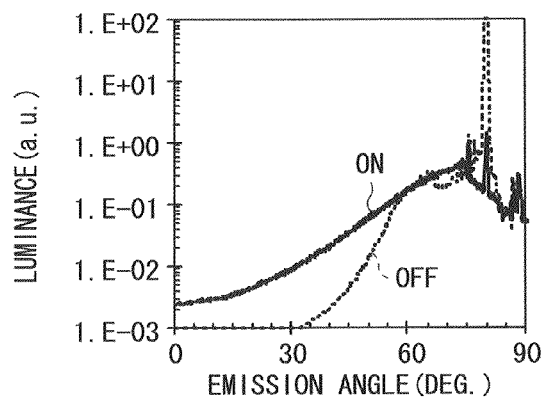
Figure 44B:
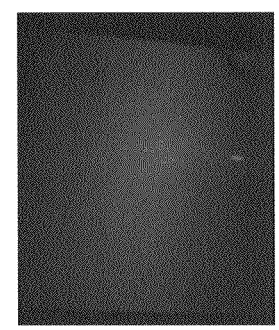
Figure 44C:
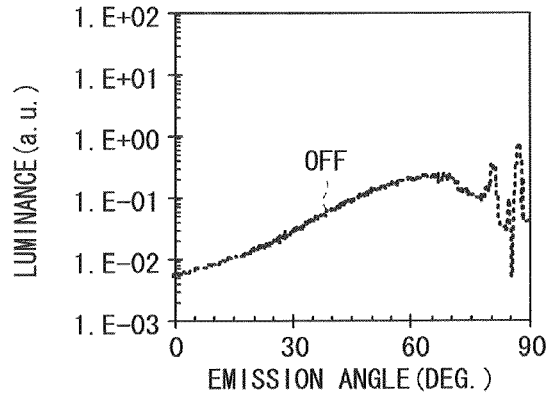
Figure 44C:
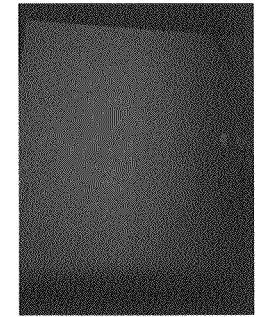
Figure 45A:
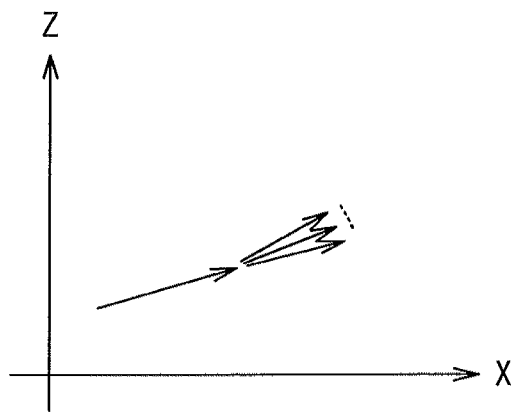
FIGS. 45A to 45C are conceptual diagrams for describing isotropic scattering.
Figure 45B:
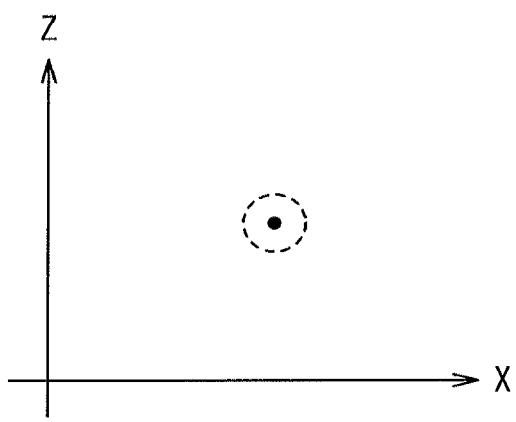
Figure 45C:
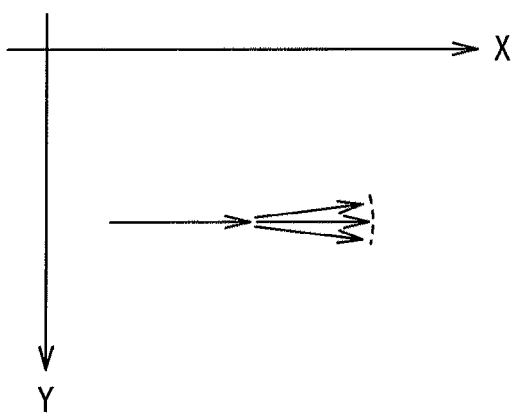

FIG. 44A illustrates scattering characteristics of the light modulation layer 34. FIG. 44B illustrates scattering characteristics of a light modulation layer in which a direction where a liquid crystal is tilted by a potential difference is not determined (a pretilt of 90°). FIG. 44C illustrates scattering characteristics of a normal light modulation layer which is made of an isotropic polymer and does not exhibit optical anisotropy in a plane. It was found from FIGS. 44A to 44C that, in the light modulation layer 34, incident light was largely scattered even in the front direction, compared to the other light modulation layer, and only the light modulation layer 34 exhibited anisotropic scattering.

Figure 46A:
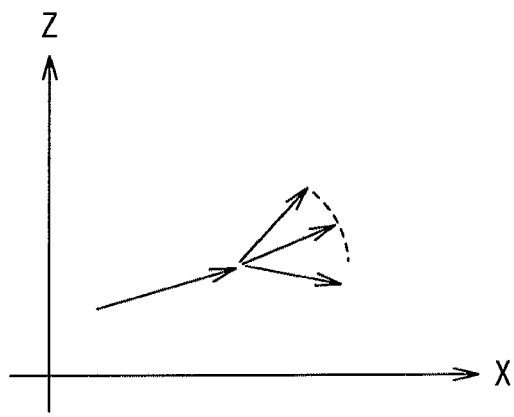
FIGS. 46A to 46C are conceptual diagrams for describing anisotropic scattering.
Figure 46B:
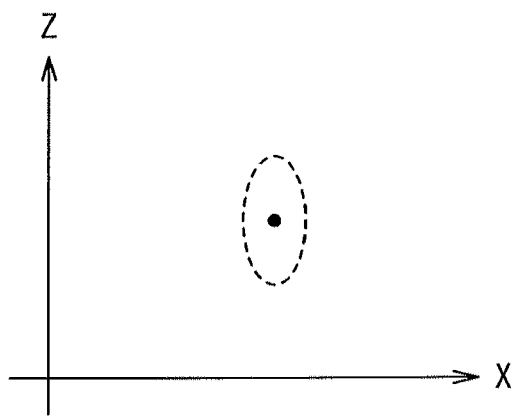
Figure 46C:
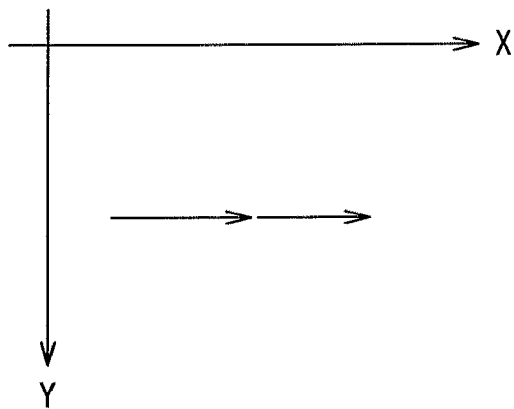

Next, description will be given of a reason why light extraction from the light guide plate is superior in the case where such anisotropic scattering is exhibited. In the case where a light modulation layer, a light guide plate, and a light source are arranged, a light guide plate printed with a white pattern and the above-described normal light modulation layer exhibit isotropic scattering characteristics, for example, as illustrated in FIGS. 45A to 54C; therefore, the amount of light scattered in a direction parallel to an plane of the light guide plate is large, and a probability of changing an angle until light guide conditions are disrupted is low. On the other hand, in the case where anisotropic scattering is exhibited as in the case of the light modulation layer 34, for example, as illustrated in FIGS. 46A to 46C, incident light is largely scattered in a direction perpendicular to an in-plane direction of the light guide plate, and thus scattering occurs preferentially in a direction where light guide conditions are disrupted. Accordingly, it is considered that light extraction efficiency from the light guide plate is improved by exhibiting anisotropic scattering.

In terms of improving a scattering property of guided light, an average streaky texture size in the short-axis direction of the bulk 34A is preferably within a range of 0.1 μm to 10 μm both inclusive, and more preferably within a range of 0.2 μm to 2.0 μm both inclusive.

[Modification]

In the above-described embodiment, the optical axes AX1 and AX2 are directed in a direction parallel or substantially parallel to the light incident surface 10A and the transparent substrate 31 under no potential difference application, and the optical axis AX2 is displaced to a direction intersecting with or orthogonal (or substantially orthogonal) to the transparent substrate 31 under potential difference application. However, the optical axes AX1 and AX2 may be directed in a direction intersecting with or orthogonal (or substantially orthogonal) to the light incident surface 10A as well as in a direction parallel or substantially parallel to the transparent substrate 31 under no potential difference application, and the optical axis AX2 may be displaced to a direction intersecting with or orthogonal (or substantially orthogonal) to the transparent substrate 31 under potential difference application.

2. Second Embodiment

Figure 47:
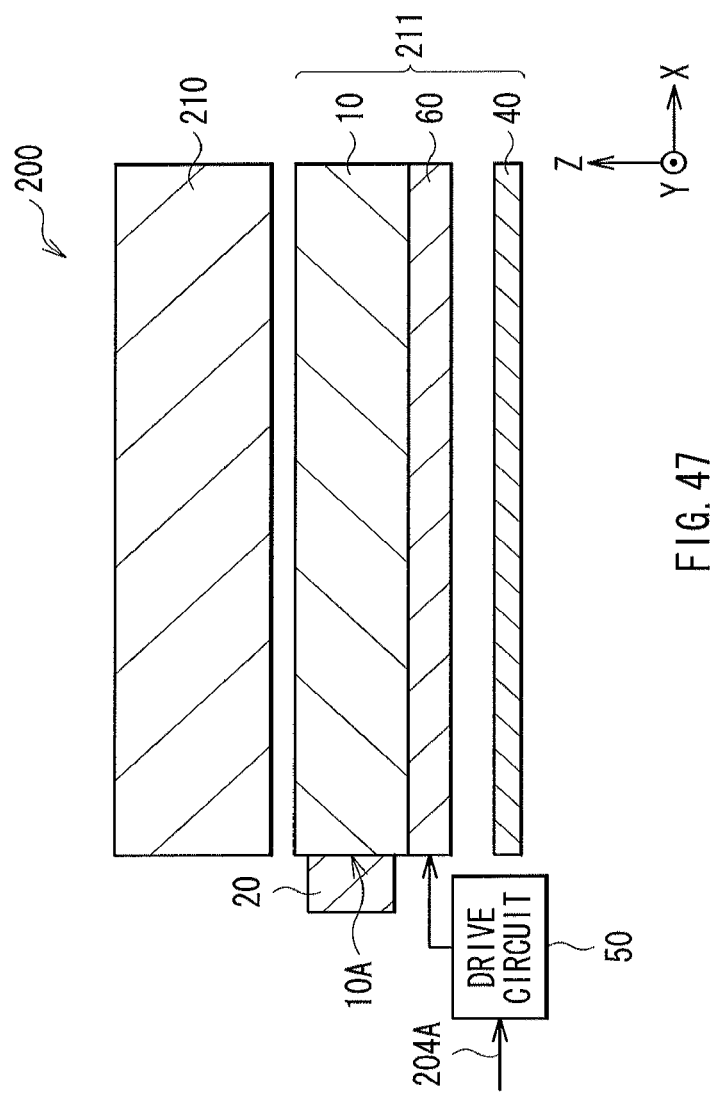
FIG. 47 is a sectional view illustrating an example of a configuration of a display section in a receiver-side unit according to a second embodiment of the application.

Next, the receiver-side unit 200 according to a second embodiment of the application will be described below. As illustrated in FIG. 47, the receiver-side unit 200 according to the embodiment is distinguished from the receiver-side unit 200 according to the above-described embodiment by the fact that a light modulation device 60 is used instead of the light modulation device 30. Description will be given of, mainly, points different from the configuration of the above-described embodiment, and points common to the configuration of the above-described embodiment will not be further described.

Figure 48:
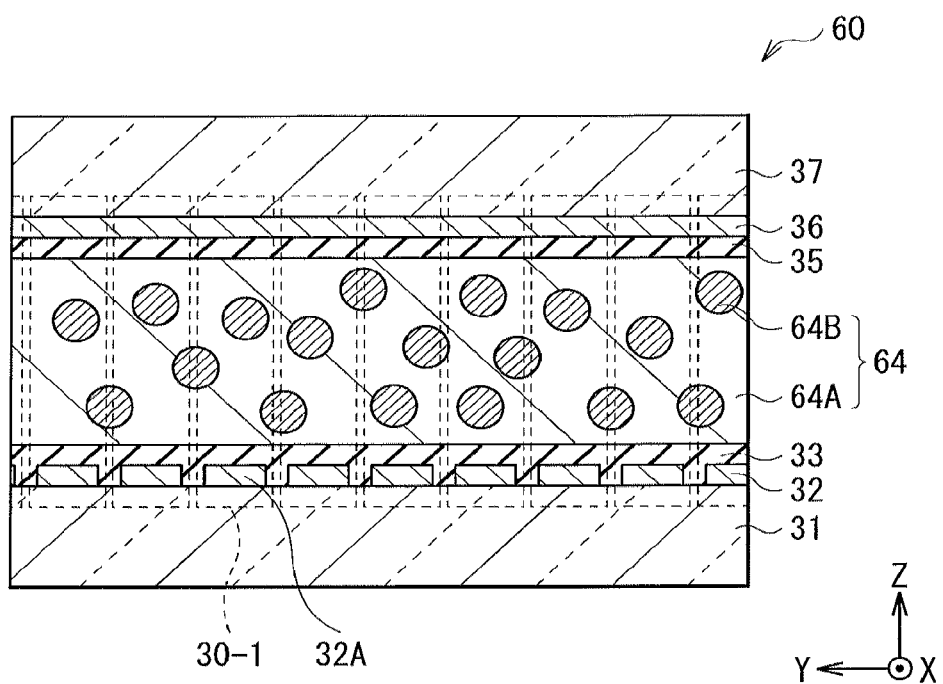
FIG. 48 is a sectional view illustrating an example of a configuration of a light modulation device in FIG. 47.

In the light modulation device 60, vertical alignment films are used as the alignment films 33 and 35, and as illustrated in FIG. 48, a light modulation layer 64 is included instead of the light modulation layer 34.

In the case where the vertical alignment films are used as the alignment films 33 and 35, in a bulk 64A and microparticles 64B which will be described later, a pretilt aligned to be tilted from the transparent substrate 31 is formed by the vertical alignment films. The vertical alignment films may be made of a silane coupling material, polyvinyl alcohol (PVA), a polyimide-based material, a surface-active agent, or the like. For example, a rubbing process is performed after coating with these materials and drying the materials, to form a pretilt in a rubbing direction. Moreover, when plastic films are used as the transparent substrates 31 and 37, it is preferable that in a manufacturing process, a firing temperature after coating the surfaces of the transparent substrates 31 and 37 with the alignment films 33 and 35 be as low as possible; therefore, a silane coupling material allowing to use an alcohol-based solvent is preferably used as the alignment films 33 and 35. It is to be noted that a pretilt may be formed without performing a rubbing process on the alignment films 33 and 35. Examples of a method of achieving this include a method of irradiating cells formed in the alignment films 33 and 35 with ultraviolet light while applying, to the cells, a magnetic field or an oblique electric field caused by a slit electrode.

However, in the case where the vertical alignment films are used as the alignment films 33 and 35, as liquid crystal molecules included in the microparticles 64B, liquid crystal molecules having negative dielectric constant anisotropy (a so-called negative type liquid crystal) are preferably used.

Next, the light modulation layer 64 in the embodiment will be described below. The light modulation layer 64 is a composite layer including the bulk 64A and a plurality of microparticles 64B dispersed in the bulk 64A. The bulk 64A and the microparticles 64B have optical anisotropy.

Figure 49A:
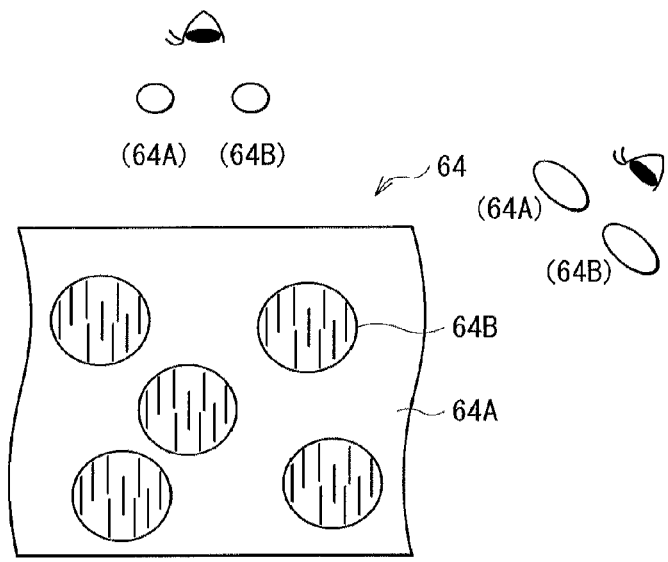
FIGS. 49A to 49C are schematic views for describing an example of a function of a light modulation layer in FIG. 48.
Figure 49B:
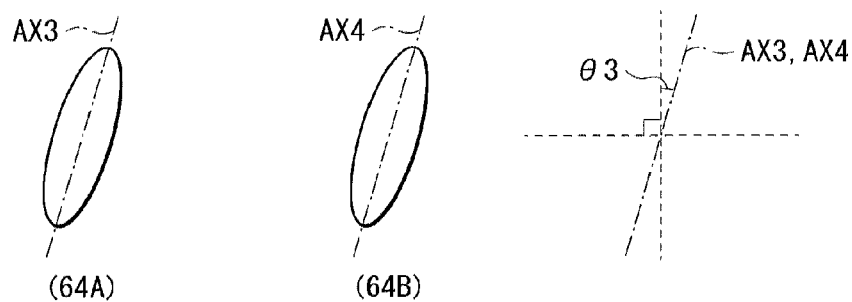
Figure 49C:
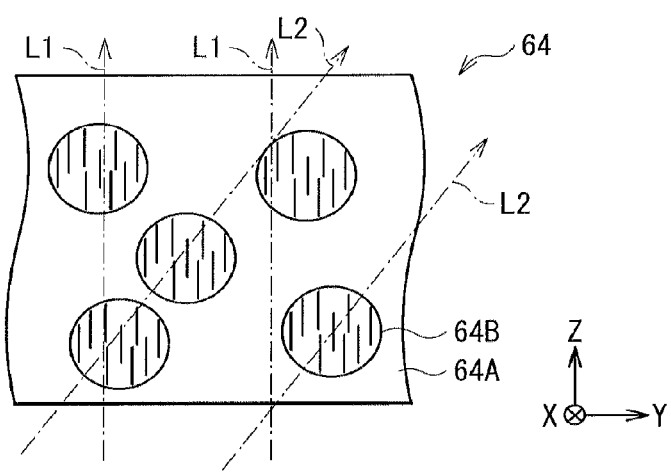

FIG. 49A schematically illustrates an example of an alignment state in the microparticles 64B under no potential difference application. It is to be noted that, in FIG. 49A, an alignment state in the bulk 64A is not illustrated. FIG. 49B illustrates an example of refractive index ellipsoids exhibiting refractive index anisotropy of the bulk 64A and the microparticle 64B under no potential difference application. FIG. 49C schematically illustrates an example of a state where light L1 toward a front direction and light L2 toward an oblique direction pass through the light modulation layer 64 under no potential difference application.

Figure 50A:
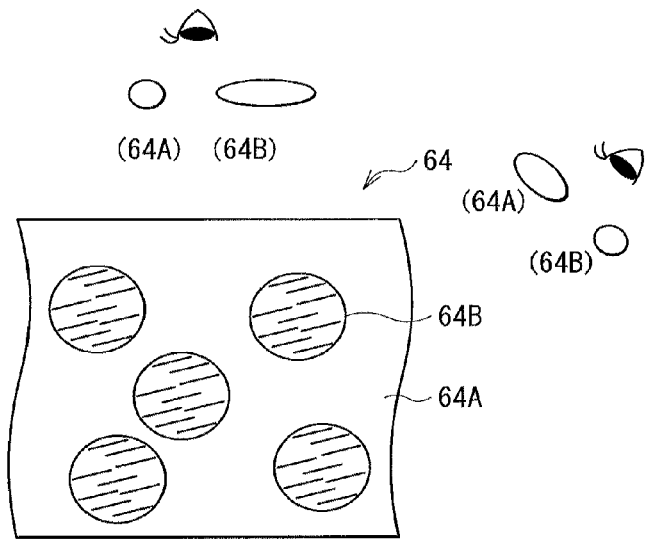
FIGS. 50A to 50C are schematic views for describing another example of the function of the light modulation layer in FIG. 48.
Figure 50B:
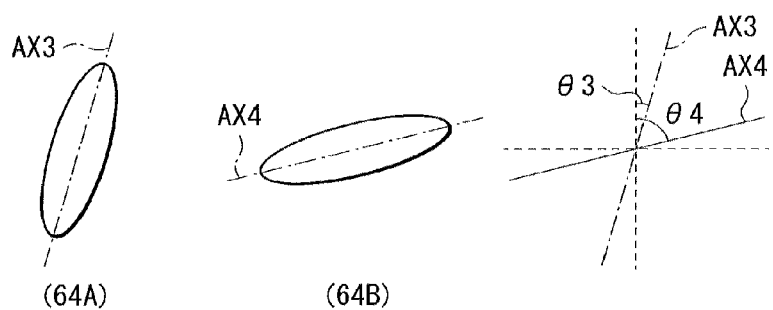
Figure 50C:
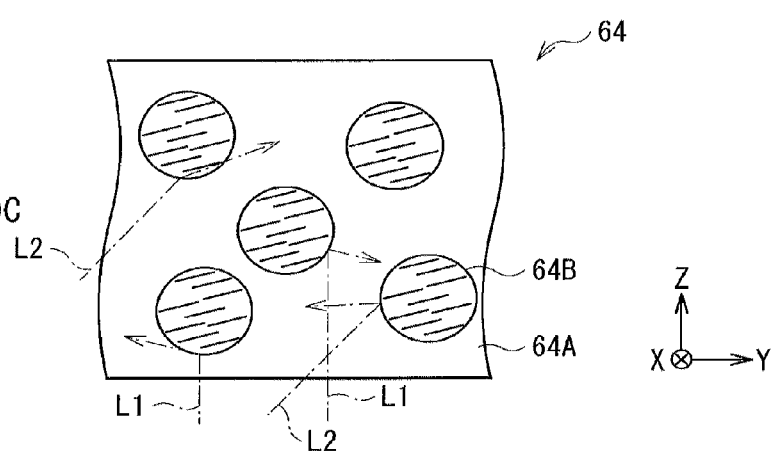

FIG. 50A schematically illustrates an example of an alignment state in the microparticles 64B under potential difference application. It is to be noted that, in FIG. 50A, an alignment state in the bulk 64A is not illustrated. FIG. 50B illustrates an example of refractive index ellipsoids exhibiting refractive index anisotropy of the bulk 64A and the micropar ticle 64B under potential difference application. FIG. 50C schematically illustrates an example of a state where the light L1 toward the front direction and the light L2 toward the oblique direction are scattered by the light modulation layer 64 under potential difference application.

For example, as illustrated in FIGS. 49A and 49B, under no potential difference application, the bulk 64A and the microparticle 64B are structured to allow the direction of an optical axis AX3 of the bulk 64A and the direction of an optical axis AX4 of the microparticle 64B to coincide with (are parallel to) each other. It is to be noted that the optical axes AX3 and AX4 each indicate a line parallel to a travel direction of a light beam allowing a refractive index to have one value irrespective of polarization direction. Moreover, it is not necessary for the directions of the optical axis AX3 and the optical axis AX4 to consistently coincide with each other, and the direction of the optical axis AX3 and the direction of the optical axis AX4 may be slightly deviated from each other due to, for example, a manufacturing error.

Moreover, for example, the microparticle 64B is structured to allow the optical axis AX4 thereof to be parallel to the light incident surface 10A of the light guide plate 10 under no potential difference application. Further, for example, the microparticle 64B is further structured to allow the optical axis AX4 thereof to intersect with normals to the transparent substrates 31 and 37 at a slight angle θ3 (refer to FIG. 49B) under no potential difference application. It is to be noted that the angle θ3 will be described in more detail when a material forming the microparticle 64B is described.

On the other hand, for example, the bulk 64A is structured to have a fixed optical axis AX4 irrespective of whether or not a potential difference is applied between the lower electrode 32 and the upper electrode 36. More specifically, for example, as illustrated in FIGS. 49A, 49B, 50A, and 50B, the bulk 64A is structured to have the optical axis AX3 parallel to the light incident surface 10A of the light guide plate 10 as well as intersecting with the normals to the transparent substrates 31 and 37 at the slight angle θ3. In other words, under no potential difference application, the optical axis AX3 of the bulk 64A is parallel to the optical axis AX4 of the microparticle 64B.

It is to be noted that it is not necessary for the optical axis AX4 to be consistently parallel to the light incident surface 10A of the light guide plate 10 as well as to consistently intersect with the normals to the transparent substrates 31 and 37 at the angle θ3, and the optical axis AX4 may intersect with the normals to the transparent substrates 31 and 37 at an angle slightly different form the angle θ3 due to, for example, a manufacturing error. Moreover, it is not necessary for the optical axes AX3 and AX4 to be consistently parallel to the light incident surface 10A of the light guide plate 10, and the optical axes AX3 and AX4 may intersect with the light incident surface 10A of the light guide plate 10 at a small angle due to, for example, a manufacturing error.

In this case, ordinary refractive indices of the bulk 64A and the microparticle 64B are preferably equal to each other, and extraordinary refractive indices of the bulk 64A and the microparticle 64B are preferably equal to each other. In this case, for example, under no potential difference application, as illustrated in FIG. 49A, there is little difference in refractive index in all directions including the front direction and the oblique direction, and high transparency is obtained. Therefore, for example, as illustrated in FIG. 49C, the light L1 toward the front direction and the light L2 toward the oblique direction pass through the light modulation layer 64 without being scattered in the light modulation layer 64. As a result, as in the case of the above-described embodiment, for example, as illustrated in the parts (A) and (B) in FIG. 29, the light L from the light source 20 (light from the oblique direction) is totally reflected by an interface (an interface between the transparent substrate 31 or the light guide plate 10 and the air) of the transparent region 30A, and luminance (luminance in black display) of the transparent region 30A is decreased, compared to the case where light is uniformly emitted from the entire surface of the backlight 211 (indicated by the alternate long and short dash line in the part (B) in FIG. 29).

Moreover, for example, under potential difference application, as illustrated in FIG. 50A, the bulk 64A and the microparticle 64B are structured to allow the directions of the optical axis AX3 and the optical axis AX4 to be different from (intersect with) each other. Further, for example, under potential difference application, the microparticle 64B is structured to allow the optical axis AX4 thereof to be parallel to the light incident surface 10A of the light guide plate 10 as well as to intersect with the normals to the transparent substrates 31 and 37 at an angle θ4 larger than the angle θ3, or to be parallel to the surfaces of the transparent substrates 31 and 37. It is to be noted that the angle θ4 will be described in more detail when the material forming the microparticle 64B is described.

Therefore, light propagating through a region where a potential difference is applied between the lower electrode 32 and the upper electrode 36 includes a large amount of a component in an oblique direction. For example, in the case where an acrylic light guide plate is used as the light guide plate 10, light in a region where a potential difference is applied between the lower electrode 32 and the upper electrode 36 propagates at an angle of 41.8° or over. As a result, in the light propagating through the region where the potential difference is applied between the lower electrode 32 and the upper electrode 36, a refractive index difference is increased to obtain a high scattering property. Therefore, for example, as illustrated in FIG. 50C, the light L1 toward the front direction and the light L2 toward the oblique direction are scattered in the light modulation layer 64. As a result, as in the case of the above-described embodiment, for example, the light L from the light source 20 (the light from the oblique direction) passes through the interface (the interface between the transparent substrate 31 or the light guide plate 10 and the air) of the scattering region 30B, and light having passed toward the reflective plate 40 is reflected by the reflective plate 40 to pass through the light modulation device 60. Therefore, the luminance of the scattering region 30B is extremely higher than that in the case where light is uniformly emitted from the entire surface of the backlight 211, and luminance in white display is partially increased (partial luminance enhancement) by a reduced amount of the luminance of the transparent region 30A.

It is to be noted that the ordinary refractive indices of the bulk 64A and the microparticle 64B may be slightly different from each other due to, for example, a manufacturing error, and are preferably, for example, 0.1 or less, and more preferably 0.05 or less. Moreover, the extraordinary refractive indices of the bulk 64A and the microparticle 64B may be slightly different from each other due to, for example, a manufacturing error, and are preferably, for example, 0.1 or less, and more preferably 0.05 or less.

Moreover, a refractive index difference in the bulk 64A ($\Delta n_P$=extraordinary refractive index $ne_P$—ordinary refractive index $no_P$) or a refractive index difference in the microparticle 64B ($\Delta n_L$=extraordinary refractive index $ne_L$—ordinary refractive index $no_L$) are preferably as large as possible, and are preferably 0.05 or over, more preferably 0.1 or over, and still more preferably 0.15 or over. In the case where the refractive index differences in the bulk 64A and the microparticle 64B are large, the scattering power of the light modulation layer 64 is enhanced to allow light guide conditions to be easily disrupted, thereby allowing light from the light guide plate 10 to be easily extracted.

Further, the bulk 64A and the microparticle 64B have different response speeds with respect to an electric field. The bulk 64A has, for example, a streaky structure or a porous structure not responding to the electric field or a rod-like structure having response speed slower than that of the microparticle 64B. The bulk 64A is formed of, for example, a polymer material obtained by polymerizing a low-molecular monomer. The bulk 64A is formed, for example, by polymerizing, by one or both of heat and light, a material (for example, a monomer) with orientation and polymerization which is aligned along the alignment direction of the microparticles 64B or the alignment direction of the alignment films 33 and 35.

On the other hand, the microparticles 64B mainly include, for example, a liquid crystal material, and have a response speed sufficiently higher than that of the bulk 64A. Examples of the liquid crystal material (liquid crystal molecules) included in the microparticles 64B include rod-like molecules. As liquid crystal molecules included in the microparticles 64B, liquid crystal molecules having negative dielectric constant anisotropy (a so-called negative type liquid crystal) are used.

In this case, under no potential difference application, the long-axis directions of the liquid crystal molecules in the microparticles 64B are parallel to the optical axis AX3. At this time, the long axes of the liquid crystal molecules in the microparticles 64B are parallel to the light incident surface 10A of the light guide plate 10, and intersect with the normals to the transparent substrates 31 and 37 at the slight angle θ3. In other words, under no potential difference application, the liquid crystal molecules in the microparticles 64B are aligned to be tilted at the angle θ3 in a plane parallel to the light incident surface 10A of the light guide plate 10. The angle θ3 is called a pretilt angle, and is, for example, preferably within a range of 0.1° to 30° both inclusive. The angle θ3 is more preferably within a range of 0.5° to 10° both inclusive, and still more preferably within a range of 0.7° to 2° both inclusive. When the angle θ3 is decreased, scattering efficiency tends to be reduced due to the following reason. Moreover, when the angle θ3 is too large (for example, approximately 90°), the angle of a direction where the liquid crystal falls under potential difference application varies. For example, the liquid crystal may fall in a 180°-different direction (reverse tilt). Therefore, refractive index differences between the microparticles 64B and the bulk 64A are not allowed to be effectively used; therefore, scattering efficiency tends to be reduced, and luminance tends to be reduced.

Further, under potential difference application, in the microparticles 64B, the long-axis directions of the liquid crystal molecules intersect with or are orthogonal (or substantially orthogonal) to the optical axis AX3. At this time, the long axes of the liquid crystal molecules in the microparticles 64B are parallel to the light incident surface 10A of the light guide plate 10, as well as intersect with the normals to the transparent substrates 31 and 37 at an angle θ4 larger than the angle θ3. In other words, under potential difference application, the liquid crystal molecules in the microparticles 64B are aligned to be tilted at the angle θ4 in a plane parallel to the light incident surface 10A of the light guide plate 10 or to fall at the angle θ4 (=90°).

The above-described monomer having orientation and polymerization may be a material having optical anisotropy and forming a composite material with a liquid crystal; however, a low-molecular monomer which is cured with ultraviolet light is preferable in this embodiment. It is preferable that, in a state where no potential difference is applied, directions of optical anisotropy of the liquid crystal and a resultant (a polymer material) formed by polymerizing a low-molecular monomer coincide with each other; therefore, before curing the low-molecular monomer with ultraviolet light, the liquid crystal and the low-molecular monomer are preferably aligned in the same direction. In the case where the liquid crystal is used as the microparticles 64B, when the liquid crystal includes rod-like molecules, the used monomer material preferably has a rod-like shape. As described above, a material having both of polymerization and liquid crystal properties is preferably used as the monomer material, and, for example, the monomer material preferably includes one or more functional groups selected from the group consisting of an acrylate group, a methacrylate group, an acryloyloxy group, a methacryloyloxy group, a vinyl ether group, and an epoxy group as polymerizable functional groups. These functional groups are allowed to be polymerized by ultraviolet, infrared, or electron irradiation, or by heating. To suppress a reduction in the degree of alignment under ultraviolet irradiation, a liquid crystal material having a polyfuncitonal group may be added. In the case where the bulk 64A has the above-described streaky structure, as the material of the bulk 64A, a bifunctional liquid crystal monomer is preferably used. Moreover, a monofunctional monomer may be added to the material of the bulk 64A to adjust a temperature at which liquid crystal properties are exhibited, or a tri- or more-functional monomer may be added to the material of the bulk 64A to improve crosslink density.

The drive circuit 50 allows strip-like illumination light beams associated with the plurality of sub-electrodes 32A or the plurality of sub-electrodes 36A to be emitted in response to the control signal 204A supplied from the arithmetic circuit 204. The control signal 204A is a control signal including posture information and generated by the arithmetic circuit 204 based on, for example, a signal supplied from a gyro sensor (not illustrated) or the like included in the receiver-side unit 200. For example, in the case where the receiver-side unit 200 has two main perspectives, the arithmetic circuit 204 determines, based on the signal supplied from the gyro sensor (not illustrated) or the like, which one of the main perspectives is closer to a vertical direction, and then outputs the control signal 204A including a determination result (posture information) to the drive circuit 50.

When the drive circuit 50 receives the signal specifying three-dimensional display as the control signal 204A (in a three-dimensional display mode), the drive circuit 50 allows the backlight 211 to emit a plurality of strip-like illumination light beams. Moreover, when the drive circuit 50 receives, as the control signal 204A, posture information allowing the drive circuit 50 to select the sub-electrodes 32A, the drive circuit 50 allows illumination light beams associated with the sub-electrodes 32A to be emitted. More specifically, when the drive circuit 50 receives, as the control signals 204A, the signal specifying three-dimensional display and the posture information allowing the drive circuit 50 to select the sub-electrode 32A, the drive circuit 50 applies, to each light modulation cell 30-1 including the specific sub-electrode 32a of the plurality of sub-electrodes 32A, a potential difference allowing the light modulation layer 64 to exhibit the scattering property, and applies, to each light modulation cell 30-1 including the specific sub-electrode 32b or the specific sub-electrode 32c of the plurality of sub-electrodes 32A, a potential difference allowing the light modulation layer 64 to exhibit transparency. In other words, the drive circuit 50 controls the magnitude of a potential difference applied to a pair of electrodes (the sub-electrodes 32A and 36A) of each of the light modulation cells 30-1 to allow the optical axes AX4 of the microparticles 64B in each light modulation cell 30-1 including the sub-electrode 32a to intersect with or be orthogonal (or substantially orthogonal) to the optical axis AX3 of the bulk 64A, as well as to allow the optical axes AX4 of the microparticles 64B in each light modulation cell 30-1 including the sub-electrode 32b or the sub-electrode 32c to be parallel to the optical axis AX3 of the bulk 64A. Therefore, an electric field for the first mode is generated in the light modulation layer 64.

When the drive circuit 50 receives, as the control signal 204A, posture information allowing the drive circuit 50 to select the sub-electrodes 36A, the drive circuit 50 allows illumination light beams associated with the sub-electrodes 36A to be emitted. More specifically, when the drive circuit 50 receives, as the control signals 204A, the signal specifying three-dimensional display and the posture information allowing the drive circuit 50 to select the sub-electrodes 36A, the drive circuit 50 applies, to each light modulation cell 30-1 including the specific sub-electrode 36a of the plurality of sub-electrodes 36A, a potential difference allowing the light modulation layer 64 to exhibit the scattering property, and applies, to each light modulation cell 30-1 including the specific sub-electrode 36b or the specific sub-electrode 36c of the plurality of sub-electrodes 36A, a potential difference allowing the light modulation layer 64 to exhibit transparency. In other words, the drive circuit 50 controls the magnitude of a potential difference applied to a pair of electrodes (the sub-electrodes 32A and 36A) of each of the light modulation cells 30-1 to allow the optical axes AX4 of the microparticles 64B in each light modulation cell 30-1 including the sub-electrode 32a to intersect with or be orthogonal (or substantially orthogonal) to the optical axis AX3 of the bulk 64A, as well as to allow the optical axes AX4 of the microparticles 64B in each light modulation cell 30-1 including the sub-electrode 32b or the sub-electrode 32c to be parallel to the optical axis AX3 of the bulk 64A. Therefore, an electric field for the second mode is generated in the light modulation layer 64.

Moreover, when the drive circuit 50 receives the signal specifying two-dimensional display as the control signal 204A (in the two-dimensional display mode), the drive circuit 50 allows the backlight 211 to emit planar illumination light irrespective of posture information. More specifically, when the drive circuit 50 receives the signal specifying two-dimensional display as the control signal 204A, the drive circuit 50 applies, to each of the light modulation cells 30-1, a potential difference allowing the light modulation layer 34 to exhibit the scattering property. In other words, the drive circuit 50 controls the magnitude of a potential difference applied to a pair of electrodes (the sub-electrodes 32A and 36A) of each of the light modulation cells 30-1 to allow the optical axes AX4 of the microparticles 64B in all light modulation cells 30-1 included in the backlight 211 to intersect with or be orthogonal (or substantially orthogonal) to the optical axis AX3 of the bulk 64A. Therefore, an electric field for the two-dimensional display mode is generated in the light modulation layer 64.

Next, functions and effects of the backlight 211 according to the embodiment will be described below.

In the backlight 211 according to the embodiment, in three-dimensional display, a potential difference is applied to a pair of electrodes (the sub-electrodes 32A and 36A) of each of the light modulation cells 30-1 to allow the optical axes AX4 of the microparticles 64B in each light modulation cell 30-1 including the sub-electrode 32a (36a) to intersect with or be orthogonal to the optical axis AX3 of the bulk 64A, and to allow the optical axes AX4 of the microparticles 64B in each light modulation cell 30-1 including the sub-electrode 32b (36b) or the sub-electrode 32c (36c) to be parallel or substantially parallel to the optical axis AX3 of the bulk 64A. Therefore, in the light modulation device 60, each light modulation cell 30-1 including the sub-electrode 32a (36a) serves as the scattering region 30B, and each light modulation cell 30-1 including the sub-electrode 32b (36b) or the sub-electrode 32c (36c) serves as the transparent region 30A. As a result, light emitted from the light source 20 and entering into the light guide plate 10 passes through the transparent region 30A of the light modulation device 60, and is scattered in the scattering region 30B of the light modulation device 60 (refer to FIG. 34). Light beams having passed through the bottom surface of the scattering region 30B in the scattered light beams are reflected by the reflective plate 40 to be returned to the light guide plate 10 again, and then the light beams are emitted from the top surface of the backlight 211. Moreover, light beams toward the top surface of the scattering region 30B in the scattered light beams pass through the light guide plate 10, and then are emitted from the top surface of the backlight 211. Thus, in three-dimensional display, light beams are hardly emitted from the top surface of the transparent region 30A, and light beams are emitted from the top surface of the scattering region 30B. Thus, for example, as illustrated in FIG. 34, a plurality of strip-like illumination light beams are emitted to a front direction.

Therefore, as respective strip-like illumination light beams emitted toward the front direction enters into the back surface of the display panel 210, for example, in the case where two-dimensional image data for three-dimensional display is generated in the image signal processing circuit 207 to allow respective pixel rows in a pixel arrangement corresponding to respective strip-like illumination light beams to serve as three-dimensional pixels 210D, the respective strip-like illumination light beams enter, at a substantially equal angle, into pixels (for example, 210-1, 210-2, 210-3 or 210-4 in FIG. 34) in the same position in respective three-dimensional pixels 210D. As a result, image light modulated by the pixels in the same position in respective three-dimensional pixels 210D is emitted from the pixels at a predetermined angle. At this time, a viewer views different images having a parallax therebetween with his right and left eyes; therefore, the viewer perceives that a three-dimensional image (a stereoscopic image) is displayed on the display panel 210.

In the embodiment, strip-like illumination light beams are emitted, based on posture information of the display panel 211 supplied from the gyro sensor (not illustrated), with use of the plurality of sub-electrodes 32a included in the lower electrode 32 or the plurality of sub-electrodes 36a included in the upper electrode 36. Therefore, when a user of the receiver-side unit 200 rotates the display panel 210 by 90°, the gyro sensor or the like detects such rotation, and the sub-electrodes 32a or 36a used for 3D display are selected with use of a detection result. As a result, the user is allowed to perceive a three-dimensional image irrespective of the direction of the display panel 210.

Moreover, in the embodiment, the lower electrode 32 and the upper electrode 36 applying an electric field to the light modulation layer 34 each are configured of a plurality of sub-electrodes, and a predetermined potential difference is applied to the plurality of sub-electrodes 32A included in the lower electrode 32, or a predetermined potential difference is applied to the plurality of sub-electrodes 36A included in the upper electrode 36. Therefore, a three-dimensional image for a certain main perspective is allowed to be displayed on the display panel 210 by strip-like illumination light beams associated with the sub-electrodes 32A, and a three-dimensional image for another main perspective is allowed to be displayed on the display panel 210 by strip-like illumination light beams associated with the sub-electrodes 36A. In other words, three-dimensional images for different main perspectives are allowed to be selectively displayed on the display panel 210.

Further, in the embodiment, one light modulation layer 34 is included in the edge-light type backlight 211, and two electrodes (the lower electrode 32 and the upper electrode 36) are disposed on and below the light modulation layer 64; therefore, three-dimensional images for different main perspectives are allowed to be selectively displayed on the display panel. Accordingly, it is not necessary to laminate a plurality of light modulation layers 64 or a large number of electrodes. Therefore, in the embodiment, a thin high-luminance display which has a plurality of main perspectives and is capable of performing three-dimensional display is allowed to be achieved.

Moreover, in the backlight 211 according to the embodiment, in two-dimensional display, for example, a potential difference is applied to a pair of electrodes (the sub-electrodes 32A and 36A) of each of the light modulation cells 30-1 to allow the optical axes AX4 of the microparticles 64B in each of the light modulation cells 30-1 to intersect with or be orthogonal to the optical axis AX3 of the bulk 64A. Therefore, light beams emitted from the light source 20 and entering into the light guide plate 10 are scattered in the scattering region 30B formed in the entire light modulation device 30 (refer to FIG. 35). Light beams having passed through the bottom surface of the scattering region 30B in the scattered light beams are reflected by the reflective plate 40 to be returned to the light guide plate 10 again, and then the light beams are emitted from the top surface of the backlight 211. Moreover, light beams toward the top surface of the scattering region 30B in the scattered light beams pass through the light guide plate 10 to be emitted from the top surface of the backlight 211. Thus, in two-dimensional display, for example, light beams are emitted from the entire top surface of the light modulation device 30 to emit planar illumination light toward a front direction.

Therefore, as the planar illumination light emitted toward the front direction enters into the back surface of the display panel 210, for example, when two-dimensional image data for two-dimensional display associated with respective pixels 210E is generated in the image signal processing circuit 207, planar illumination light enters into the respective pixels 210E at all angles, and image light modulated by the respective pixels 210E is emitted from the respective pixels 210E. At this time, as the viewer views the same image with both eyes, the viewer perceives that a two-dimensional image (a planar image) is displayed on the display panel 210.

Moreover, in the embodiment, the light modulation layer 64 exhibiting the scattering property or transparency with respect to light from the light source, depending on magnitude of an electric field is included in the backlight 211. Therefore, light emitted from the light source 20 and propagating through the transparent substrate 31 and the like passes through a region exhibiting transparency by electric field control of the light modulation layer 64 to be totally reflected by the top surface of the backlight 211 or to be reflected by the top surface of the backlight 211 with high reflectivity. As a result, luminance in the transparent region in the light emission region of the backlight 211 is reduced, compared to the case where light is uniformly emitted from the entire surface of the backlight 211. On the other hand, light propagating through the transparent substrate and the like is scattered by a region exhibiting the scattering property by the electric field control of the light modulation layer 64 to pass through the top surface of the backlight 211. As a result, luminance in the scattering region in the light emission region of the backlight 211 is increased, compared to the case where light is uniformly emitted from the entire surface of the backlight 211. Moreover, luminance in white display is partially increased (luminance enhancement) by a reduced amount of the luminance of the transparent region in the light emission region. Further, in the embodiment, the area per unit area of each sub-electrode 32A or each linear electrode 32E varies with the distance from the light source 20. Therefore, a density distribution of the transparent region and the scattering region in the light emission region is allowed to be adjusted to become a desired distribution. As a result, compared to the case where a light emission area per unit area of each of the strip-like illumination light beams does not vary with the distance from the light source 20, luminance on a side closer to the light source 20 of the light emission region is allowed to become lower, and luminance on a side farther from the light source of the light emission region is allowed to become higher. Accordingly, in three-dimensional display, a modulation ratio is allowed to be increased, while in-plane luminance is uniformized.

Moreover, in the embodiment, as in the case of the above-described embodiment, the layout of the scattering regions 30B is adjusted to allow the pixel pitch Px in the horizontal direction and the pixel pitch Py in the vertical direction to be closer to each other. As a result, degradation in image quality is allowed to be suppressed.

In the embodiment, as the bulk 64A and the microparticles 64B each include mainly an optical anisotropic material, the scattering property in an oblique direction is reduced, thereby enabling to improve transparency. For example, the bulk 64A and the microparticles 64B include mainly the optical anisotropic materials with ordinary refractive indices which are equal to each other and extraordinary refractive indices which are also equal to each other, and in addition thereto, the directions of the optical axes of the bulk 64A and the microparticles 64B coincide with or substantially coincide with each other in a region where a potential difference is not applied between the lower electrode 32 and the upper electrode 36. Therefore, the refractive index difference is reduced or eliminated in all directions including the front direction (a direction of the normal to the light modulation device 60) and the oblique direction, thereby obtaining high transparency. As a result, the leakage of light in a range having a large view angle is allowed to be reduced or substantially eliminated, and view angle characteristics are allowed to be improved.

For example, when a liquid crystal having an ordinary refractive index of 1.5 and an extraordinary refractive index of 1.65, and a liquid crystal monomer having an ordinary refractive index of 1.5 and an extraordinary refractive index of 1.65 are mixed, and the liquid crystal monomer is polymerized in a state where the liquid crystal and the liquid crystal monomer are aligned by an alignment film or an electric field, the optical axis of the liquid crystal and the optical axis of a polymer formed by polymerizing the liquid crystal monomer coincide with each other. Therefore, the refractive indices coincide with each other in all directions, thereby enabling to achieve a state where transparency is high, and to further improve the view angle characteristics.

Moreover, in the embodiment, for example, as illustrated in the parts (A) and (B) in FIG. 29, luminance in the transparent region 30A (luminance in black display) is lower, compared to the case where light is uniformly emitted from the entire surface of the backlight 211 (indicated by the alternate long and short dash line in the part (B) in FIG. 29). On the other hand, luminance in the scattering region 30B is significantly increased, compared to the case where light is uniformly emitted from the entire surface of the backlight 211 (indicated by the alternate long and short dash line in the part (B) in FIG. 29), and luminance in white display is partially increased (partial luminance enhancement) by a reduced amount of the luminance of the transparent region 30A, because, as the bulk 64A and the microparticle 64B each include mainly the optical anisotropic material, the scattering property in the oblique direction is suppressed to reduce leak light from the light guide plate in a dark state. Therefore, as light is guided from a part in a partially-dark state to a part in a partially-bright state, partial luminance enhancement is achievable without increasing electric power supplied to the backlight 211.

Moreover, in the embodiment, in a region where a potential difference is not applied between the lower electrode 32 and the upper electrode 36, the optical axes AX4 of the microparticles 64B are parallel to the light incident surface 10A of the light guide plate 10, and intersect with the normals to the transparent substrates 31 and 37 at the slight angle θ3. In other words, the liquid crystal molecules included in the microparticles 64B are aligned to be tilted at the angle θ3 in a plane parallel to the light incident surface 10A (i.e., to have a pretilt angle). Therefore, when a potential difference is applied between the lower electrode 32 and the upper electrode 36, the liquid crystal material included in the microparticles 64B does not fall in random directions, but falls in the plane parallel to the light incident surface 10A. At this time, the optical axis AX3 of the bulk 64A and the optical axes AX4 of the microparticles 64B intersect with or are orthogonal to each other in the plane parallel to the light incident surface 10A. In this case, light vibrating perpendicularly with respect to the transparent substrate 31 in light incident from the light incident surface 10A of the light guide plate 10 exhibits a difference between the ordinary refractive index of the microparticle 64B and the extraordinary refractive index of the bulk 64A. At this time, as the difference between the ordinary refractive index of the microparticle 64B and the extraordinary refractive index of the bulk 64A is large, scattering efficiency of light vibrating perpendicularly with respect to the transparent substrate 31 is increased. On the other hand, light vibrating in parallel with the transparent substrate 31 exhibits a difference between the extraordinary refractive index of the microparticle 64B and the ordinary refractive index of the bulk 64A. At this time, as the difference between the extraordinary refractive index of the microparticle 64B and the ordinary refractive index of the bulk 64A is also large, scattering efficiency of light vibrating in parallel with the transparent substrate 31 is increased. Therefore, light propagating through a region where a potential difference is applied between the lower electrode 32 and the upper electrode 36 includes a large amount of a component in an oblique direction. For example, in the case where an acrylic light guide plate is used as the light guide plate 10, light in a region where a potential difference is applied between the lower electrode 32 and the upper electrode 36 propagates at an angle of 41.8° or over. As a result, a refractive index difference is increased to obtain a high scattering property, thereby enabling to improve display luminance. Moreover, the display luminance is allowed to be further improved by the above-described partial luminance enhancement effect.

For example, in the case where the optical axis AX3 of the bulk 64A and the optical axes AX4 of the microparticles 64B are disposed perpendicular to the light incident surface 10A of the light guide plate 10 under no potential difference application, and when a potential difference is applied between the lower electrode 32 and the upper electrode 36, the liquid crystal material included in the microparticles 64B falls in a plane perpendicular to the light incident surface 10A, as in the above-described case, light vibrating perpendicularly with respect to the transparent substrate 31 exhibits a difference between the ordinary refractive index of the microparticle 64B and the extraordinary refractive index of the bulk 64A, but light vibrating in a direction parallel to the transparent substrate 31 exhibits a difference between the ordinary refractive index of the microparticle 64B and the ordinary refractive index of the bulk 64A. In this case, there is little or no difference between the ordinary refractive index of the microparticle 64B and the ordinary refractive index of the bulk 64A. Therefore, in light incident from the light incident surface 10A, while light vibrating perpendicularly with respect to the transparent substrate 31 exhibits a large refractive index difference as in the above-described case, light vibrating in a direction parallel to the transparent substrate 31 exhibits little or no refractive index difference. As a result, while scattering efficiency of light vibrating perpendicularly with respect to the transparent substrate 31 is high, scattering efficiency of light vibrating in parallel with the transparent substrate 31 is low or zero. Therefore, in the case where the optical axes AX3 and AX4 are disposed perpendicular to the light incident surface 10A, compared to the case where the optical axes AX3 and AX4 are disposed in parallel with the light incident surface 10A, scattering efficiency is lower, and accordingly, luminance extracted from the light guide plate 10 is lower than that in the light modulation device 30 in the embodiment.

Moreover, in the case where the pretilt is not formed, or in the case where the pretilt angle is substantially approximately 90°, the liquid crystal falls in random directions; therefore, the refractive index difference is equal to an average of a refractive index difference in the case where the optical axis AX3 of the bulk 64A and the optical axes AX4 of the microparticles 64B are parallel to the light incident surface of the light guide plate 10, and a refractive index difference in the case where the optical axis AX3 of the bulk 64A and the optical axes AX4 of the microparticles 64B are perpendicular to the light incident surface 10A of the light guide plate 10. Therefore, also in these cases, compared to the case where the optical axis AX3 of the bulk 64A and the optical axes AX4 of the microparticles 64B are parallel to the light incident surface 10A of the light guide plate 10, extracted luminance is lower.

Consequently, in the embodiment, while the leakage of light in a range having a large view angle is reduced or substantially eliminated, display luminance is allowed to be improved. As a result, a modulation ratio in the front direction is allowed to be increased.

[Modification]

In the second embodiment, the optical axes AX3 and AX4 are oriented in a direction intersecting with or orthogonal (or substantially orthogonal) to the transparent substrate 31 under no potential difference application, and the optical axis AX4 is displaced to a direction parallel or substantially parallel to the light incident surface 10A and the transparent substrate 31. However, the optical axes AX3 and AX4 may be directed in a direction intersecting with or orthogonal (or substantially orthogonal) to the transparent substrate 31 under no potential difference application, and the optical axis AX4 may be displaced to a direction parallel or substantially parallel to the transparent substrate 31 as well as in a direction intersecting with or orthogonal (or substantially orthogonal) to the light incident surface 10A.

3. Modifications

[First Modification]

Figure 51:
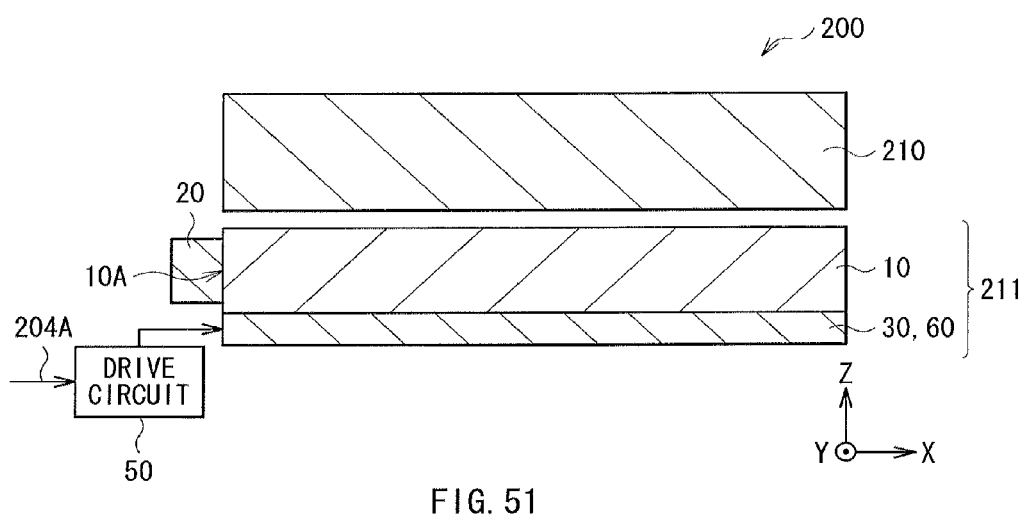
FIG. 51 is a sectional view illustrating a first modification of the configuration of the display section in the receiver-side unit in each of the embodiments.

In the above-described embodiments, the reflective plate 40 is included; however, for example, as illustrated in FIG. 51, the reflective plate 40 may not be included. In this case, the lower electrode 32 is preferably made of a material having a light reflection function such as metal.

[Second Modification]

Figure 52:
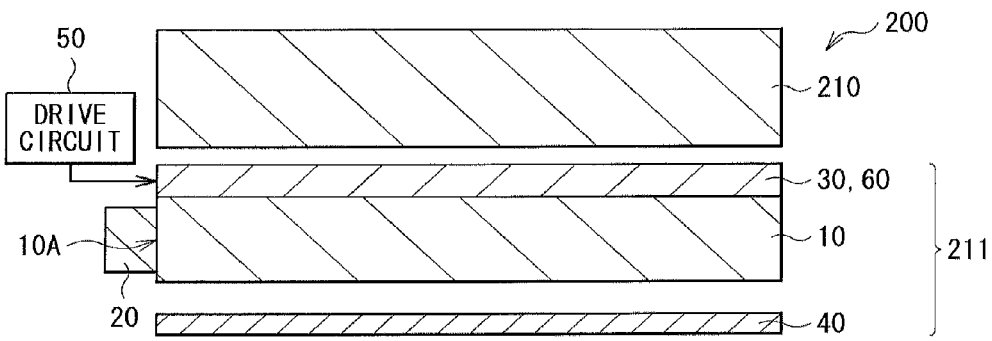
FIG. 52 is a sectional view illustrating a second modification of the configuration of the display section in the receiver-side unit in each of the embodiments.
Figure 53:
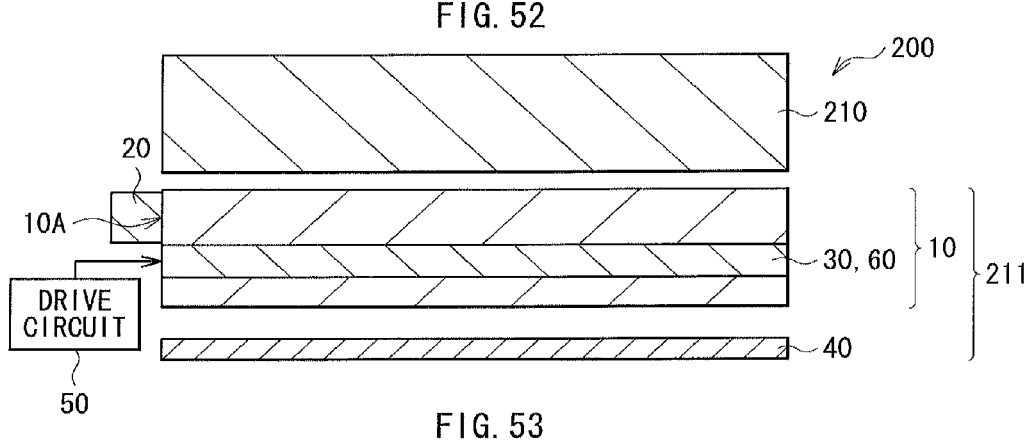
FIG. 53 is a sectional view illustrating a third modification of the configuration of the display section in the receiver-side unit in each of the embodiments.

In the above-described embodiments, the light modulation devices 30 and 60 each are in close contact with and are bonded to the back side (the bottom surface) of the light guide plate 10 without an air layer in between; however, for example, as illustrated in FIG. 52, the light modulation devices 30 and 60 may be in close contact with and bonded to the top surface of the light guide plate 10 without an air layer in between. Moreover, for example, as illustrated in FIG. 53, the light modulation devices 30 and 60 may be disposed in the light guide plate 10. However, also in this case, it is necessary for the light modulation devices 30 and 60 to be in close contact with and bonded to the light guide plate 10 without an air layer in between.

[Third Modification]

Figure 54:
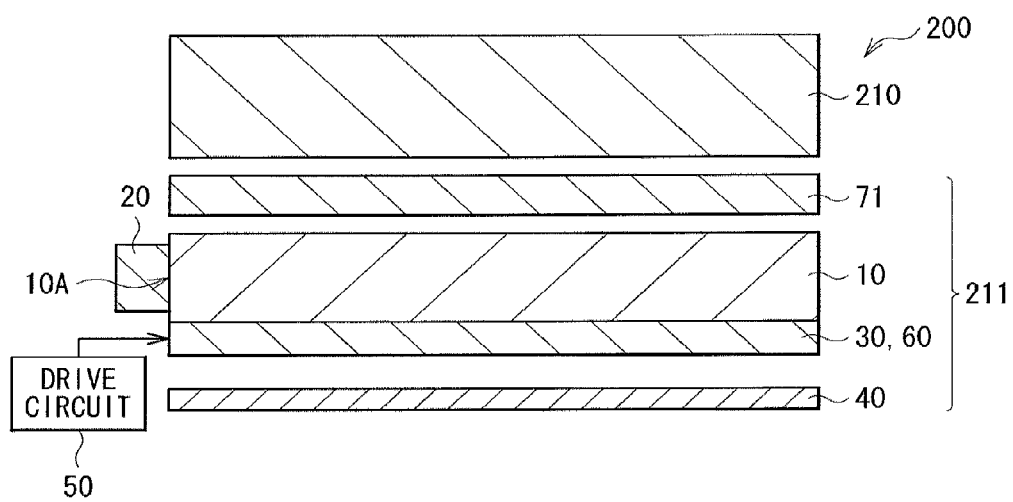
FIG. 54 is a sectional view illustrating a fourth modification of the configuration of the display section in the receiver-side unit in each of the embodiments.

Moreover, in the above-described respective embodiments and modifications thereof, no component is specifically disposed on the light guide plate 10; however, for example, as illustrated in FIG. 54, an optical sheet 71 (for example, a diffusion plate, a diffusion sheet, a lens film, a polarization splitter sheet, or the like) may be provided. In such a case, some of light emitted from the light guide plate 10 in an oblique direction rises in the front direction; therefore, a modulation ratio is allowed to be effectively improved.

[Fourth Modification]

Figure 55A:
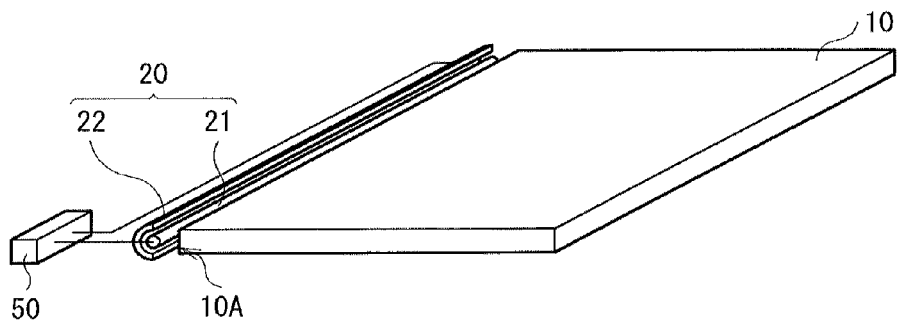
FIGS. 55A to 55C are perspective views illustrating examples of a configuration of a light source in each of the embodiments.
Figure 55B:
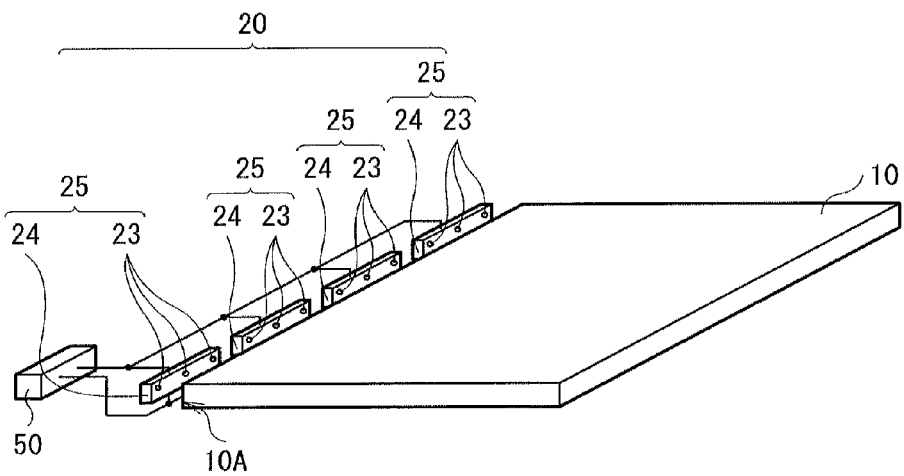
Figure 55C:
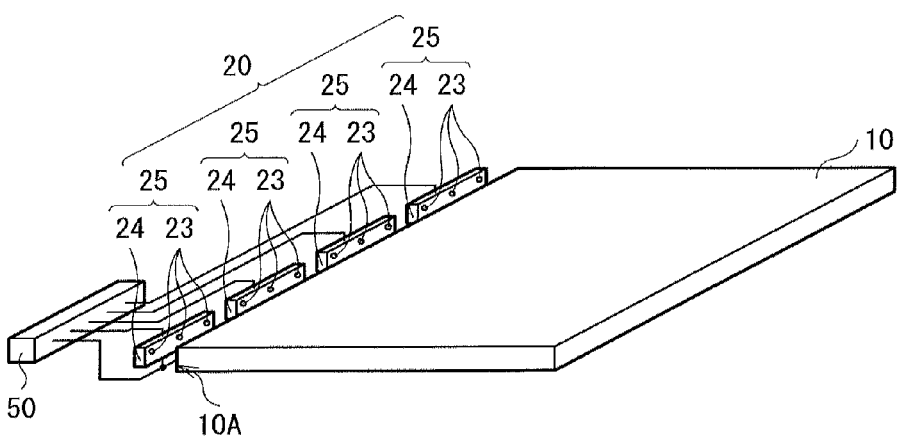

In the above-described respective embodiments and modifications thereof, for example, as illustrated in FIG. 55A, the light source 20 may be configured of a linear light source 21 and a reflective mirror 22. The linear light source 21 is configured of, for example, a HCFL or a CCFL. The reflective mirror 22 reflects, to the light incident surface 10A, light toward a direction not directly entering the light incident surface 10A of light emitted from the linear light source 21. For example, as illustrated in FIG. 55B or 55C, the light source 20 may be configured of a plurality of point-like light sources 23 arranged in one line. Each of the point-like light sources 23 emits light toward the light incident surface 10A, and is configured of, for example, a light-emitting device having a light emission spot on a surface facing the light incident surface 10A. Examples of such a light-emitting device include an LED and a laser diode (LD). Each of the point-like light sources 23 is preferably configured of a white LED in terms of efficiency, a reduction in profile, and uniformity. It is to be noted that the plurality of point-like light sources 23 included in the light source 20 may be configured of, for example, a red LED, a green LED, and a blue LED.

For example, as illustrated in FIGS. 55B and 55C, every two or more point-like light sources 23 in the plurality of point-like light sources 23 may be arranged on one common substrate 24. In this case, a light source block 25 is configured of one substrate 24 and two or more point-like light sources 23 arranged on the substrate 24. The substrate 24 is, for example, a circuit board on which wiring electrically connecting the point-like light sources 23 and the drive circuit 50 to each other is installed, and the respective point-like light sources 23 are mounted on the circuit board. The respective point-like light sources 23 arranged on one substrate 24 (the respective point-like light sources 23 in one light source block 25) are collectively (not independently) driven by the drive circuit 50, and are connected to one another in parallel or in series (not illustrated). Moreover, the point-like light sources 23 arranged on different substrates 24 (the point-like light sources 23 in respective light source blocks 25) may be driven by the drive circuit 50 independently of one light source block 25 to another. At this time, for example, as illustrated in FIG. 55C, the point-like light sources 23 arranged on different substrates 24 (the point-like light sources 23 in respective light source blocks 25) are connected to different current paths.

As illustrated in FIGS. 55A to 55C, the light source 20 may be disposed on only one side surface of the light guide plate 10, or although not illustrated, the light sources 20 may be disposed on two side surfaces, three side surfaces, or all side surfaces of the light guide plate 10. Moreover, in the case where the light sources 20 are disposed on three side surfaces or all side surfaces, only light sources 20 disposed on two facing side surfaces may illuminate when partial lighting is performed, and all light sources 20 may illuminate when entire lighting is performed.

[Fifth Modification]

Figure 56A:
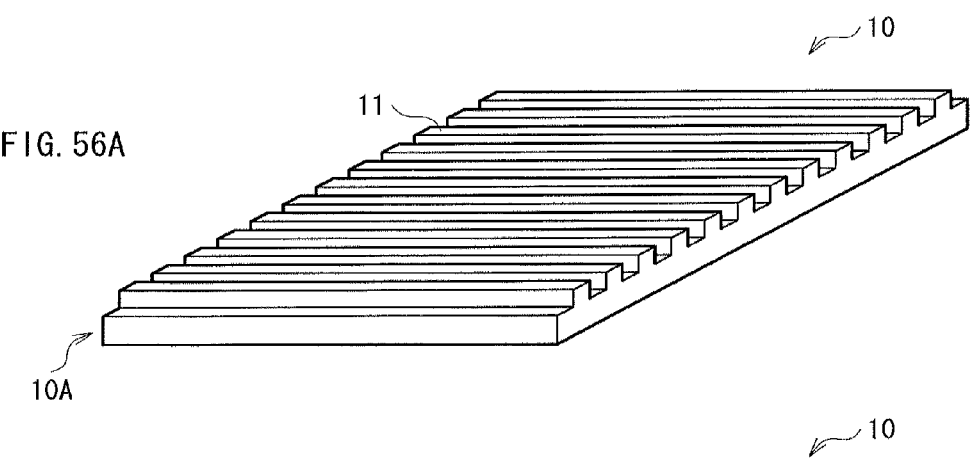
FIGS. 56A and 56B are perspective views illustrating examples of a configuration of a light guide plate in each of the embodiments.
Figure 56B:
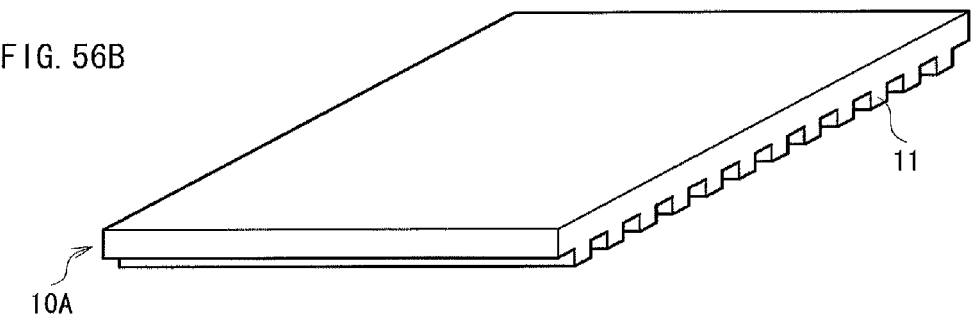

In the above-described embodiments and modifications thereof, for example, as illustrated in FIG. 56A, the light guide plate 10 may have a plurality of strip-like projections 11 on a top surface thereof. It is to be noted that, for example, as illustrated in FIG. 56B, the light guide plate 10 may have a plurality of strip-like projections 11 on a bottom surface thereof. Moreover, for example, the light guide plate 10 may have a plurality of strip-like projections 11 in the light guide plate 10 (not illustrated). Further, the light guide plate 10 may be hollow, or may be densely packed.

The projections 11 extend in a direction parallel to the normal to the light incident surface 10A, and, for example, as illustrated in FIGS. 56A and 56B, the projections 11 are successively formed from one side surface of the light guide plate 10 to another side surface facing the side surface. A section in an arrangement direction of each of the projections 11 has, for example, a rectangular shape, a trapezoidal shape, or a triangular shape. In the case where the section in the arrangement direction of each projection 11 has a rectangular shape, a rectilinear propagation property of light is extremely high, and the projections 11 are suitable for a large-scale backlight. In the case where the section in the arrangement direction of each projection 11 has a trapezoidal shape, processing of a die used to form each projection 11 by injection molding, extrusion molding, heat-press molding, or the like is easy, and mold releasability in molding is high, and yields and molding speed are allowed to be improved due to a reduction in errors.

Figure 57A:
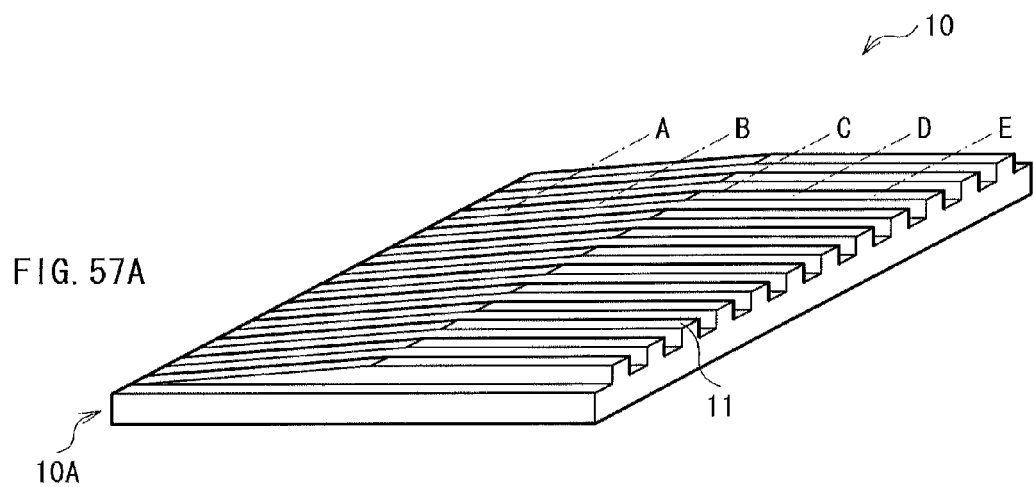
FIGS. 57A and 57B are a perspective view and a sectional view, respectively, illustrating another example of the configuration of the light guide plate in each of the embodiments.
Figure 57B:
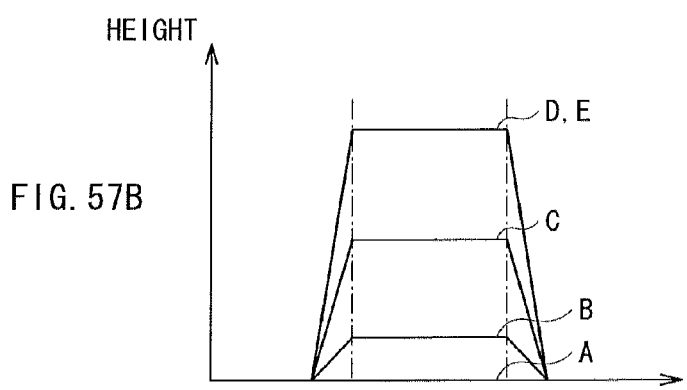

A flat surface may or may not be disposed between adjacent projections 11. The height of each of the projections 11 may be uniform or nonuniform in a plane. For example, as illustrated in FIGS. 57A and 57B, when one side surface of the light guide plate 10 is the light incident surface 10A, the height of each of the projections 11 may be smaller on a side closer to the light incident surface 10A, and higher on a side closer to a side surface facing the light incident surface 10A. Moreover, for example, when a pair of facing side surfaces of the side surfaces of the light guide plate 10 are light incident surfaces 10A, the height of each of the projections 11 may be lower at and in proximity to both of the light incident surfaces 10A, and is higher in other regions. The height at and in proximity to the light incident surface 10A of each of the projections 11 may be zero or substantially zero. For example, as illustrated in FIGS. 57A and 57B, the height of each of the projections 11 may be increased from a side closer to the light incident surface 10A with increasing distance from the light incident surface 10A. At this time, the height of each of the projections 11 may be uniform in a midway from the light incident surface 10A to the side surface facing the light incident surface 10A. It is to be noted that a plurality of projections 11 with a nonuniform height as illustrated in FIG. 57A may be disposed in a region other than the top surface of the light guide plate 10, and, for example, the plurality of projections 11 with a nonuniform height may be disposed on the bottom surface of the light guide plate 10 or in the light guide plate 10.

Figure 58A:
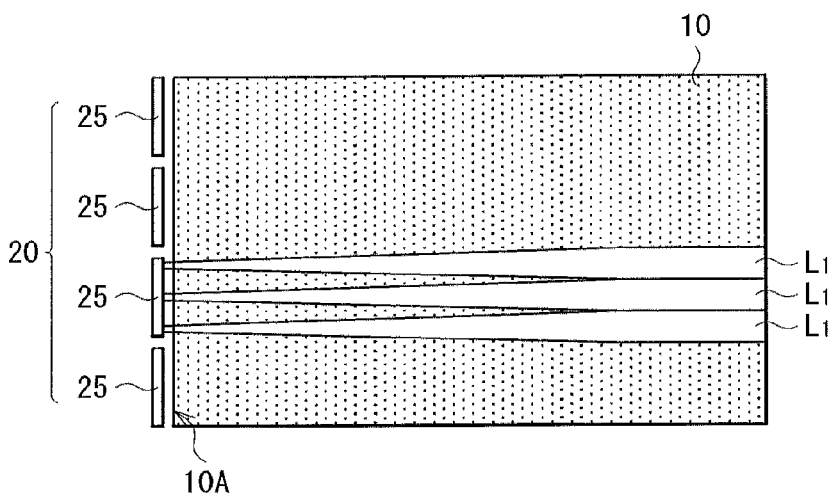
FIGS. 58A and 58B are schematic views illustrating an example of functions of a typical light guide plate and the light guide plate in FIGS. 57A and 57B.
Figure 58B:
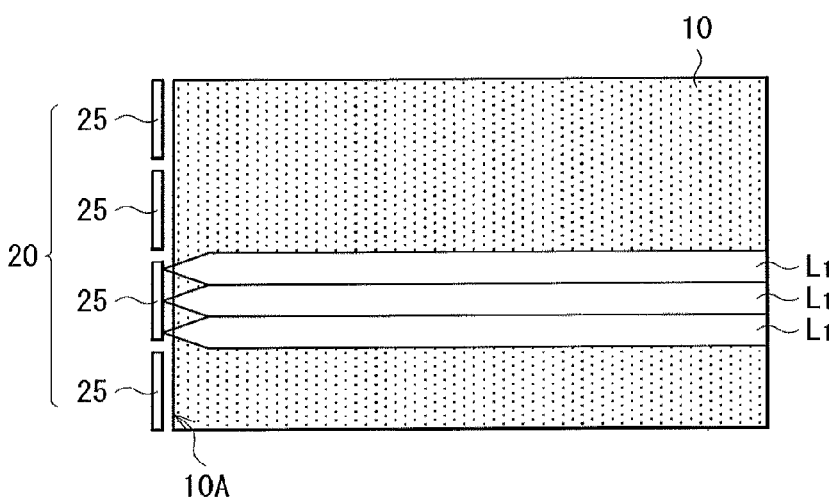

As described above, when the height of each of the projections 11 (in other words, the depth of a groove formed between the projections 11) varies, the rectilinear propagation property of light is allowed to vary. For example, as illustrated in FIGS. 56A and 56B, in the case where the projections 11 are disposed on and in proximity to the light incident surface 10A, for example, as illustrated in FIG. 58A, when one light source block 25 illuminates, light L1 emitted from the light source block 25 propagates through the light guide plate 10 while not spreading too much in a horizontal direction (a width direction). In this case, a dark region may be generated between the point-like light sources 23 in proximity to the light incident surface 10A, and in this case, image quality may be degraded. Therefore, in such a case, for example, as illustrated in FIGS. 57A and 57B, the height of each of the projections 11 is preferably lower or zero at and in proximity to the light incident surface 10A. In doing so, as illustrated in FIG. 58B, the light L1 emitted from the light source block 25 is allowed to be spread in the horizontal direction (the width direction) at a divergent angle of the point-like light source 23 at and in proximity to the light incident surface 10A, thereby enabling to propagate with a substantially uniform width in a region farther from the light incident surface 10A.

[Sixth Modification]

Figure 59A:
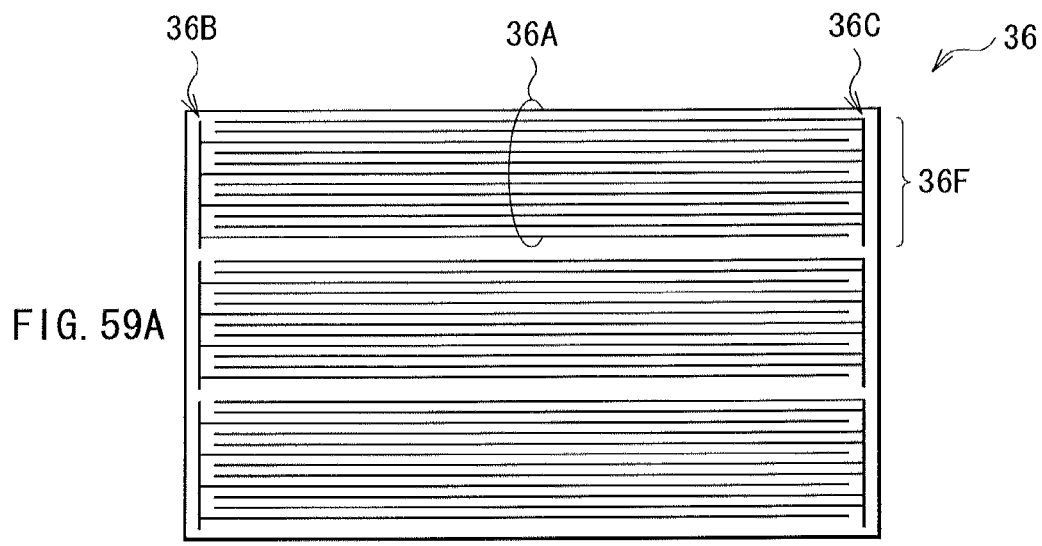
FIGS. 59A and 59B are schematic views illustrating another example of the function of the light guide plate in FIGS. 57A and 57B.
Figure 59B:
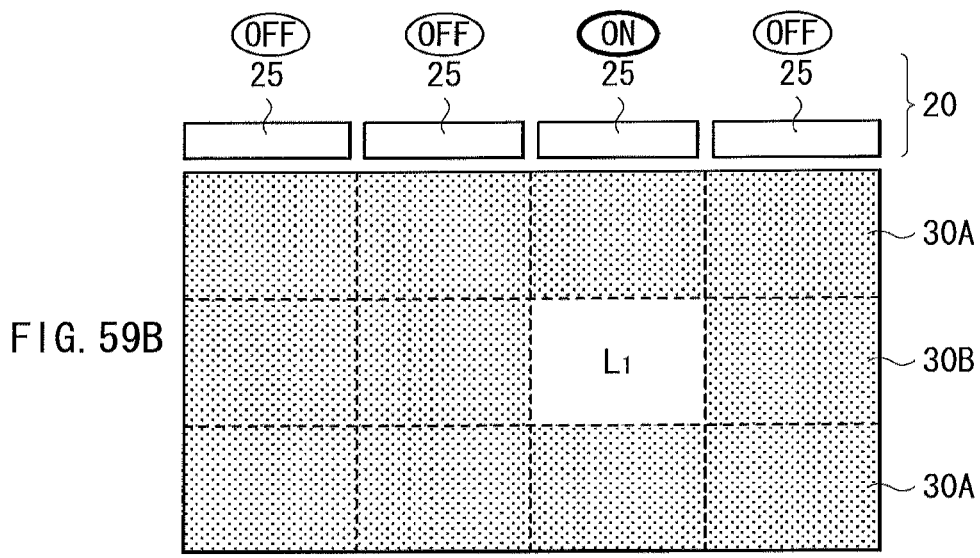

In the above-described embodiments and modifications thereof, for example, as illustrated in FIG. 59A, the upper electrode 36 may include a plurality of sub-electrodes 36F each configured of a plurality of sub-electrodes 36A and wiring lines 36B and 36C. The sub-electrodes 36F may be driven independently of one another or may be driven collectively. For example, in the case where the sub-electrodes 36F are allowed to be driven independently of one another, the light source 20 may be configured of a plurality of light source blocks 25 allowed to be driven independently of one another, and the light guide plate 10 may have a plurality of strip-like projections 11 on the top surface or the bottom surface thereof, or therein. At this time, when the drive circuit 50 selects one sub-electrode 36F and one light source block 25, for example, as illustrated in FIG. 59B, only a region where the selected sub-electrode 36F and an optical path of light emitted from the selected light source block 25 intersect with each other is allowed to selectively illuminate.

[Seventh Modification]

Figure 60:
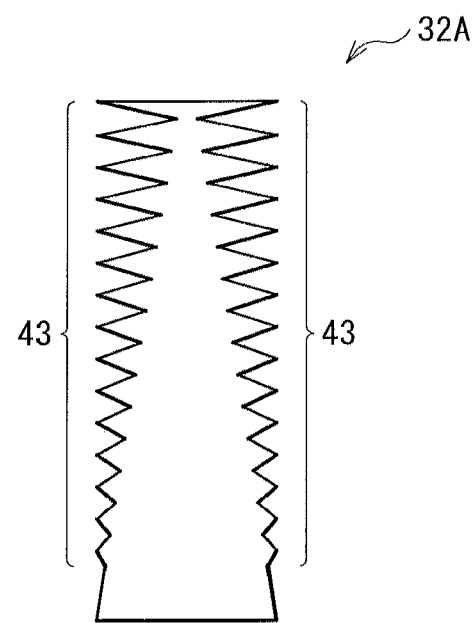
FIG. 60 is a plan view illustrating an example of a configuration of a sub-electrode in the light modulation device in each of the embodiments.
Figure 61:
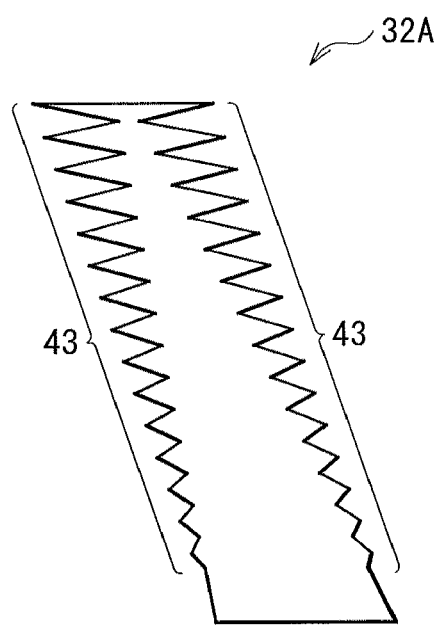
FIG. 61 is a plan view illustrating another example of the configuration of the sub-electrode in the light modulation device in each of the embodiments.
Figure 62:
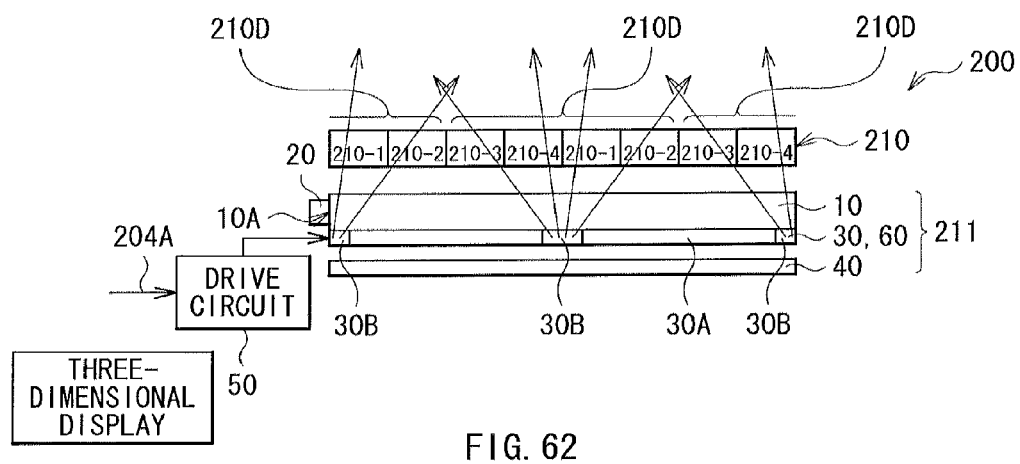
FIG. 62 is a schematic view illustrating an example of time-divisional drive in three-dimensional display.
Figure 63:
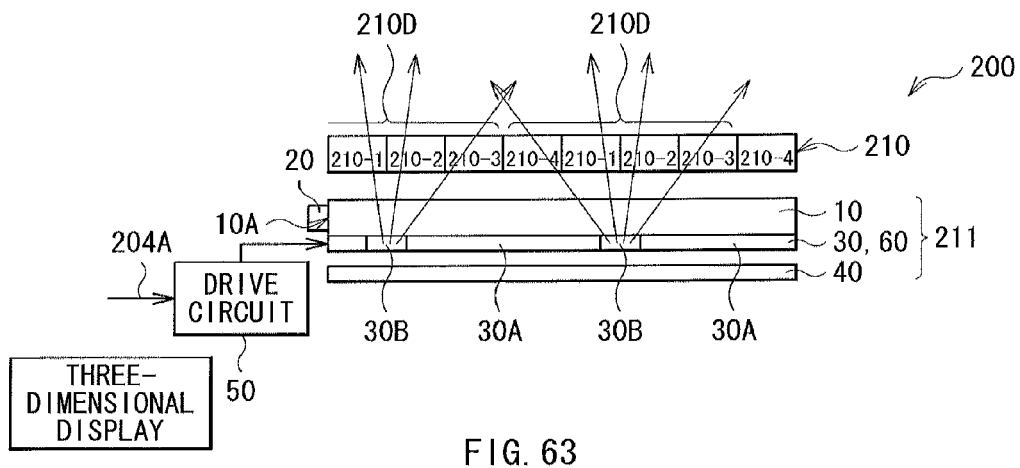
FIG. 63 is a schematic view illustrating an example of time-divisional drive following FIG. 62.
Figure 64:
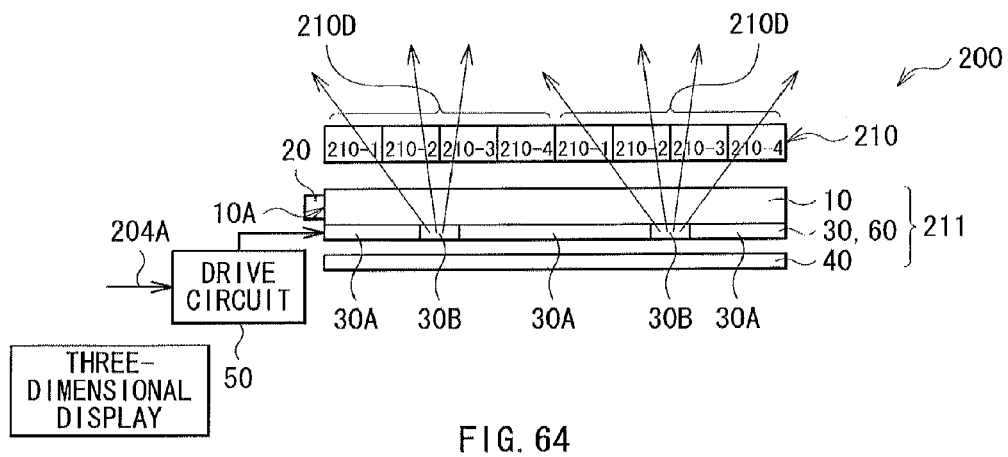
FIG. 64 is a schematic view illustrating an example of time-divisional drive following FIG. 63.
Figure 65:
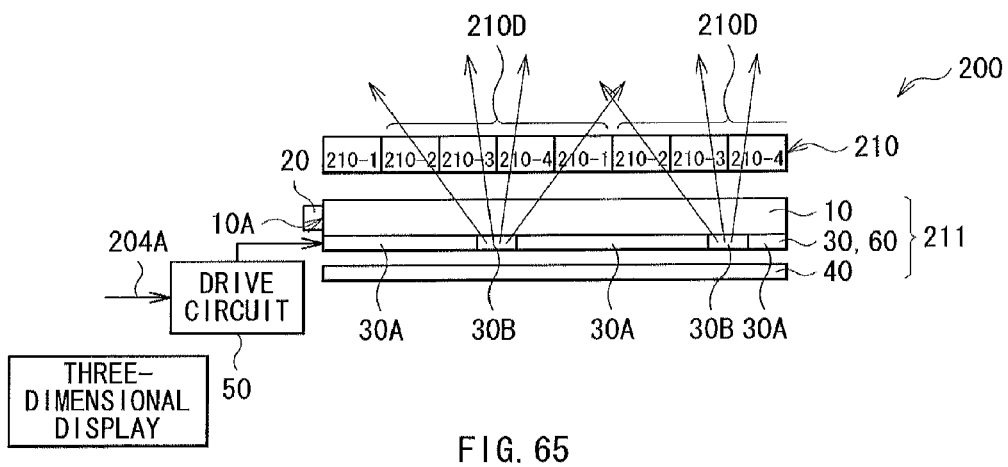
FIG. 65 is a schematic view illustrating an example of time-divisional drive following FIG. 64.

In the above-described respective embodiments and modifications thereof, the width of each sub-electrode 32A varies with the distance from the light source 20; however, an edge of the sub-electrode 32A may have a concavo-convex shape. At this time, edges of strip-like illumination light beams generated by the sub-electrodes 32A also have a concavo-convex shape. The concavo-convex amplitude of the concavo-convex shape is larger at a shorter distance from the light source 20, and smaller at a longer distance from the light source 20. For example, as illustrated in FIGS. 60 and 61, the sub-electrode 32A has a concavo-convex section 43 at an edge on a longer side thereof. The concavo-convex amplitude of the concavo-convex section 43 is larger at a shorter distance from the light source 20, and smaller at a longer distance from the light source 20. In the case where the sub-electrode 32A has such a shape, an area of a portion used for one pixel 210a in the display panel 210 of the sub-electrodes 32A is also considered to vary with the distance from the light source 20.

[Eighth Modification]

In the above-described respective embodiments and modifications thereof, a drive circuit (not illustrated) driving the display panel 210 may time-divisionally drive the display panel 210. In this case, the drive circuit 50 switches emission points for strip-like illumination light beams from the backlight 211 in synchronization with sequential display switching in the display panel 210 from one pixel row to another in an equal number of pixel rows to the number of parallaxes. For example, as illustrated in FIGS. 62, 63, 64, and 65 in order, the drive circuit 50 switches the emission points for strip-like illumination light beams from the backlight 211 in synchronization with sequential display switching in the display panel 210 from one pixel row to another in four pixel rows within one frame period (1/60 seconds). At this time, the drive circuit (not illustrated) driving the display panel 210 applies a voltage corresponding to an image signal to each pixel to perform sequential display switching in the display panel 210 from one pixel row to another in an equal number of pixel rows to the number of parallaxes within one frame period (1/60 seconds). When such switching is performed at high speed, a viewer perceives a number of pixels which is four times as large as the number of pixels illuminating at a moment, thereby allowing substantial resolution to be enhanced.

[Ninth Modification]

In the above-described respective embodiments and modifications thereof, one or both of the transparent substrate 31 and the transparent substrate 37 may be integrally formed with the light guide plate 10. For example, in the above-described embodiments and modifications thereof, in the case where the transparent substrate 37 is in contact with the light guide plate 10, the transparent substrate 37 may be integrally formed with the light guide plate 10. At this time, the transparent substrate 37 corresponds to a specific example of "first transparent substrate" or "second transparent substrate" in the application. Moreover, for example, in the above-described respective embodiments and modifications thereof, in the case where the transparent substrate 31 is in contact with the light guide plate 10, the transparent substrate 31 may be integrally formed with the light guide plate 10. At this time, the transparent substrate 31 corresponds to a specific example of "first transparent substrate" or "second transparent substrate" in the application. Further, for example, in the above-described respective embodiments and modifications thereof, in the case where the transparent substrates 31 and 37 are in contact with the light guide plate 10, the transparent substrates 31 and 37 may be integrally formed with the light guide plate 10. At this time, the transparent substrate 31 or the transparent substrate 37 corresponds to a specific example of "first transparent substrate" or "second transparent substrate" in the application.

[Tenth Modification]

Figure 66:
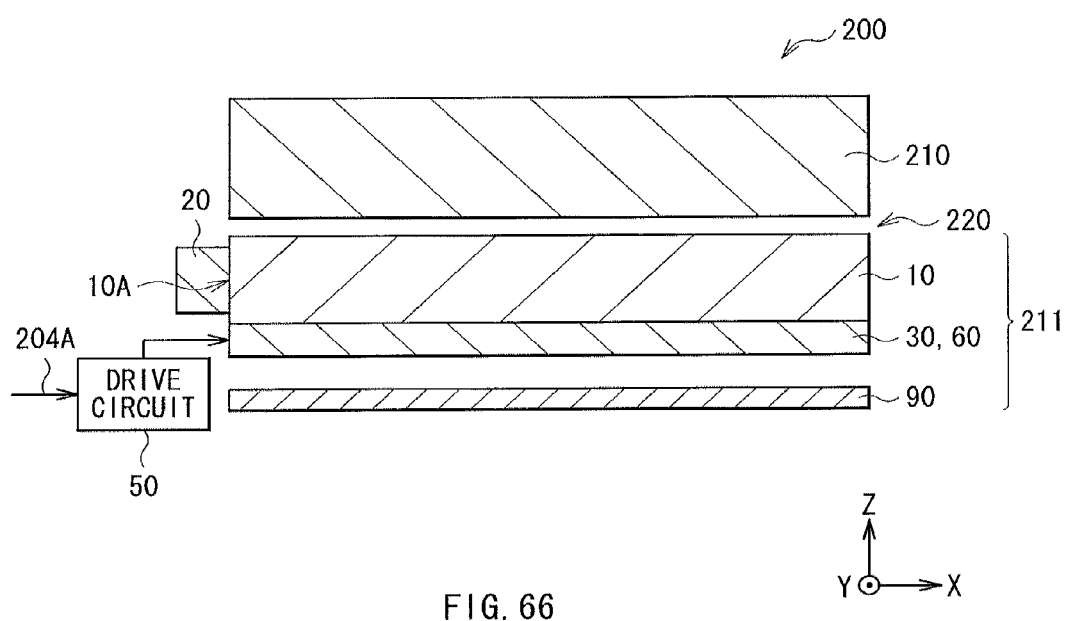
FIG. 66 is a sectional view illustrating a fifth modification of the configuration of the display section in the receiver-side unit in each of the embodiments.

In the above-described respective embodiments and modifications thereof, a light-reflection suppression layer may be included instead of the reflective plate 40. The light-reflection suppression layer may be a layer formed by coating a low-reflectivity material or a material absorbing light on a surface of a base. For example, as illustrated in FIG. 66, instead of the reflective plate 40, a light-reflection suppression layer 90 may be included. The light-reflection suppression layer 90 is configured of, for example, a layer formed by coating a low-reflectivity material on a surface of a base, or a layer formed by coating a material absorbing light on the surface of the base. Thus, when the light-reflection suppression layer 90 is included, a rate at which light reflected by the reflective plate 40 in the case where the reflective plate 40 is included passes through the transparent region 30A to enter the display panel 210 is allowed to be reduced. As a result, contrast is allowed to be improved.

[Eleventh Modification]

Figure 67:
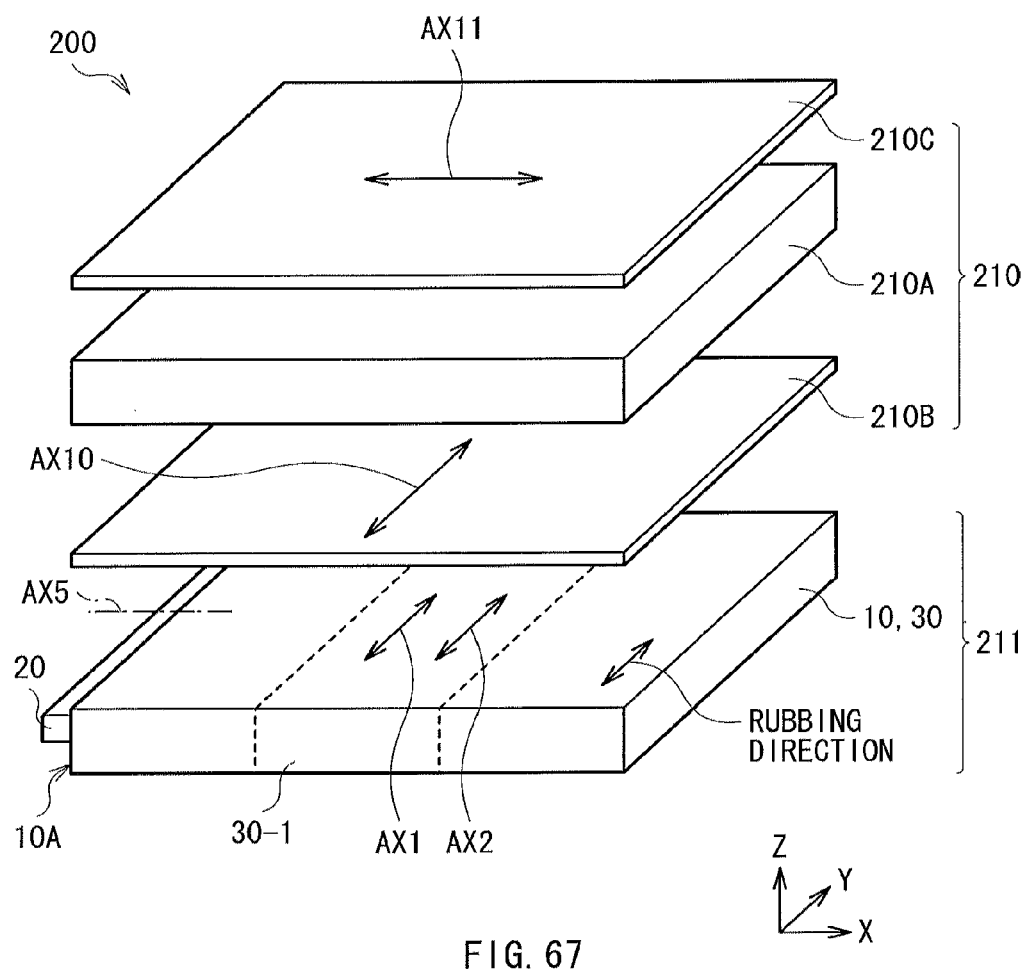
FIG. 67 is a diagram illustrating an example of a relationship between optical axes of polarizing plates of the display panel and optical axes of the light modulation layer in FIG. 3.
Figure 69:
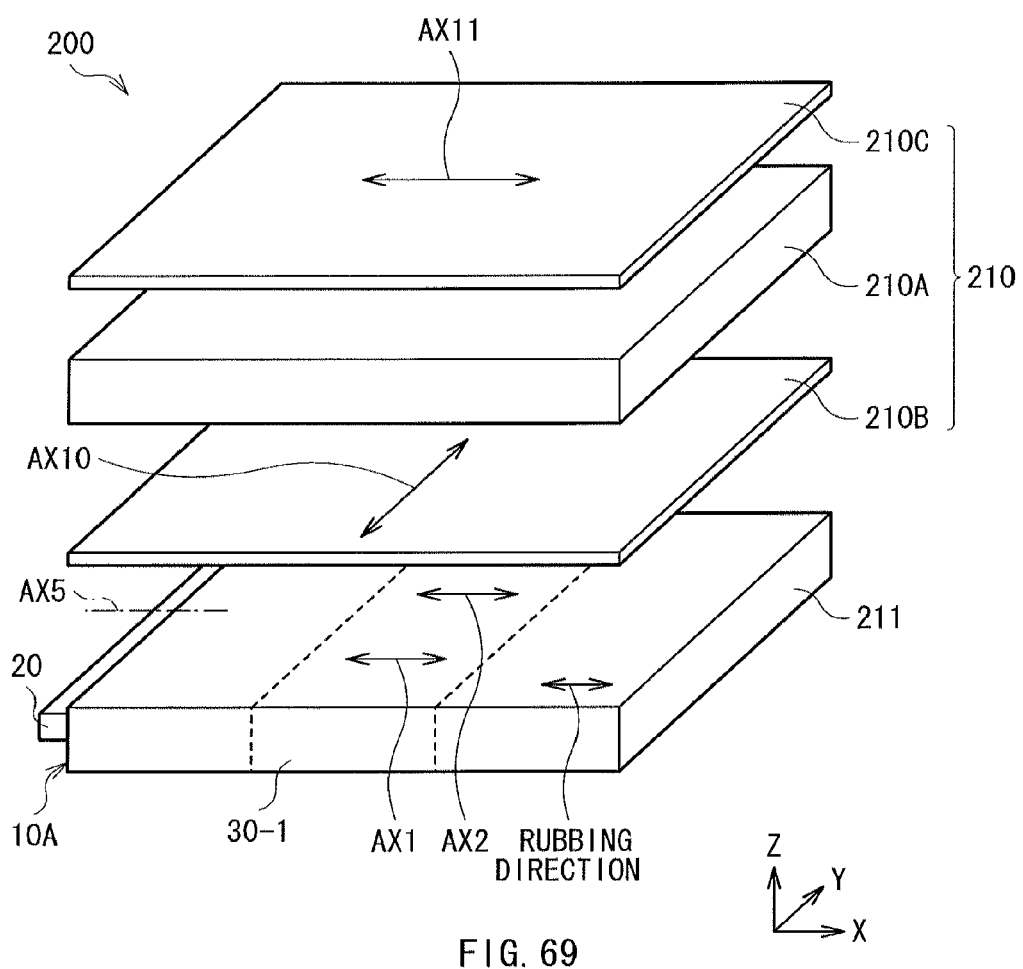
FIG. 69 is a diagram illustrating an example of a relationship between optical axes of polarizing plates of the display panel and the optical axes of the light modulation layer in FIG. 47.

In the first embodiment, under no potential difference application, the optical axis AX1 of the bulk 34A and the optical axis AX2 of the microparticle 34B each mainly have an optical-axis component in the same direction, and, for example, as illustrated in FIGS. 67 and 69, the optical axes AX1 and AX2 are preferably oriented in the rubbing direction of the alignment films 33 and 35. Moreover, for example, as illustrated in FIGS. 67 and 69, under no potential difference application, the optical axes AX1 and AX2 preferably mainly have an optical-axis component in a direction parallel to a transmission axis AX10 of the polarizing plate 210B located closer to the backlight 211. For example, as illustrated in FIG. 67, the transmission axis AX10 is preferably oriented in the rubbing direction of the alignment films 33 and 35.

For example, as illustrated in FIG. 67, under no potential difference application, the optical axes AX1 and AX2 are preferably oriented in a direction intersecting with or orthogonal (or substantially orthogonal) to a normal AX5 to the light incident surface 10A. Moreover, for example, as illustrated in FIGS. 4 and 67, under no potential difference application, the optical axes AX1 and AX2 are preferably parallel or substantially parallel to the transparent substrate 31. In other words, under no potential difference application, the optical axes AX1 and AX2 are preferably oriented substantially in a Y-axis direction in FIG. 67, because of reasons described in [Anisotropic Scattering] in the above-described embodiment.

Figure 68:
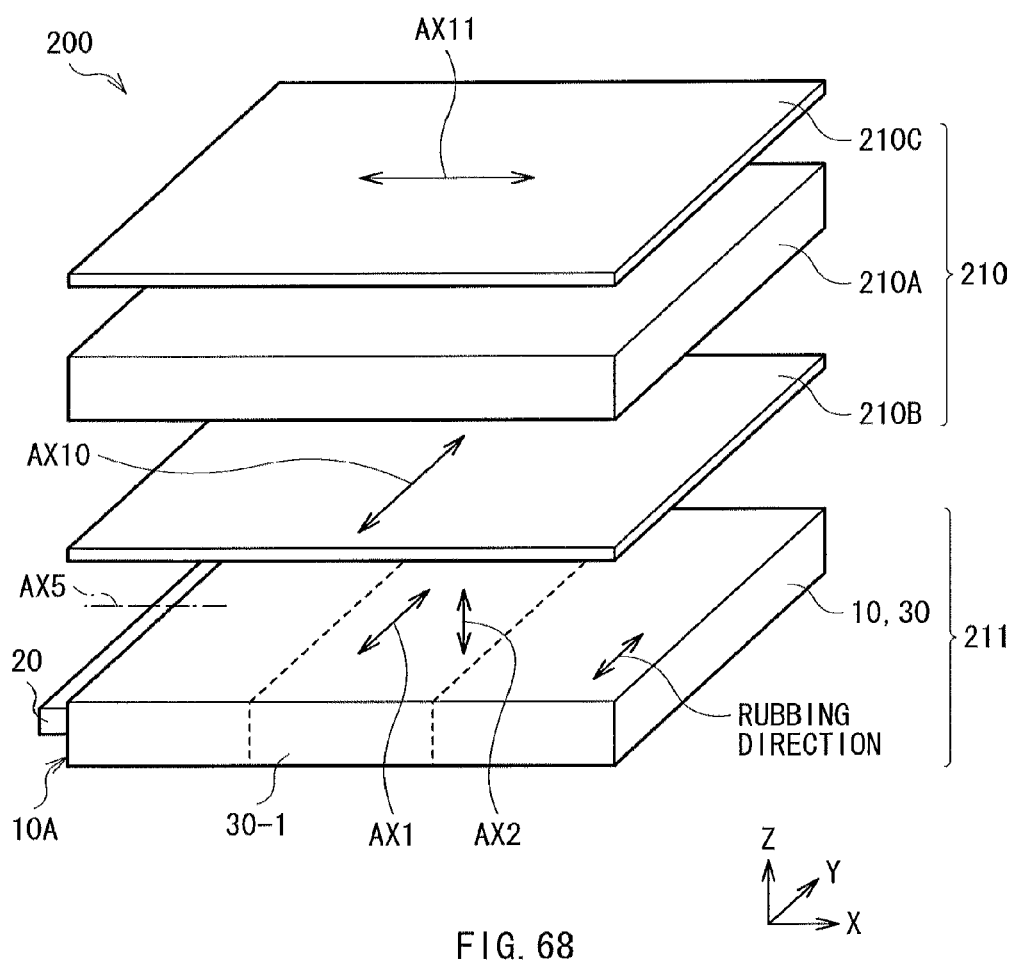
FIG. 68 is a diagram illustrating another example of the relationship between the optical axes of the polarizing plates of the display panel and the optical axes of the light modulation layer in FIG. 3.

Moreover, as described above, under potential difference application, the optical axis AX1 is preferably oriented in the same direction or substantially the same direction as that under no potential difference application. Under potential difference application, the optical axis AX1 mainly has an optical-axis component in a direction parallel to the transmission axis AX10 of the polarizing plate 210B, and, for example, as illustrated in FIG. 68, the optical axis AX1 is preferably oriented in a direction parallel to the transmission axis AX10. Under potential difference application, the optical axis AX1 is oriented in a direction intersecting with or orthogonal (or substantially orthogonal) to the optical axis AX5 of the light source 20, and is preferably parallel or substantially parallel to the transparent substrate 31.

On the other hand, under potential difference application, the optical axis AX2 is preferably displaced in a predetermined direction by an influence of an electric field generated by a potential difference applied to the lower electrode 32 and the upper electrode 36. For example, as illustrated in FIGS. 4 and 68, under potential difference application, the optical axis AX2 preferably intersects with or is preferably orthogonal (or substantially orthogonal) to the transparent substrate 31. In other words, the optical axis AX2 is preferably displaced in a direction where an angle between the optical axis AX2 and the normal to the transparent substrate 31 is reduced by potential difference application to the lower electrode 32 and the upper electrode 36. At this time, the optical axis AX2 intersects with or is orthogonal (or substantially orthogonal) to the optical axis AX1, and preferably intersects with or is preferably orthogonal (or substantially orthogonal) to the transparent substrate 31.

Further, for example, as illustrated in FIG. 69, under no potential difference application, the optical axes AX1 and AX2 may be parallel or substantially parallel to the optical axis AX5 of the light source 20. For example, as illustrated in FIGS. 48 and 69, under no potential difference application, the optical axes AX1 and AX2 may be parallel or substantially parallel to the transparent substrate 31. In other words, under no potential difference application, the optical axes AX1 and AX2 may be oriented substantially in an X-axis direction in FIG. 69.

Moreover, under potential difference application, the optical axis AX1 may be oriented in the same or substantially the same direction as that under no potential difference application. Under potential difference application, the optical axis AX1 mainly has an optical-axis component in a direction parallel to the transmission axis AX10 of the polarizing plate 210B, and, for example, as illustrated in FIG. 69, the optical axis AX1 may be oriented in a direction parallel to the transmission axis AX10. Under potential difference application, the optical axis AX1 is parallel or substantially parallel to, for example, the optical axis AX5 of the light source 20, and may be parallel or substantially parallel to the transparent substrate 31.

On the other hand, under potential difference application, the optical axis AX2 may be displaced in a predetermined direction by an influence of an electric field generated by the potential difference applied to the lower electrode 32 and the upper electrode 36. For example, as illustrated in FIGS. 48 and 70, under potential difference application, the optical axis AX2 may be orthogonal or substantially orthogonal to (or intersect with) the transparent substrate 31. In other words, the optical axis AX2 may be displaced in a direction where an angle between the optical axis AX2 and the normal to the transparent substrate 31 is reduced by voltage application to the lower electrode 32 and the upper electrode 36. At this time, the optical axis AX2 is orthogonal or substantially orthogonal to (or intersects with) the optical axis AX1, and may be orthogonal or substantially orthogonal to (intersect with) the transparent substrate 31.

4. Examples

Next, an example of the backlight 211 according to the above-described respective embodiments and modifications thereof will be described below.

FIG. 71 illustrates an example of a layout of the lower electrode 32 (the sub-electrodes 32A and the wiring lines 32B and 32C) and the upper electrode 36 of the backlight 211 according to the example. FIG. 72 illustrates an enlarged view of a part of the lower electrode 32 (the sub-electrodes 32A and the wiring lines 32B and 32C) in FIG. 71.

The lower electrode 32 (the sub-electrodes 32A and the wiring lines 32B and 32C) was formed by forming an ITO film on a substrate with a size of 60 mm wide×85 mm high× 0.7 mm thick and performing patterning. At that time, the plurality of sub-electrodes 32A were configured of the sub-electrodes 32a of one kind used for three-dimensional display and two-dimensional display and the sub-electrodes 32b, 32c, and 32d of three kinds used only for two-dimensional display, and the sub-electrodes 32a, 32b, 32c, and 32d were tilted in a direction intersecting with the light incident surface 10A at 71.56 degrees. Maximum widths (da_max, db_max, dc_max, and dd_max) of the sub-electrodes 32a, 32b, 32c, and 32d were 40 µm, and widths thereof at a shorter distance from the light source 20 are smaller than those at a longer distance from the light source 20. The sub-electrodes 32A were disposed in a region with a size of 50 mm wide×75 mm high.

Moreover, the upper electrode 36 was formed by forming an ITO film on a substrate with a size of 60 mm wide×85 mm high×0.7 mm thick and performing patterning. At that time, the upper electrode 36 was configured of a planar electrode 36S with a size of 50 mm wide×75 mm high and a wiring line 36S extracted from the planar electrode 36S.

After surfaces of the lower electrode 32 and the upper electrode 36 were coated with alignment films, the respective alignment films were rubbed in a predetermined direction (refer to FIG. 70), and 4-µm spacers were sprayed on a surface of the alignment film located on the lower electrode 32, and a ring-shaped sealant was drawn on a surface of the alignment film located on the upper electrode 36. After that, the lower electrode 32 and the upper electrode 36 were bonded together to allow the planar electrode 36S to be disposed in a region facing the sub-electrodes 32A, as well as to allow the wiring line 36S to be disposed in a region facing the wiring line 32C at a longest possible distance from the light source 20. Next, a PDLC was vacuum-injected in a gap between the lower electrode 32 and the upper electrode 36 to complete a display panel. Next, seven LED light sources were disposed at intervals of 7 mm on an end surface having a length of 60 mm, and a black plate was disposed on a back surface of the display panel to complete an illumination unit.

In the illumination unit, in three-dimensional display, the sub-electrodes 32a were driven with a 60-Hz 100-V pulse, and the sub-electrodes 32b, 32c, and 32d and the upper electrode 36 were GNDs. Moreover, as necessary, the display panel was disposed on the illumination unit to form a display, and evaluation as the display was performed. Respective examples will be described in detail below.

Example 1

The optical axis AX2 was parallel to the light incident surface 10A and the transmission axis AX10 of the polarizing plate 210B. Variations in line widths of the sub-electrodes 32b, 32c, and 32d were as illustrated in FIG. 71.

Example 2

The optical axis AX2 was oriented parallel to the light incident surface 10A, as well as in a direction forming 45° with the transmission axis AX10 of the polarizing plate 210B. Variations in line widths of the sub-electrodes 32b, 32c, and 32d were similar to Example 1.

Example 3

The optical axis AX2 was oriented parallel to the light incident surface 10A, as well as in a direction forming 90° with the transmission axis AX10 of the polarizing plate 210B. Variations in line widths of the sub-electrodes 32b, 32c, and 32d were similar to Example 1.

Example 4

The optical axis AX2 was oriented perpendicular to the light incident surface 10A as well as parallel to the transmission axis AX10 of the polarizing plate 210B. Variations in line widths of the sub-electrodes 32b, 32c, and 32d were similar to Example 1.

Comparative Example 1

The optical axis AX2 was oriented parallel to the light incident surface 10A and the transmission axis AX10 of the polarizing plate 210B. The line widths of the sub-electrodes 32b, 32c, and 32d were fixed (40 μm).

Comparative Example 2

A fixed barrier was disposed on an emission surface of the illumination unit, and a prism sheet and a diffusion sheet were disposed between the fixed barrier and the PDLC. As in the case of the respective examples, a display region had a size of 50 mm×75 mm. A barrier formed by forming a patterned chromium film on a glass surface was used as the fixed barrier. Portions corresponding to the sub-electrodes 32a were transparent regions, and portions corresponding to the sub-electrodes 32b, 32c, and 32d were light-shielded. The line widths of the transparent regions were uniform (40 μm).

Next, evaluation results will be described below.

In Example 1 and Comparative Examples 1 and 2 as illumination units, luminance in a central portion was measured. In Example 1 and Comparative Example 1, a ratio of (in three-dimensional display/in two-dimensional display) was measured, and in Comparative Example 2, a ratio of (with the fixed barrier/without the fixed barrier) was measured. Results are as follows:

| | |
|---|---|
| Example 1 | 72% |
| Comparative Example 1 | 72% |
| Comparative Example 2 | 18% |

In Comparative Example 2, luminance in three-dimensional display was greatly reduced. In Example 1 and Comparative Example 1, it was found out that light was efficiently used even in three-dimensional display by a partial luminance enhancement effect.

Next, in Example 1 and Comparative Examples 1 and 2, image quality in three-dimensional display and two-dimensional display was evaluated.

In 3D
Example 1: 3D was perceived
Comparative Example 1: 3D was perceived
Comparative Example 2: 3D was perceived, but very dark
In two-dimensional display
Example 1: 2D was perceived
Comparative Example 1: 2D was perceived, but it was very bright in proximity to the LEDs, and brightness was nonuniform
Comparative Example 2: 2D was not allowed to be displayed Calculation results of luminance distributions in two-dimensional display in Example 1 and Comparative Example 1 are illustrated in FIG. 72 (horizontal axis: distance from LED, vertical axis: luminance). It was found out that, compared to Comparative Example 1, in Example 1, a luminance distribution was uniform. It is to be noted that a region at 5 mm or less from the LED and a region at 80 mm or over from the LED of ITO on the lower substrate were etched, because ITO in these regions was disposed out of a display region, and scattering was small; therefore, unnecessary light was not extracted.

Next, the display panel was disposed on each of the illumination units in Examples 1 to 4, and luminance in two-dimensional display in Examples 1 to 4 was measured.
Example 1: luminance 1102 cd/m$^2$
Example 2: luminance 660 cd/m$^2$
Example 3: luminance 114 cd/m$^2$
Example 4: luminance 370 cd/m$^2$ It was found out from results of Examples 1 to 3 that a ratio of (polarized light in a PDLC alignment direction):(polarized light in a direction perpendicular to the PDLC alignment direction) in the illumination units was 9:1, and when the transmission axis of the polarizing plate located on an emission side of the liquid crystal panel was aligned in the PDLC alignment direction, for example, a rubbing direction, light was allowed to be used efficiently. It was found out from results of Examples 1 and 4 that an anisotropic scattering effect of the PDLC was increased when the optical axis direction of the LED light source (a direction of a normal to the light incident surface) and the PDLC alignment direction were perpendicular, and luminance was enhanced.

Next, the illumination unit of Example 5 was configured as below. Example 5 has the same configuration as that of Example 1, except that the lower electrode 32 had the following ITO pattern. As the ITO pattern of the lower electrode 32, stripes were formed in a display region with a size of 50 mm×75 mm, and an extending direction of the stripes was parallel to the light incident surface 10A. The line widths of the sub-electrodes 32a were fixed at 83 μm, and one sub-electrode 32b was disposed between respective sub-electrodes 32a, and the line widths of the sub-electrodes 32b were fixed at 259 μm. Insulating sections of the sub-electrodes 32a and the sub-electrodes 32b were fixed at 20 μm.

The following driving method was used. In three-dimensional display in the first mode, the sub-electrodes 32a were driven with a 60-Hz 100-V pulse, and the upper electrode 36 and the sub-electrodes 32A except for the sub-electrodes 32a were GNDs. In three-dimensional display in the second mode, the sub-electrodes 36a were driven with a 60-Hz 100-V pulse, and the lower electrode 32 and the sub-electrodes 36A except for the sub-electrodes 36a were GNDs.

A display panel was provided to the illumination unit of Example 5, and image quality in three-dimensional display was confirmed. In the first mode, three-dimensional display was observed from a direction orthogonal to a shorter side (60 mm) of the display as a main perspective, and three-dimensional display with a uniform and bright luminance distribution was confirmed. In the second mode, three-dimensional display was observed from a direction orthogonal to a longer side (85 mm) of the display, and three-dimensional display with a uniform and bright luminance distribution was confirmed.

Although the present application is described referring to the embodiments, the modifications, and application examples, the application is not limited thereto, and may be variously modified.

For example, in the above-described embodiments, modifications, and application examples, the receiver-side unit 200 has a plurality of main perspectives; however, the receiver-side unit 200 may have one main perspective. In this case, for example, one of the lower electrode 32 and the upper electrode 36 is configured of one sheet-like electrode (a planar electrode), and may not include sub-electrodes.

For example, the application is allowed to have the following configurations.

(1) An illumination unit including:
a first transparent substrate and a second transparent substrate being separated from and facing each other;
a light source emitting light to a first end surface of the first transparent substrate or the second transparent substrate;
a light modulation layer disposed in a gap between the first transparent substrate and the second transparent substrate, and exhibiting a scattering property or transparency with respect to light from the light source, depending on magnitude of an electric field; and
an electrode generating an electric field for a first mode or an electric field for a second mode in the light modulation layer, when a voltage is applied thereto,
in which the light modulation layer generates a plurality of first strip-like illumination light beams extending in a direction intersecting with the first end surface at a first angle with use of light from the light source, when the electric field for the first mode is applied from the electrode to the light modulation layer, and
the light modulation layer generates a plurality of second strip-like illumination light beams extending in a direction intersecting with the first end surface at an angle different from the first angle or a direction parallel to the first end surface with use of light from the light source, when the electric field for the second mode is applied from the electrode to the light modulation layer.

(2) The illumination unit according to (1), in which
a light emission area per unit area of each of the first strip-like illumination light beams varies with a distance from the light source.

(3) The illumination unit according to (1) or (2), in which
each of the first strip-like illumination light beams and the second strip-like illumination light beams has one continuous strip-like light emission shape, or a light emission shape configured of a plurality of block-like illumination light beams arranged in one line.

(4) The illumination unit according to any one of (1) to (3), in which
a width of each of the first illumination light beams varies with a distance from the light source.

(5) The illumination unit according to any one of (1) to (3), in which
an edge of each of the first strip-like illumination light beams has a concavo-convex shape, and
concavo-convex amplitude of the concavo-convex shape varies with a distance from the light source.

(6) The illumination unit according to any one of (1) to (5), in which
central lines in a width direction of the strip-like illumination light beams are parallel to one another.

(7) The illumination unit according to any one of (1) to (6), in which
the electrode has a shape corresponding to a light emission shape of the first strip-like illumination light beams and the second strip-like illumination light beams.

(8) The illumination unit according to (7), in which
the electrode includes, on a surface of the first transparent substrate, a plurality of first strip-like electrodes extending in an extending direction of the first strip-like illumination light beams, or a plurality of first sub-electrodes arranged in the extending direction of the first strip-like illumination light beams as well as in a direction intersecting with the first strip-like illumination light beams.

(9) The illumination unit according to (8), in which
the electrode includes, on a surface of the second transparent substrate, a plurality of second strip-like electrodes extending in an extending direction of the second strip-like illumination light beams or a plurality of second sub-electrodes arranged in the extending direction of the second strip-like illumination light beams as well as in a direction intersecting with the second strip-like illumination light beams.

(10) The illumination unit according to (9), in which
the electrode includes, on the surface of the first transparent substrate, a first wiring line connecting some or all of the plurality of first strip-like electrodes or the plurality of first sub-electrodes to one another, and further includes, on the surface of the second transparent substrate, a second wiring line connecting some or all of the plurality of second strip-like electrodes or the plurality of second sub-electrodes to one another,
the first strip-like electrodes or the first sub-electrodes are disposed in a region not facing the second wiring line, and
the second strip-like electrodes or the second sub-electrodes are disposed in a region not facing the first wiring line.

(11) The illumination unit according to (8), in which
a width of each of the first strip-like electrodes or a width of one virtual strip-like electrode varies with a distance from the light source, the virtual strip-like electrode being configured of two or more of the plurality of first sub-electrodes arranged in the extending direction of the first strip-like illumination light beams.

(12) The illumination unit according to (8), in which
an edge of each of the first strip-like electrodes or an edge of one virtual strip-like electrode has a concavo-convex shape, the virtual strip-like electrode being configured of two or more of the plurality of first sub-electrodes arranged in the extending direction of the first strip-like illumination light beams, and
concavo-convex amplitude of the concavo-convex shape varies with a distance from the light source.

(13) The illumination unit according to (4), in which
a first potential difference allowing the light modulation layer to exhibit the scattering property is higher than a second potential difference allowing the light modulation layer to exhibit transparency, and
the width of each of the first strip-like illumination light beams is smaller at a shorter distance from the light source and larger at a longer distance from the light source.

(14) The illumination unit according to (5), in which
a first potential difference allowing the light modulation layer to exhibit the scattering property is higher than a second potential difference allowing the light modulation layer to exhibit transparency, and
the concavo-convex amplitude of the concavo-convex shape is larger at a shorter distance from the light source and smaller at a longer distance from the light source.

(15) The illumination unit according to (11), in which
a first potential difference allowing the light modulation layer to exhibit the scattering property is higher than a second potential difference allowing the light modulation layer to exhibit transparency, and
a width of each of the first strip-like electrodes or a width of each virtual strip-like electrode is smaller at a shorter distance from the light source and larger at a longer distance from the light source.

(16) The illumination unit according to (12), in which
a first potential difference allowing the light modulation layer to exhibit the scattering property is higher than a second potential difference allowing the light modulation layer to exhibit transparency, and
the concavo-convex amplitude of the concavo-convex shape is larger at a shorter distance from the light source and smaller at a longer distance from the light source.

(17) The illumination unit according to any one of (1) to (16), in which
the light modulation layer includes a first region and a second region both having optical anisotropy, and having response speeds with respect to an electric field, the response speeds being different from each other,
the first region mainly includes a liquid crystal material,
the second region mainly includes a polymer material, and
an optical-axis component in the first region and an optical-axis component in the second region are aligned in a direction parallel to each other, when the light modulation layer exhibits transparency.

(18) A display including:
a display panel being driven based on an image signal; and
an illumination unit illuminating the display panel, the illumination unit including
a first transparent substrate and a second transparent substrate being separated from and facing each other,
a light source emitting light to a first end surface of the first transparent substrate or the second transparent substrate,
a light modulation layer disposed in a gap between the first transparent substrate and the second transparent substrate, and exhibiting a scattering property or transparency with respect to light from the light source, depending on magnitude of an electric field, and
an electrode generating an electric field for a first mode or an electric field for a second mode in the light modulation layer, when a voltage is applied thereto,
in which the light modulation layer generates a plurality of first strip-like illumination light beams extending in a direction intersecting with the first end surface at a first angle with use of light from the light source, when the electric field for the first mode is applied from the electrode to the light modulation layer, and
the light modulation layer generates a plurality of second strip-like illumination light beams extending in a direction intersecting with the first end surface at an angle different from the first angle or a direction parallel to the first end surface with use of light from the light source, when the electric field for the second mode is applied from the electrode to the light modulation layer.

(19) The display according to (18), further including a pair of polarizing plates facing each other with the display panel in between,
in which the light modulation layer includes a first region and a section region, the first region having optical anisotropy and higher responsivity with respect to an electric field, the second region having optical anisotropy and lower responsivity with respect to an electric field,
the first region and the second region each mainly have an optical-axis component in a direction parallel to a transmission axis of one polarizing plate located closer to the illumination unit of the pair of polarizing plates, when the light modulation layer exhibits transparency, and
the second region mainly has an optical-axis component in a direction parallel to the transmission axis of the polarizing plate located closer to the illumination unit of the pair of polarizing plate, and the first region mainly has an optical-axis component in a direction intersecting with or orthogonal to an optical axis of the second region as well as in a direction intersecting with or orthogonal to the first transparent substrate, when the light modulation layer exhibits the scattering property.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An edge light illumination unit comprising:
a first transparent substrate and a second transparent substrate being separated from and facing each other;
a light source emitting light to a first end surface of the first transparent substrate or the second transparent substrate;
a light modulation layer disposed in a gap between the first transparent substrate and the second transparent substrate, wherein the light modulation layer exhibits a scattering property to scatter light emitted from the light source or transparency with respect to light emitted from the light source, based on a magnitude of an electric field; and
an electrode generating an electric field for a first mode or an electric field for a second mode in the light modulation layer, when a voltage is applied thereto,
wherein the light modulation layer generates a plurality of first strip-shaped illumination light beams extending in a direction intersecting the first end surface at a first angle using light from the light source, when the electric field for the first mode is applied from the electrode to the light modulation layer, wherein the electrode causes an edge of each of the plurality of first strip-shaped illumination light beams to have a concavo-convex shape, and wherein an amplitude of the concavo-convex shape varies with a distance from the light source, and wherein the light modulation layer generates a plurality of second strip-shaped illumination light beams extending in a direction intersecting the first end surface at an angle different from the first angle or a direction parallel to the first end surface using light from the light source, when the electric field for the second mode is applied from the electrode to the light modulation layer.

2. The edge light illumination unit according to claim 1, wherein a light emission area per unit area of each of the plurality of first strip-shaped illumination light beams varies with the distance from the light source.

3. The edge light illumination unit according to claim 1, wherein each of the plurality of first strip-shaped illumination light beams and the plurality of second strip-shaped illumination light beams has one continuous strip-shaped light emission shape, or a light emission shape comprising a plurality of block-shaped illumination light beams arranged in one line.

4. The edge light illumination unit according to claim 1, wherein a width of each of the plurality of first strip-shaped illumination light beams varies with the distance from the light source.

5. The edge light illumination unit according to claim 1, wherein central lines in a width direction of the plurality of first strip-shaped illumination light beams and the plurality of second strip-shaped illumination light beams are parallel to one another.

6. The edge light illumination unit according to claim 1, wherein the electrode has a shape corresponding to a light emission shape of the plurality of first strip-shaped illumination light beams and the plurality of second strip-shaped illumination light beams.

7. The edge light illumination unit according to claim 6, wherein the electrode includes, on a surface of the first transparent substrate, a plurality of first strip-shaped electrodes extending in an extending direction of the plurality of first strip-shaped illumination light beams, or a plurality of first sub-electrodes arranged in the extending direction of the plurality of first strip-shaped illumination light beams as and in a direction intersecting the plurality of first strip-shaped illumination light beams.

8. The edge light illumination unit according to claim 7, wherein the electrode includes, on a surface of the second transparent substrate, a plurality of second strip-shaped electrodes extending in an extending direction of the plurality of second strip-shaped illumination light beams or a plurality of second sub-electrodes arranged in the extending direction of the plurality of second strip-shaped illumination light beams and in a direction intersecting the plurality of second strip-shaped illumination light beams.

9. The edge light illumination unit according to claim 8, wherein the electrode includes, on the surface of the first transparent substrate, a first wiring line connecting one or more of the plurality of first strip-shaped electrodes or the plurality of first sub-electrodes to one another, and further includes, on the surface of the second transparent substrate, a second wiring line connecting one or more of the plurality of second strip-shaped electrodes or the plurality of second sub-electrodes to one another, wherein the plurality of first strip-shaped electrodes or the plurality of first sub-electrodes are disposed in a region not facing the second wiring line, and wherein the plurality of second strip-shaped electrodes or the plurality of second sub-electrodes are disposed in a region not facing the first wiring line.

10. The edge light illumination unit according to claim 7, wherein a width of each of the plurality of first strip-shaped electrodes or a width of one virtual strip-shaped electrode varies with a distance from the light source, wherein the virtual strip-shaped electrode comprises two or more of the plurality of first sub-electrodes arranged in the extending direction of the plurality of first strip-shaped illumination light beams.

11. The edge light illumination unit according to claim 7, wherein an edge of one virtual strip-shaped electrode has a concavo-convex shape, wherein the virtual strip-shaped electrode comprises two or more of the plurality of first sub-electrodes arranged in the extending direction of the plurality of first strip-shaped illumination light beams, and concavo-convex amplitude of the concavo-convex shape varies with a distance from the light source.

12. The edge light illumination unit according to claim 1, wherein the light modulation layer is operable to scatter light emitted from the light source when a first potential difference is applied, wherein the light modulation layer is transparent to light emitted from the light source when a second potential difference is applied, and wherein the first potential difference is higher than the second potential difference, and wherein the amplitude of the concavo-convex shape is larger at a shorter distance from the light source and smaller at a longer distance from the light source.

13. The edge light illumination unit according to claim 1, wherein the light modulation layer is operable to scatter light emitted from the light source when a first potential difference is applied, wherein the light modulation layer is transparent to light emitted from the light source when a second potential difference is applied, and wherein the first potential difference is higher than a second potential difference, and wherein a width of each of a plurality of first strip-shaped electrodes included in the electrode or a width of each virtual strip-shaped electrode is smaller at a shorter distance from the light source and larger at a longer distance from the light source.

14. The edge light illumination unit according to claim 1, wherein the light modulation layer is operable to scatter light emitted from the light source when a first potential difference is applied, wherein the light modulation layer is transparent to light emitted from the light source when a second potential difference is applied, and wherein the first potential difference is higher than the second potential difference, and wherein the concavo-convex amplitude of the concavo-convex shape is larger at a shorter distance from the light source and smaller at a longer distance from the light source.

15. The edge light illumination unit according to claim 1, wherein the light modulation layer includes a first region and a second region both having optical anisotropy, and having response speeds with respect to the electric field, the response speeds being different from each other, wherein the first region comprises a liquid crystal material, the second region comprises a polymer material, and wherein an optical-axis component in the first region and an optical-axis component in the second region are aligned in a direction parallel to each other, when the light modulation layer exhibits transparency.

16. A display comprising:

a display panel being driven based on an image signal; and an edge light illumination unit illuminating the display panel, the illumination unit including:

a first transparent substrate and a second transparent substrate being separated from and facing each other, a light source emitting light to a first end surface of the first transparent substrate or the second transparent substrate, a light modulation layer disposed in a gap between the first transparent substrate and the second transparent substrate, wherein the light modulation layer exhibits a scattering property to scatter light emitted from the light source or transparency with respect to light emitted from the light source, based on a magnitude of an electric field, and an electrode generating first electric field for a first mode or second electric field for a second mode in the light modulation layer, when a voltage is applied thereto, wherein the light modulation layer generates a plurality of first strip-shaped illumination light beams extending in a direction intersecting the first end surface at a first angle using light from the light source, when the first electric field for the first mode is applied from the electrode to the light modulation layer, wherein the electrode causes an edge of each of the plurality of first strip-shaped illumination light beams to have a concavo-convex shape, and wherein an amplitude of the concavo-convex shape varies with a distance from the light source, and wherein the light modulation layer generates a plurality of second strip-shaped illumination light beams extending in a direction intersecting the first end surface at an angle different from the first angle or a direction parallel to the first end surface using light from the light source, when the second electric field for the second mode is applied from the electrode to the light modulation layer.

17. The display according to claim 16, further comprising a pair of polarizing plates facing each other with the display panel in between, wherein the light modulation layer includes a first region and a second region, the first region having optical anisotropy and higher responsivity with respect to the electric field, the second region having optical anisotropy and lower responsivity with respect to the electric field, wherein the first region and the second region comprise an optical-axis component in a direction parallel to a transmission axis of a polarizing plate located closer to the illumination unit of the pair of polarizing plates, when the light modulation layer exhibits transparency, and wherein the second region comprises an optical-axis component in a direction parallel to the transmission axis of the polarizing plate located closer to the illumination unit of the pair of polarizing plates, and wherein the optical-axis component of the first region is in a direction intersecting or orthogonal to an optical axis of the second region as well as in a direction intersecting or orthogonal to the first transparent substrate, when the light modulation layer exhibits the scattering property.

18. An illumination unit comprising:

a first transparent substrate and a second transparent substrate being separated from and facing each other;

a light source emitting light to a first end surface of the first transparent substrate or the second transparent substrate;

a light modulation layer disposed in a gap between the first transparent substrate and the second transparent substrate, and exhibiting a scattering property or transparency with respect to light from the light source, depending on magnitude of an electric field; and an electrode generating an electric field for a first mode or an electric field for a second mode in the light modulation layer, when a voltage is applied thereto, wherein the light modulation layer generates a plurality of first strip-shaped illumination light beams extending in a direction intersecting the first end surface at a first angle with use of light from the light source, when the electric field for the first mode is applied from the electrode to the light modulation layer, and wherein the light modulation layer generates a plurality of second strip-shaped illumination light beams extending in a direction intersecting the first end surface at an angle different from the first angle or a direction parallel to the first end surface with use of light from the light source, when the electric field for the second mode is applied from the electrode to the light modulation layer, wherein a width of each of the plurality of first strip-shaped illumination light beams varies with a distance from the light source, wherein a first potential difference allowing the light modulation layer to exhibit the scattering property is higher than a second potential difference allowing the light modulation layer to exhibit transparency, and wherein the width of each of the plurality of first strip-shaped illumination light beams is smaller at a shorter distance from the light source and larger at a longer distance from the light source.

* * * * *